United States Patent
Cherian et al.

(10) Patent No.: US 11,057,258 B2
(45) Date of Patent: Jul. 6, 2021

(54) DATA CHANNEL AND CONTROL/MANAGEMENT CHANNEL SEPARATION

(71) Applicant: QUALCOMM Incorporated, San Diego, CA (US)

(72) Inventors: George Cherian, San Diego, CA (US); Alfred Asterjadhi, San Diego, CA (US); Abhishek Pramod Patil, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 51 days.

(21) Appl. No.: 16/459,307

(22) Filed: Jul. 1, 2019

(65) Prior Publication Data

US 2020/0014576 A1  Jan. 9, 2020

Related U.S. Application Data

(60) Provisional application No. 62/694,428, filed on Jul. 5, 2018, provisional application No. 62/712,488, filed on Jul. 31, 2018.

(51) Int. Cl.
*H04W 72/00* (2009.01)
*H04L 27/26* (2006.01)
(Continued)

(52) U.S. Cl.
CPC ........ *H04L 27/2666* (2013.01); *H04L 1/0026* (2013.01); *H04L 1/0068* (2013.01); *H04W 72/0453* (2013.01)

(58) Field of Classification Search
CPC . H04L 27/2666; H04L 1/0026; H04L 1/0068; H04W 72/0453; H04W 72/1289; H04W 72/121; H04W 84/12
See application file for complete search history.

(56) References Cited

U.S. PATENT DOCUMENTS

| 8,244,273 | B1 * | 8/2012 | Talley | H04W 4/021 455/456.1 |
| 2012/0044904 | A1 * | 2/2012 | Takano | H04L 27/2602 370/329 |

(Continued)

OTHER PUBLICATIONS

International Search Report and Written Opinion—PCT/US2019/040337—ISA/EPO—dated Sep. 20, 2019.

*Primary Examiner* — Lan-Huong Truong
(74) *Attorney, Agent, or Firm* — Holland & Hart LLP

(57) ABSTRACT

Methods, systems, and devices for wireless communications are described. In some systems (e.g., Wi-Fi systems), two stations (STAs) may support communicating different information simultaneously via multiple links, channels, resource units, etc. Simultaneous communication may be enabled by a multi-band aggregation system, an enhanced preamble puncturing system, a multi-resource unit assignment system, a full duplex system, or some combination of these. A transmitting STA may transmit data to a receiving STA in a first set of resources while communicating different information with the STA in a second set of resources. The communicating may involve an additional transmission of data, control information, or management information, or receiving feedback from the receiving STA. In some examples, the data transmission may occur on a data channel, while the control information and feedback may occur on a control channel. The simultaneous communication may improve communication throughput while reducing feedback latency in the system.

30 Claims, 31 Drawing Sheets

(51) Int. Cl.
  *H04L 1/00*   (2006.01)
  *H04W 72/04*  (2009.01)

(56) References Cited

U.S. PATENT DOCUMENTS

| | | | |
|---|---|---|---|
| 2016/0165574 A1* | 6/2016 | Chu | H04W 72/005 |
| | | | 370/312 |
| 2017/0171878 A1 | 6/2017 | Chun et al. | |
| 2017/0303162 A1* | 10/2017 | Suh | H04L 69/22 |
| 2018/0020460 A1* | 1/2018 | Hedayat | H04W 52/00 |

* cited by examiner

DATA CHANNEL AND CONTROL/MANAGEMENT CHANNEL SEPARATION

CROSS REFERENCE

The present application for patent claims the benefit of U.S. Provisional Patent Application No. 62/694,428 by Cherian, et al., entitled "DATA CHANNEL AND CONTROL/MANAGEMENT CHANNEL SEPARATION," filed Jul. 5, 2018, and the benefit of U.S. Provisional Patent Application No. 62/712,488 by Cherian et al., entitled "CONTROL CHANNEL STRUCTURE," filed Jul. 31, 2018, assigned to the assignee hereof, and expressly incorporated herein.

BACKGROUND

The following relates to wireless communications, and more specifically to data channel and control/management channel separation.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink and uplink. The downlink (or forward link) may refer to the communication link from the AP to the STA, and the uplink (or reverse link) may refer to the communication link from the STA to the AP.

Some wireless communications systems (e.g., Wi-Fi systems) may support a transmitting STA (e.g., an AP) assigning a resource unit to each receiving STA of a set of STAs. The receiving STAs may receive either data, control, or management information in an assigned resource unit. In some examples, the receiving STA may receive a combination of the data, control, or management information in the resource unit, where the payload size for each type of information is reduced to support the combination within the assigned resource unit. However, for the wireless communications systems to support extremely high throughput (EHT), the systems may need to support a greater number of resources for each receiving STA, while efficiently handling the transmission, reception, and decoding of different types of information.

SUMMARY

The described techniques relate to improved methods, systems, devices, or apparatuses that support data channel and control/management channel separation. For example, the described techniques provide for a wireless communications system where a station (STA) may communicate with another STA over multiple links, channels, or resource units simultaneously. The wireless communications system may be an example of a multi-band aggregation system, an enhanced preamble puncturing system, a multi-resource unit assignment system, a full duplex system, or some combination. In any of the above systems, a transmitting STA may transmit data to a receiving STA in a first set of resources while simultaneously communicating different information with the STA in a second set of resources. The communicating may involve an additional transmission of data, control information, or management information, or may involve receiving feedback information (e.g., a positive or negative acknowledgement (ACK/NACK) message, a bandwidth quality report (BQR), a channel quality indicator (CQI), etc.) from the receiving STA.

In some examples, the transmitting STA may service multiple receiving STAs that may be grouped into multiple groups containing a subset of the multiple receiving STAs. The multiple groups may be overlapping (e.g., a receiving STA may be included in more than one group of the multiple groups) or non-overlapping (e.g., each receiving STA is included in a single group of the multiple groups). Each group may be identified by a unique identifier value, in which the transmitting STA may assign each of the receiving STAs to the multiple groups as part of a multi-user (MU) transmission. The transmitting STA may transmit the data on a data channel, while transmitting the control information and receiving the feedback for the data channel on a control channel. By simultaneously communicating different information over different channels (e.g., over a data channel and a control/management channel), the STAs may improve communication throughput while reducing feedback latency in the system.

A method of wireless communications is described. The method may include assigning a set of resource units for communication with a receiving STA, transmitting data to the receiving STA in at least a first resource unit of the set of resource units, and communicating with the receiving STA in at least a second resource unit of the set of resource units, where the communicating includes transmitting or receiving information that is different from the transmitted data of the first resource unit, and where at least a portion of data is transmitted simultaneously with transmitting or receiving a portion of the information communicated with the receiving STA.

An apparatus for wireless communications is described. The apparatus may include a first interface, a second interface, and a wireless modem configured to assign a set of resource units for communication with a receiving STA, output over the second interface data to the receiving STA in at least a first resource unit of the set of resource units, and communicate with the receiving STA in at least a second resource unit of the set of resource units, where the communicating includes obtaining over the first interface or outputting over the second interface information that is different from the transmitted data of the first resource unit, and where at least a portion of data is obtained simultaneously with obtaining or outputting a portion of the information communicated with the receiving STA.

Another apparatus for wireless communications is described. The apparatus may include means for assigning a set of resource units for communication with a receiving STA, transmitting data to the receiving STA in at least a first resource unit of the set of resource units, and communicating with the receiving STA in at least a second resource unit of the set of resource units, where the communicating includes transmitting or receiving information that is different from the transmitted data of the first resource unit, and where at least a portion of data is transmitted simultaneously with transmitting or receiving a portion of the information communicated with the receiving STA.

A non-transitory computer-readable medium storing code for wireless communications is described. The code may include instructions executable by a processor to assign a set of resource units for communication with a receiving STA, transmit data to the receiving STA in at least a first resource unit of the set of resource units, and communicate with the receiving STA in at least a second resource unit of the set of resource units, where the communicating includes transmitting or receiving information that is different from the transmitted data of the first resource unit, and where at least a portion of data is transmitted simultaneously with transmitting or receiving a portion of the information communicated with the receiving STA.

In some examples of the method, apparatuses, and non-transitory computer-readable medium described herein, the communicating may include operations, features, means, or instructions for transmitting additional information to the receiving STA in at least the second resource unit of the set of resource units.

In some examples of the method, apparatuses, and non-transitory computer-readable medium described herein, the additional information includes control information, management information, or a combination.

In some examples of the method, apparatuses, and non-transitory computer-readable medium described herein, the additional information may include control information. In these examples, the method, apparatuses, and non-transitory computer-readable medium described herein may further include operations, features, means, or instructions for transmitting management information to the receiving STA in at least a third resource unit of the set of resource units, where at least a portion of transmitting the data, the control information, and the management information occur simultaneously.

Some examples of the method, apparatuses, and non-transitory computer-readable medium described herein may further include operations, features, means, or instructions for transmitting, to the receiving STA, an indication of the second resource unit, where the indication includes a broadcast identifier (ID) or a special resource unit ID that indicates the second resource unit contains control information or management information.

In some examples of the method, apparatuses, and non-transitory computer-readable medium described herein, the second resource unit includes a primary bandwidth for an access point (AP).

In some examples of the method, apparatuses, and non-transitory computer-readable medium described herein, the data includes unicast data and the additional information includes broadcast data.

In some examples of the method, apparatuses, and non-transitory computer-readable medium described herein, the broadcast data may include broadcast data specific to a single basic service set (BSS). In these examples, the method, apparatuses, and non-transitory computer-readable medium described herein may further include operations, features, means, or instructions for transmitting broadcast data for a set of BSSs to the receiving STA in at least a third resource unit of the set of resource units, where at least a portion of transmitting the unicast data, the broadcast data specific to the single BSS, and the broadcast data for the set of BSSs occur simultaneously.

In some examples of the method, apparatuses, and non-transitory computer-readable medium described herein, the transmitting includes transmitting the data on a data channel and the communicating includes transmitting service information on a control channel.

In some examples of the method, apparatuses, and non-transitory computer-readable medium described herein, the data includes a long physical layer convergence procedure (PLCP) protocol data unit (PPDU) including a set of PLCP service data units (PSDUs), each PSDU separated by a midamble. The service information may be transmitted during one or more periodic service periods. In some examples of the method, apparatuses, and non-transitory computer-readable medium described herein, the service information indicates one or more STAs for data reception on one or more data channels, timing for the data reception on the one or more data channels, parameters for a next midamble, or a combination.

Some examples of the method, apparatuses, and non-transitory computer-readable medium described herein may further include operations, features, means, or instructions for maintaining access to the data channel during each midamble separating the set of PSDUs. Some examples of the method, apparatuses, and non-transitory computer-readable medium described herein may further include operations, features, means, or instructions for identifying an absence of interframe spacing (IFS) being scheduled on the data channel, and skipping performing a contention procedure for the data channel based on the absence of the IFS, where the access is maintained on the data channel based on the skipping.

Some examples of the method, apparatuses, and non-transitory computer-readable medium described herein may further include operations, features, means, or instructions for receiving feedback information from the receiving STA on the control channel based on the service information, where the feedback information includes an ACK/NACK message, a BQR, a CQI report, or a combination for the data channel.

Some examples of the method, apparatuses, and non-transitory computer-readable medium described herein may further include operations, features, means, or instructions for updating an additional data transmission to the receiving STA based on the feedback information.

Some examples of the method, apparatuses, and non-transitory computer-readable medium described herein may further include operations, features, means, or instructions for identifying missing data for the receiving STA based on the feedback information and adding the missing data to a data queue for transmission to the receiving STA. Some examples of the method, apparatuses, and non-transitory computer-readable medium described herein may further include operations, features, means, or instructions for adapting a coding rate for the additional data transmission based on the feedback information.

Some examples of the method, apparatuses, and non-transitory computer-readable medium described herein may further include operations, features, means, or instructions for handling the feedback information based on an on-going data transmission on the data channel.

Some examples of the method, apparatuses, and non-transitory computer-readable medium described herein may further include operations, features, means, or instructions for monitoring for the feedback information on the control channel, identifying that a feedback timeout period may have elapsed and monitoring for the feedback information on the data channel based on identifying that the feedback timeout period may have elapsed.

Some examples of the method, apparatuses, and non-transitory computer-readable medium described herein may further include operations, features, means, or instructions for performing an add block acknowledgement (ADDBA) setup procedure with the receiving STA, where the ADDBA setup procedure indicates whether the corresponding block acknowledgement (BA) session applies to the data channel, the control channel, or both.

In some examples of the method, apparatuses, and non-transitory computer-readable medium described herein, assigning the set of resource units further may include operations, features, means, or instructions for assigning a set of resource units for a multi-user (MU) PPDU to one or more STAs, where the set of resource units includes the set of resource units.

In some examples of the method, apparatuses, and non-transitory computer-readable medium described herein, the set of resource units further includes one or more additional resource units for communication with one or more additional STAs. In some examples of the method, apparatuses, and non-transitory computer-readable medium described herein, the second resource unit includes a broadcast resource unit.

In some examples of the method, apparatuses, and non-transitory computer-readable medium described herein, assigning the set of resource units further may include operations, features, means, or instructions for puncturing a single user (SU) PPDU to generate a set of discontinuous sub-channels, where the first resource unit corresponds to a first discontinuous sub-channel of the set of discontinuous sub-channels and the second resource unit corresponds to a second discontinuous sub-channel of the set of discontinuous sub-channels.

Some examples of the method, apparatuses, and non-transitory computer-readable medium described herein may further include operations, features, means, or instructions for indicating, to the receiving STA, support for at least the portion of the transmitting and at least the portion of the communicating occurring simultaneously.

In some examples of the method, apparatuses, and non-transitory computer-readable medium described herein, assigning the set of resource units further may include operations, features, means, or instructions for assigning a packet to each resource unit of the set of resource units based on a bandwidth of each resource unit.

In some examples of the method, apparatuses, and non-transitory computer-readable medium described herein, the first resource unit may include a first bandwidth and the second resource unit may include a second bandwidth greater than the first bandwidth. Some examples of the method, apparatuses, and non-transitory computer-readable medium described herein may further include operations, features, means, or instructions for assigning a first packet to at least the first resource unit and a second packet longer than the first packet to at least the second resource unit based on the second bandwidth being greater than the first bandwidth.

In some examples of the method, apparatuses, and non-transitory computer-readable medium described herein, communicating with the receiving STA in at least the second resource unit may include operations, features, means, or instructions for transmitting a GroupCast with Retries multi-user block acknowledgement request (GCR-MU BAR) in the second resource unit and receiving, from the receiving STA, an ACK/NACK message based on the GCR-MU BAR.

A method of wireless communications is described. The method may include identifying a set of resource units for communication with a transmitting STA, receiving data from the transmitting STA in at least a first resource unit of the set of resource units, and communicating with the transmitting STA in at least a second resource unit of the set of resource units, where the communicating includes receiving or transmitting information that is different from the received data of the first resource unit, and where at least a portion of data is received simultaneously with receiving or transmitting a portion of the information communicated with the transmitting STA.

An apparatus for wireless communications is described. The apparatus may include a first interface, a second interface, and a wireless modem configured to identify a set of resource units for communication with a transmitting STA, obtain over the first interface data received from the transmitting STA in at least a first resource unit of the set of resource units, and communicate with the transmitting STA in at least a second resource unit of the set of resource units, where the communicating includes obtaining over the first interface or outputting over the second interface information that is different from the received data of the first resource unit, and where at least a portion of data is obtained simultaneously with obtaining or outputting a portion of the information communicated with the transmitting STA.

Another apparatus for wireless communications is described. The apparatus may include means for identifying a set of resource units for communication with a transmitting STA, receiving data from the transmitting STA in at least a first resource unit of the set of resource units, and communicating with the transmitting STA in at least a second resource unit of the set of resource units, where the communicating includes receiving or transmitting information that is different from the received data of the first resource unit, and where at least a portion of data is received simultaneously with receiving or transmitting a portion of the information communicated with the transmitting STA.

A non-transitory computer-readable medium storing code for wireless communications is described. The code may include instructions executable by a processor to identify a set of resource units for communication with a transmitting STA, receive data from the transmitting STA in at least a first resource unit of the set of resource units, and communicate with the transmitting STA in at least a second resource unit of the set of resource units, where the communicating includes receiving or transmitting information that is different from the received data of the first resource unit, and where at least a portion of data is received simultaneously with receiving or transmitting a portion of the information communicated with the transmitting STA.

In some examples of the method, apparatuses, and non-transitory computer-readable medium described herein, the communicating may include operations, features, means, or instructions for receiving additional information from the transmitting STA in at least the second resource unit of the set of resource units.

Some examples of the method, apparatuses, and non-transitory computer-readable medium described herein may further include operations, features, means, or instructions for decoding the data and the additional information using a set of decode chains, where at least a portion of the decoding the data and at least a portion of the decoding the additional information occur simultaneously.

In some examples of the method, apparatuses, and non-transitory computer-readable medium described herein, the additional information includes control information, management information, or a combination.

In some examples of the method, apparatuses, and non-transitory computer-readable medium described herein, the additional information may include control information. Some examples of the method, apparatuses, and non-transitory computer-readable medium described herein may further include operations, features, means, or instructions for receiving management information from the transmitting STA in at least a third resource unit of the set of resource units, where at least a portion of receiving the data, the control information, and the management information occur simultaneously.

Some examples of the method, apparatuses, and non-transitory computer-readable medium described herein may further include operations, features, means, or instructions for receiving, from the transmitting STA, an indication of the second resource unit, where the indication includes a broadcast ID or a special resource unit ID that indicates the second resource unit contains control information or management information.

In some examples of the method, apparatuses, and non-transitory computer-readable medium described herein, the data includes unicast data and the additional information includes broadcast data.

In some examples of the method, apparatuses, and non-transitory computer-readable medium described herein, the second resource unit includes a primary bandwidth for the transmitting STA.

In some examples of the method, apparatuses, and non-transitory computer-readable medium described herein, the receiving includes receiving the data on a data channel and the communicating includes receiving service information on a control channel.

In some examples of the method, apparatuses, and non-transitory computer-readable medium described herein, the data includes a long PPDU including a set of PSDUs, each PSDU separated by a midamble and the service information may be received during one or more periodic service periods.

Some examples of the method, apparatuses, and non-transitory computer-readable medium described herein may further include operations, features, means, or instructions for transitioning to a first power mode for receiving the service information during the one or more periodic service periods and transitioning to a second power mode based on the service information, where the second power mode may be different from the first power mode.

In some examples of the method, apparatuses, and non-transitory computer-readable medium described herein, the service information indicates timing for data reception on the data channel, parameters for a next midamble, or a combination.

Some examples of the method, apparatuses, and non-transitory computer-readable medium described herein may further include operations, features, means, or instructions for transmitting feedback information to the transmitting STA on the control channel or on the data channel based on the service information, where the feedback information includes an ACK/NACK message, a BQR, a CQI report, or a combination for the data channel.

Some examples of the method, apparatuses, and non-transitory computer-readable medium described herein may further include operations, features, means, or instructions for transmitting feedback information to the transmitting STA on the control channel, where the feedback information comprises a positive or negative acknowledgement (ACK/NACK) message, and performing an add block acknowledgement (ADDBA) setup procedure with the receiving STA, where the ADDBA setup procedure indicates whether a corresponding block acknowledgement (BA) session applies to the data channel, the control channel, or both.

Some examples of the method, apparatuses, and non-transitory computer-readable medium described herein may further include operations, features, means, or instructions for modifying the feedback information based on an ongoing data transmission on the data channel.

Some examples of the method, apparatuses, and non-transitory computer-readable medium described herein may further include operations, features, means, or instructions for performing a contention procedure on the control channel to transmit the feedback information, identifying that a feedback timeout period may have elapsed prior to transmitting the feedback information and transmitting the feedback information during a transmission opportunity (TxOp) on the data channel based on identifying that the feedback timeout period may have elapsed.

Some examples of the method, apparatuses, and non-transitory computer-readable medium described herein may further include operations, features, means, or instructions for indicating, to the transmitting STA, support for at least the portion of the receiving and at least the portion of the communicating occurring simultaneously.

In some examples of the method, apparatuses, and non-transitory computer-readable medium described herein, communicating with the transmitting STA in at least the second resource unit may include operations, features, means, or instructions for receiving a GCR-MU BAR in the second resource unit and transmitting, to the transmitting STA, an ACK/NACK message based on the GCR-MU BAR.

DETAILED DESCRIPTION

Figure 1:
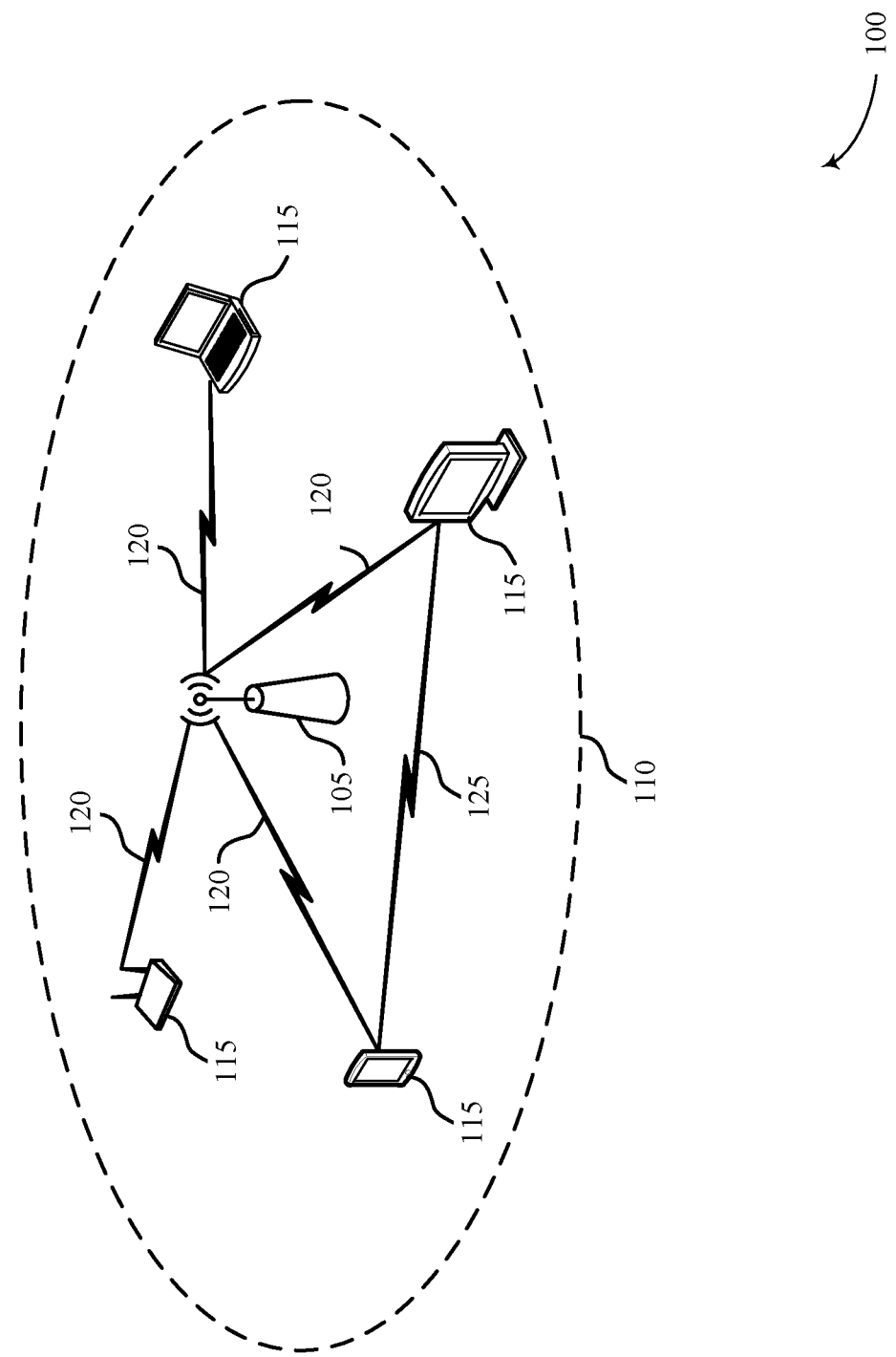
FIGS. 1 and 2 illustrate examples of wireless communications systems that support data channel and control/management channel separation in accordance with aspects of the present disclosure.

A wireless communications system may support extremely high throughput (EHT) functionality (e.g., next generation Wi-Fi functionality), and support an increased level of throughput between stations (STAs) for data, control, and/or management information. An EHT system may support a transmitting STA (e.g., access point (AP)) assigning multiple resource units for communication with a receiving STA (e.g., a mobile STA). The multiple resource units may support simultaneous transmission, simultaneous reception, or simultaneous transmission and reception for a STA.

For example, multi-band aggregation may enable the STAs to establish more than one link over separate bands or channels. In other examples, enhanced single-user (SU) preamble puncturing may enable a transmitting STA to simultaneously transmit different content to the same receiving STA on disjoint sub-channels. Simultaneous transmission may refer to any two transmissions where at least a portion of the first transmission overlaps in time with at least a portion of the second transmission. In other examples, a transmitting STA may assign multiple resource units (e.g., in a multi-resource unit assignment procedure) to a single receiving STA. In other examples, a full duplex configuration for a STA may allow the STA to simultaneously transmit and receive signals. Any of the above examples may be described as a transmitting STA assigning multiple resource units for communication with a receiving STA, where the different resource units may correspond to different directed resource units, different disjoint sub-channels, different unicast and broadcast channels, etc. Additionally or alternatively, simultaneous communication may be supported by multiple encode and/or decode chains configured at the STA.

In some examples, when a transmitting STA transmits information in a first resource unit and simultaneously communicates in a second resource unit, the STA may separate communicating data from communicating control and/or management information in the different resource units. For example, the transmitting STA may transmit data in a first set of resource units (e.g., on a data channel) to a receiving STA, while communicating different information in a second set of resource units (e.g., on a control channel). In some examples, the data channel may correspond to a high-bandwidth channel (e.g., 80 MHz, 160 MHz, 320 MHz, etc.) in order to support increased throughput for data transmission. Additionally or alternatively, the control channel may correspond to a narrow-bandwidth channel (e.g., 20 MHz) to increase robustness and range for control transmission. The simultaneous communicating on the control channel may involve the STA transmitting control information to the receiving STA or receiving feedback information from the receiving STA. In some examples, the transmitting STA may modify a subsequent data transmission based on the received feedback information. By simultaneously communicating different information over different channels (e.g., over a data channel and a control/management channel), the STAs may improve communication throughput while reducing feedback latency in the system.

Aspects of the disclosure are initially described in the context of wireless communications systems. Further aspects of the disclosure are described with respect to systems enabling the separation of different channels, a communication timeline, and feedback procedures. Additional aspects of the disclosure are illustrated by and described with reference to apparatus diagrams, system diagrams, and flowcharts that relate to data channel and control/management channel separation.

FIG. 1 illustrates an example of a wireless communications system 100 that supports data channel and control/management channel separation in accordance with aspects of the present disclosure. The wireless communications system 100 may be an example of a wireless local area network (WLAN) 100—also known as a Wi-Fi network—configured in accordance with various aspects of the present disclosure. The WLAN 100 may include an AP 105 and multiple associated STAs 115, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated stations 115 may represent a basic service set (BSS) or an extended service set (ESS). The various STAs 115 in the network are able to communicate with one another through the AP 105. Also shown is a coverage area 110 of the AP 105, which may represent a basic service area (BSA) of the WLAN 100. An extended network station (not shown) associated with the WLAN 100 may be coupled with a wired or wireless distribution system that may allow multiple APs 105 to be connected in an ESS.

Although not shown in FIG. 1, a STA 115 may be located in the intersection of more than one coverage area 110 and may associate with more than one AP 105. A single AP 105 and an associated set of STAs 115 may be referred to as a BSS. An ESS is a set of connected BSSs. A distribution system (not shown) may be used to connect APs 105 in an ESS. In some examples, the coverage area 110 of an AP 105 may be divided into sectors (also not shown). The WLAN 100 may include APs 105 of different types (e.g., metropolitan area, home network, etc.) with varying and overlapping coverage areas 110. Two STAs 115 may communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other examples, peer-to-peer connections or ad hoc networks may be implemented within WLAN 100.

In some examples, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. The communication may result in colliding transmissions for the two STAs 115 in a contention-based environment (e.g., carrier-sense multiple access with collision avoidance (CSMA/CA)) because the STAs 115 may not refrain from transmitting on top of each other. A STA 115 whose transmissions are not identifiable, but that is within the same coverage area 110 may be known as a hidden node. CSMA/CA may be supplemented by the exchange of a request to send (RTS) packet transmitted by a sending STA 115 (or AP 105) and a clear to send (CTS) packet transmitted by the receiving STA 115 (or AP 105). The exchange may alert other devices within range of the sender and receiver not to transmit for the duration of the primary transmission. Thus, RTS/CTS may help mitigate a hidden node problem. In some examples, either a STA 115 or an AP 105 transmitting a signal may be referred to as a transmitting STA, and either a STA 115 or an AP 105 receiving the signal may be referred to as a receiving STA. While many examples of the communication described below is illustrated in the downlink, it is to be understood that the same concepts may apply in the uplink, between different APs 105, between different STAs 115, or between any other devices in a Wi-Fi system supporting data channel and control/management channel separation.

Some wireless communications systems 100 may support extremely high throughput (EHT) functionality (e.g., next generation Wi-Fi functionality). These wireless communications systems 100 may support an increased level of throughput between STAs (e.g., on the uplink or downlink over direct wireless links 120 or between mobile STAs over direct wireless links 125) for data, control, and/or management information. An EHT system may support a transmitting STA (e.g., AP 105) assigning multiple resource units for communication with a receiving STA (e.g., a STA 115). These multiple resource units may support simultaneous transmission, simultaneous reception, or simultaneous transmission and reception for a STA (e.g., any wireless device operating within the system, such as an AP 105, STA 115, or any other similar device).

A transmitting STA may operate in a single user (SU) mode or a multi-user (MU) mode. In some examples, as part of a SU mode, the transmitting STA (e.g., AP 105) may transmit to or receive data from one receiving STA over a channel (e.g., a 20 MHz channel, a 40 MHz channel, etc.) at a time. The channel may include tones (also referred to as subcarriers) within the frequency band of the channel. In this example, orthogonal frequency-division multiplexing (OFDM) is used for transmissions between the transmitting STA and the receiving STA. In other examples, as part of a MU mode, the transmitting STA may transmit or receive data concurrently from multiple receiving STAs over a channel (e.g., a 20 MHz channel, a 40 MH channel, etc.) using, for example, orthogonal frequency-division multiple access (OFDMA). In the MU mode, a channel may be divided (partitioned) into multiple resource units, where each resource unit comprises a respective subset of the tones (also referred to as subcarriers) of the channel. For example, a 20 MHz channel may be divided into nine 26-tone resource units, four 52-tone resource units, or two 106-tone resource units. Additionally or alternatively, channels having different bandwidths (e.g., 40 MHz channel, 80 MHz channel, 160 MHz channel, 320 MHz channel, etc.) may also be divided into resource units. In some examples, the channel may be divided into resource units of different sizes. For example, a 20 MHz channel may be divided into five 26-tone resource units and two 52-tone resource units. In some examples, the set of tones for a resource unit may be contiguous (i.e., the tones in the set of tones are consecutive) or non-contiguous (i.e., tones in the set of tones are spaced apart by one or more intervening tones in the channel that do not belong to the resource unit (e.g., one or more intervening tones assigned to another RU)).

In some examples, a MU multi-band aggregation may enable the STAs to establish more than one link over separate bands or channels. For example, STAs may transmit or receive control signals and data on separate channels. In some examples, data may be transmitted on a high-bandwidth data channel (e.g., a channel having a bandwidth of 80 MHz, 160 MHz, 320 MHz, etc.) for high data throughput. Control signals may be transmitted on a narrow-bandwidth control channel (e.g., a channel having a bandwidth of 20 MHz). The narrow bandwidth of the control channel may increase the robustness and range of the control channel. For example, the narrow bandwidth may support the transmit power of the control channel being spread over a narrower bandwidth, increasing the transmit power spectral density of the control channel. Also, control information for data packets on the data channel may be moved from the data packets to the control channel to reduce overhead in the data packets. In one example, the data channel may be located in a 5 GHz or a 6 GHz frequency band, and the control channel may be located in a 2.4 GHz, a low-5 GHz or a 900 MHz frequency band. In one example, the data channel has a wider bandwidth than the control channel (e.g., a bandwidth that is two time greater, four times greater, etc.).

In other examples, enhanced SU preamble puncturing may enable a transmitting STA to simultaneously transmit different content to the same receiving STA on disjoint sub-channels. Simultaneous transmission may refer to any two transmissions where at least a portion of the first transmission overlaps in time with at least a portion of the second transmission. In some examples, the EHT system may support an extended operating bandwidth for transmission between STAs (e.g., 320 MHz), which may benefit the puncturing enhancements (e.g., the larger bandwidth may support a greater number of resources for communication in each of the disjoint sub-channels). In other examples, a transmitting STA may assign multiple resource units (e.g., in a multi-resource unit assignment procedure) to a single receiving STA. In other examples, a full duplex configuration for a STA may allow the STA to simultaneously transmit and receive signals. The full duplex configuration may allow an AP 105 may establish separate uplink and downlink communication links with one or more STAs 115. For example, AP 105 may simultaneously communicate on the uplink and downlink with a specific STA 115, or may simultaneously transmit on the downlink to one STA 115 and receive on the uplink from a different STA 115. Any of the above examples may be described as a transmitting STA assigning multiple resource units for communication with a receiving STA, where the different resource units may correspond to different directed resource units, different disjoint sub-channels, different unicast and broadcast channels, etc.

In some examples, STAs in the wireless communications system 100 may support multiple simultaneous communications, while other STAs may not support multiple simultaneous communications. For example, AP 105 may support transmitting to different STAs 115 simultaneously, receiving signals from multiple STAs 115 simultaneously, or transmitting to one or more STAs 115 while simultaneously receiving information from one or more STAs 115. However, the STAs 115 may support single communications at a temporal instance. For example, each STA 115 may either transmit signals or receive signals at each instance in time, but may not do both. In other examples, both AP 105 and the STAs 115 may support multiple communications simultaneously.

If a transmitting STA transmits information in a first resource unit and simultaneously communicates in a second resource unit, the STA may separate communicating data from communicating control and/or management information in the different resource units. The wireless communications system 100 may support one or more schemes for data channel and control/management channel separation based on the multi-resource unit assignment.

Figure 2:
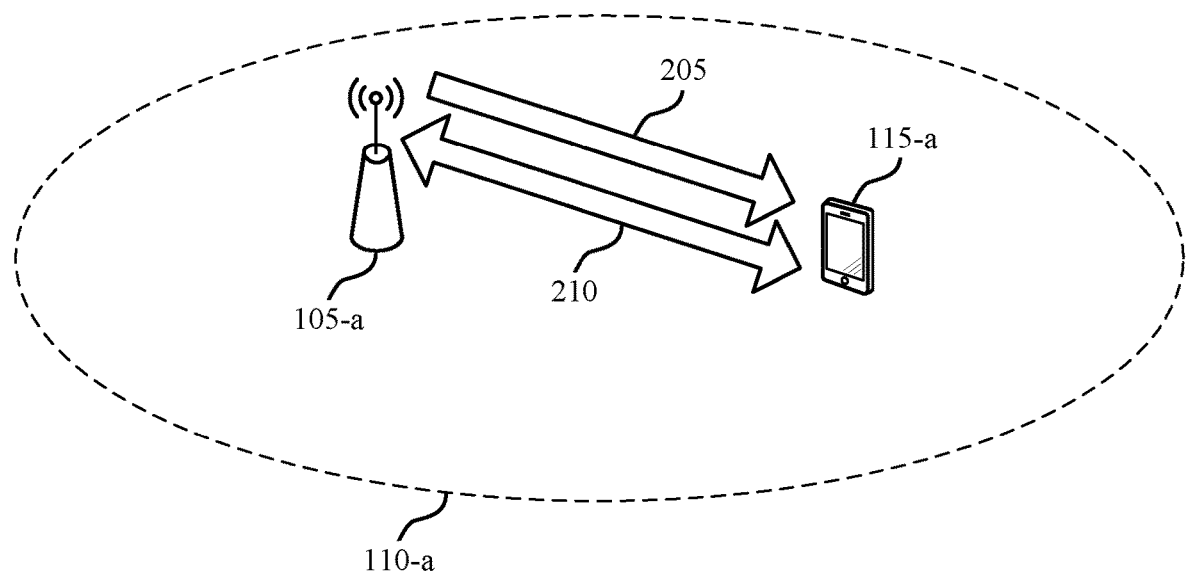

FIG. 2 illustrates an example of a wireless communications system 200 that supports data channel and control/management channel separation in accordance with aspects of the present disclosure. In some examples, the wireless communications system 200 may implement aspects of wireless communications system 100. For example, the wireless communications system 200 may include AP 105-a and STA 115-a, which may be examples of an AP 105 and a STA 115, respectively, as described with reference to FIG. 1. AP 105-a may support coverage area 110-a. As described below, AP 105-a may act as a transmitting STA and STA 115-a may act as a receiving STA. However, other combinations of APs 105 and STAs 115 may perform the functionality described below with respect to transmitting STAs and receiving STAs.

In the wireless communications system 200 (e.g., a Wi-Fi system, such as an EHT system), the transmitting STA (e.g., AP 105-a) may assign resource units for communication with a receiving STA (e.g., STA 115-a). The transmitting STA may transmit data (e.g., in a data channel 205) to the receiving STA in a first set of resource units, which may contain a single resource unit or multiple resource units, based on the assigned resources. Simultaneously, the transmitting STA may communicate with the receiving STA in a second set of resource units. In some examples, the communication may involve transmitting data in a second data channel. In other examples, the communication may involve transmitting control or management information in a control/management channel 210. In other examples, the communication may involve receiving information from the receiving STA (e.g., feedback information corresponding to the data transmission on the data channel 205). As a result, the wireless communications system 200 may support the separation of the data channel 205 from the control/management channel(s) 210 for higher throughput between two STAs. The multiple resource unit assignment may support assigning multiple resources in time, frequency, or time and frequency for communication with a same STA.

Figure 3:
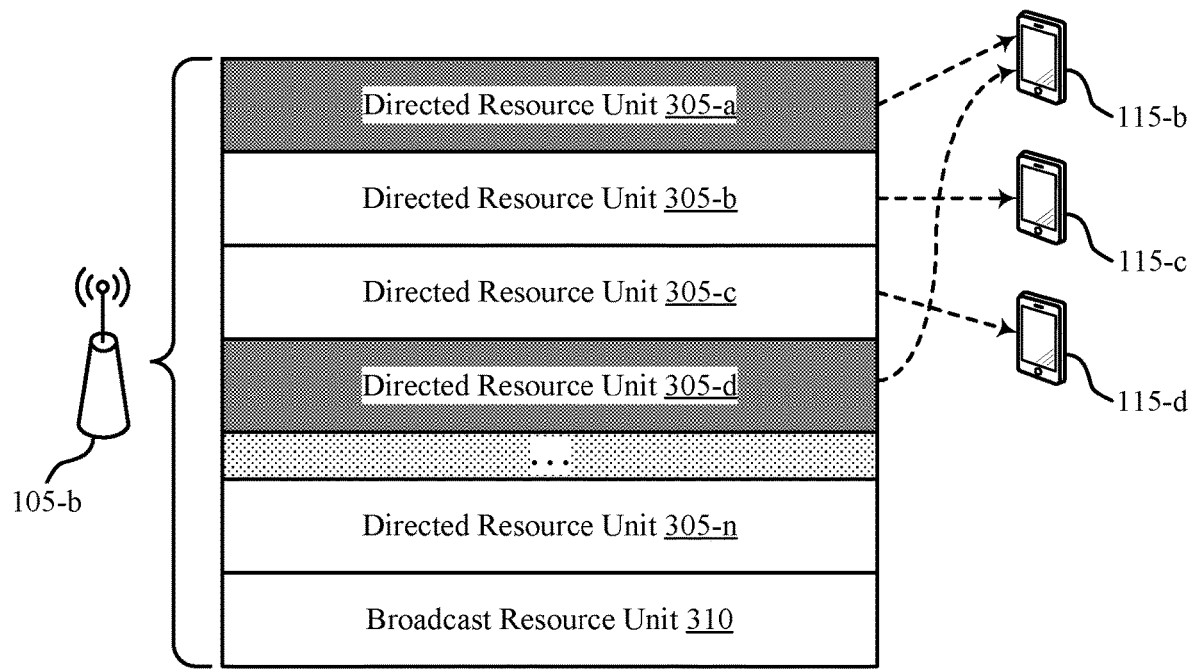
FIG. 3 illustrates an example of a system for multi-resource unit assignment that supports data channel and control/management channel separation in accordance with aspects of the present disclosure.

FIG. 3 illustrates an example of a system 300 for multi-resource unit assignment that supports data channel and control/management channel separation in accordance with aspects of the present disclosure. In some examples, system 300 may implement aspects of wireless communication systems 100 and 200 as described with reference to FIGS. 1 and 2. The system 300 may include AP 105-b and one or more STAs 115 (e.g., STAs 115-b, 115-c, and 115-d), where AP 105-b is an example of a transmitting STA and the one or more STAs 115 are examples of receiving STAs. In some examples, other types of transmitting and receiving STAs may perform similar multi-resource unit assignment procedures as those described below.

AP 105-b—or any other transmitting STA or device—may assign resource units to different STAs in a multi-user (MU) physical layer convergence procedure (PLCP) protocol data unit (PPDU). A resource unit 305 may refer to a smallest sub-channel supported for communication between STAs (e.g., in some examples, 26 subcarriers). The MU PPDU may be an example of a downlink MU PPDU or an uplink MU PPDU. As illustrated, the MU PPDU may include one or more directed resource units 305, where each directed resource unit 305 is for a specific receiving STA (e.g., a STA 115). AP 105-b may assign a STA identifier (ID) to each directed resource unit 305 in order to indicate the STA 115 corresponding to that resource unit 305. For example, AP 105-b may assign directed resource unit 305-a to STA 115-b, directed resource unit 305-b to STA 115-c, and directed resource unit 305-c to STA 115-d. Each STA 115 may tune to and monitor the assigned resource unit 305 for information transmitted to the STA 115. For example, STA 115-b may monitor directed resource unit 305-a for a transmission, and may decode a PPDU received in the assigned resource unit 305-a.

To support EHT, AP 105-b may assign multiple resource units 305 in the same MU PPDU to a single STA 115. For example, as illustrated, AP 105-b may assign directed resource unit 305-d to STA 115-b (e.g., in addition to assigned resource unit 305-a). In some examples, the directed resource units 305 assigned to a same STA 115 may be examples of orthogonal resource units. In some examples, by assigning multiple directed resource units 305 to a single receiving STA, AP 105-b may simultaneously transmit different information in directed resource units 305-a and 305-d to receiving STA 115-b. STA 115-b may contain multiple decode chains to receive and process multiple PPDUs simultaneously (e.g., PPDUs received in directed resource unit 305-a and directed resource unit 305-b). In other examples, by assigning multiple directed resource units 305 to a single receiving STA, AP 105-b may simultaneously receive different information in directed resources units 305-a and 305-b for uplink transmission from the receiving STA 115-b. In some examples, handling this simultaneous reception may involve complex decode circuitry, receive logic, or both installed for STA 115-b. Using multiple decode chains or branching decode chains, a receiving STA may accurately receive information simultaneously over multiple resource units 305.

In some examples, AP 105-b, a STA 115, or both may indicate whether the STA is capable of simultaneous transmission, reception, or communication. For example, STA 115-b may set a bit in a capabilities element to a specific value (e.g., a bit value of 1) based on a support for simultaneous reception over multiple resource units 305. STA 115-b may transmit an indication of the capabilities element to AP 105-b, and AP 105-b may assign multiple directed resource units 305 in the same MU PPDU to STA 115-b based on the indicated capabilities of STA 115-b. In some examples, a single bit may be used to identify capabilities for simultaneous communication. In other examples, separate bits may be used to identify whether a STA may perform multiple transmissions simultaneously, receive multiple transmissions simultaneously, receive one or more transmissions while sending one or more transmissions simultaneously, etc.

In some examples, as part of an uplink MU PPDU, the AP 105-b may transmit a trigger frame to STAs 115 to trigger and coordinate uplink transmissions from the STAs 115 as part of an HE trigger-based PPDU (HE TB PPDU). The trigger frame may indicate the resource unit assignments for the STAs 115. The trigger frame may also include uplink power control information for STAs 115 to equalize the power that the AP 105-b may receive. The trigger frame may also indicate a time duration (i.e., length) and a start time of the uplink transmissions so that the transmissions by the STAs 115 are approximately aligned in time (e.g., STA 115-b, 115-c, and 115-d transmit data concurrently to the AP 105-b). In response to the trigger frame, STAs 115 may transmit uplink data to the AP 105-b as part of the uplink MU PPDU. The uplink MU PPDU may correspond to an HE TB PPDU using OFDMA.

In some examples, as part of a downlink MU PPDU, if a STA 115 receives information in one or more directed resource units 305, the STA 115 may forgo monitoring (i.e., the STA 115 may ignore) a broadcast resource unit 310 included in the MU PPDU. In these examples, AP 105-b may utilize the broadcast resource unit 310 for communicating information to STAs 115 that are not assigned directed resource units 305. In other examples, a STA 115 may decode a frame carried in the broadcast resource unit 310 even if the STA 115 received information in one or more directed resource units 305 in the same MU PPDU. In these examples, AP 105-b may include indicators in the broadcast resource unit 310 indicating one or more STAs 115 that the transmitted information is intended for. For example, AP 105-b may assign directed resource units 305-a through 305-n to different STAs 115 or sets of STAs 115 (e.g., a single resource unit 305 may be assigned to multiple STAs 115 if the PPDU transmitted in that resource unit 305 is intended for all of the assigned STAs 115). A receiving STA 115 may simultaneously monitor for transmissions in the directed resource units 305 assigned to that receiving STA 115, as well as for any transmission in the broadcast resource unit 310.

Figure 4:
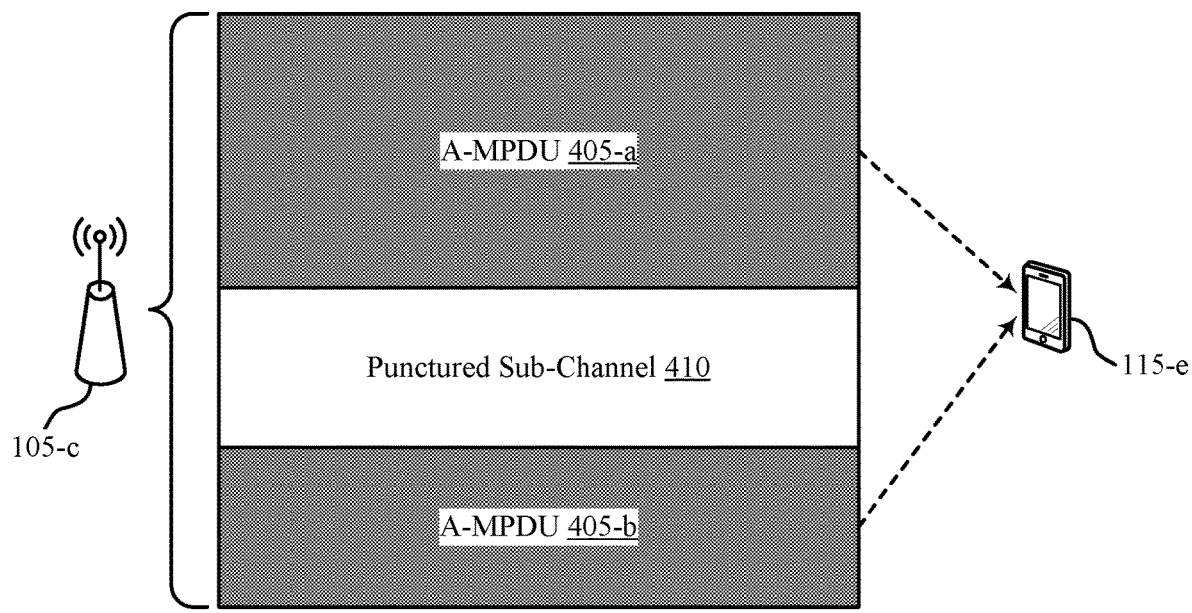
FIG. 4 illustrates an example of a system for single-user (SU) physical layer convergence procedure (PLCP) protocol data unit (PPDU) that supports data channel and control/management channel separation in accordance with aspects of the present disclosure.

FIG. 4 illustrates an example of a system 400 for single-user (SU) PPDU puncturing that supports data channel and control/management channel separation in accordance with aspects of the present disclosure. In some examples, system 400 may implement aspects of wireless communications system 100 or 200. For example, the system 400 may include AP 105-c and STA 115-e, which may be examples of a transmitting STA and a receiving STA as described with reference to FIGS. 1 through 3. In some examples, other types of transmitting and receiving STAs may perform puncturing procedures, such as those described below.

AP 105-c may transmit information to STA 115-e in an SU PPDU. In some examples, the SU PPDU may be an example of a directed resource unit assigned specifically for STA 115-e (e.g., as described above with respect to FIG. 3) or may be independent of an MU PPDU. In some examples, AP 105-c may puncture a portion of the SU PPDU (e.g., based on identifying that the punctured portion is busy, unavailable, or exceeds a level of interference during the transmission of the SU PPDU). For example, AP 105-c may not transmit to STA 115-e in the punctured sub-channel 410. Instead, AP 105-c may communicate with STA 115-e in the disjoint sub-channels split by the punctured sub-channel 410. In some examples, the disjoint sub-channels may be referred to as aggregate medium access control (MAC) protocol data units (A-MPDUs 405). Enhanced SU puncturing—which may be referred to as enhanced preamble puncturing—may involve the transmitting STA, AP 105-c, transmitting different content in A-MPDU 405-a and A-MPDU 405-b to the same receiving STA, STA 115-e. The different A-MPDUs 405 may be examples of discontinuous or disjoint sub-channels within a channel for the SU PPDU.

In some examples, with reference to FIGS. 3 and 4, a transmitting STA may assign resource units to receiving STAs based on the size of packets for transmission. For example, an AP 105 may assign a narrow resource unit (e.g., a resource unit with a lower modulation and coding scheme (MCS), a longer range, or both) for short packets to improve robustness of the transmission. The improved robustness may be due to the power concentrated in the narrowband for the resource unit. Additionally or alternatively, the AP 105 may assign a wider resource unit (e.g., a resource unit with a larger bandwidth, a higher data rate, a shorter range, etc.) to a receiving STA for transmission of a longer packet. An AP 105 may apply such an assignment technique when assigning directed resource units 305 to different STAs 115 in an MU PPDU, or when assigning information to be transmitted in A-MPDUs 405 to a same STA 115. For example, a transmitting STA may assign packets for different types of information to different resources based on the bandwidths for those resources. In one specific example, a transmitting STA may transmit data in resource units with wider bands, and may transmit control and/or management information in resource units with narrower bands.

Figure 5:
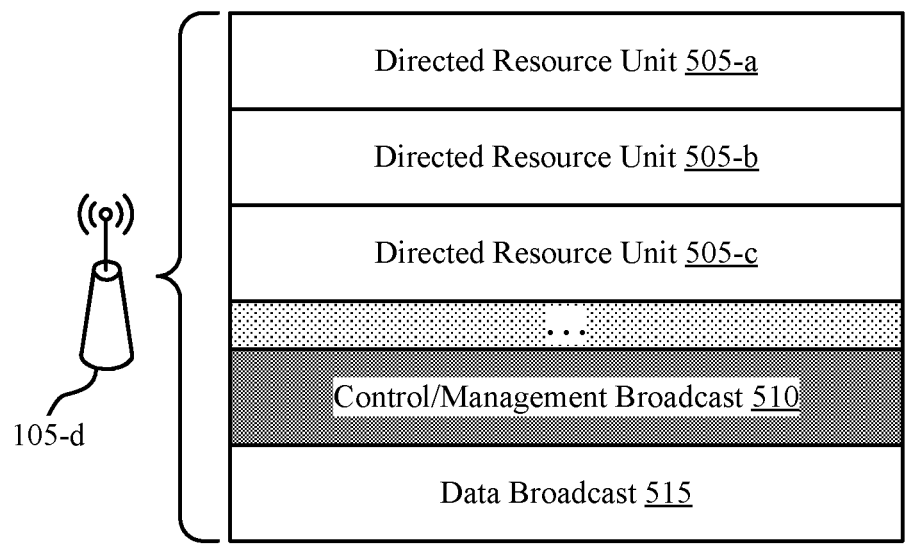
FIG. 5 illustrates an example of a system that supports data channel and control/management channel separation in accordance with aspects of the present disclosure.

FIG. 5 illustrates an example of a system 500 that supports data channel and control/management channel separation in accordance with aspects of the present disclosure. In some examples, system 500 may implement aspects of wireless communications system 100 or 200. For example, the system 500 may include AP 105-d, which may be an example of a transmitting STA as described with reference to FIGS. 1 through 4. The transmitting STA may communicate with one or more receiving STAs (not pictured). In some examples, other types of transmitting and receiving STAs may perform similar procedures for separating types of content as those described below.

AP 105-d may assign different resource units for transmitting information to different STAs. For example, AP 105-d may transmit a first PPDU for a first receiving STA in directed resource unit 505-a, a second PPDU for a second receiving STA in directed resource unit 505-b, and a third PPDU for a third receiving STA in directed resource unit 505-c. In some examples, each resource unit 505 may be assigned to a different receiving STA. In other examples, AP 105-d may assign multiple directed resource units 505 to a same receiving STA (as described above with respect to FIG. 3). The information transmitted in the directed resource units 505 may be an example of unicast data. That is, AP 105-d may transmit data to a receiving STA in directed resource 505-a over a unicast data channel. Additionally or alternatively, AP 105-d may transmit broadcast data in a resource unit for a data broadcast 515. The transmitting STA (e.g., AP 105-d) may simultaneously transmit the unicast data on one or more resource units while transmitting the broadcast data on one or more different resource units.

The transmitting STA—that is, in this example, AP 105-d—may transmit control and/or management information in one or more resource units assigned for control/management broadcast 510. The transmitting may involve AP 105-d transmitting a control frame, a management frame, a beacon, or some combination as part of the MU PPDU. For example, the AP 105-d may periodically transmit a beacon to announce its presence to the associated receiving STAs, synchronize timing between AP 105-d and the receiving STAs, or signal the availability of data to the receiving STAs. In another example, AP 105-d and one of the receiving STAs may exchange control signals with one another for authentication. The AP 105-d and the receiving STAs may also exchange feedback control signals with one another, in which the AP 105-d and the receiving STAs may provide feedback information to one another to facilitate data transmissions. Examples of feedback information include an acknowledgement (ACK) indicating whether data was successfully received at the AP 105-d or one of the receiving STAs, a channel quality indicator (CQI) indicating the quality of a channel or link, a buffer status report indicating an amount of buffered data for transmission, or a resource request requesting resources for a transmission.

In some examples, AP 105-d may contain a primary bandwidth (e.g., a primary 20 MHz). This primary bandwidth may be independent of the operating bandwidth for the AP 105. AP 105-d may transmit the control/management broadcast 510 in resource units corresponding to this primary bandwidth. In some examples, AP 105-d may transmit the control or management information on the primary bandwidth, in which the information is transmitted in resources spanning the entire bandwidth (e.g., the full 20 MHz). For example, the AP 105-d may transmit data associated with the directed resource units 505 on a high-bandwidth data channel (e.g., a channel having a bandwidth of 80 MHz, 160 MHz, 320 MHz, etc.) for high data throughput. Additionally or alternatively, the AP 105-d may transmit the control/management broadcast 510 on a narrow-bandwidth control channel (e.g., a channel having a bandwidth of 20 MHz). The narrow bandwidth of the control channel may increase the robustness and range of the control channel due to the control channel being spread over a narrower bandwidth and increasing the transmit power spectral density of the control channel. Also, control information for data packets on the data channel may be moved from the data packets to the control channel to reduce overhead in the data packets.

In some examples, AP 105-d may puncture the MU PPDU to include control signals. For example, the MU PPDU may be punctured so that one or more resource units within the MU PPDU are available for the control or management broadcast 510. AP 105-d may transmit data on some resource units in the MU PPDU while simultaneously transmitting a management frame or control information in other resource units (e.g., the resource units for control/management broadcast 510). In some examples, the receiving STAs may be pre-configured to monitor for control/management information in the primary bandwidth of the transmitting STA. In other examples, AP 105-d may indicate the resource units for the control/management broadcast 510 to the receiving STA(s). In a first option, AP 105-d may utilize a broadcast ID (e.g., with an ID value of 0 or 2047) to signal the resource unit for control/management broadcast 510. In a second option, AP 105-d may utilize a new STA ID value to signal a special resource unit for the control/management broadcast 510 (e.g., a STA ID value other than 0, 2047, or any STA ID value corresponding to a physical STA in the system). In some examples, AP 105-d may assign both control information and management information to a same special resource unit. In other examples, AP 105-d may assign control frames to a first special resource unit and management frames to a second special resource unit (e.g., using different STA ID values).

Figure 6:
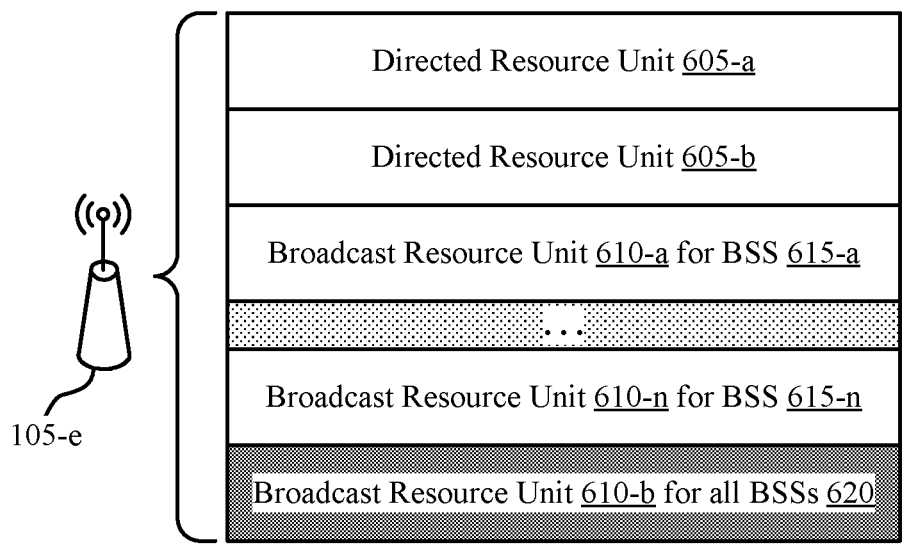
FIG. 6 illustrates an example of a system with multiple basic service sets (BSSs) that supports data channel and control/management channel separation in accordance with aspects of the present disclosure.

FIG. 6 illustrates an example of a system 600 with multiple basic service sets (BSSs) that supports data channel and control/management channel separation in accordance with aspects of the present disclosure. In some examples, system 600 may implement aspects of wireless communications systems 100 or 200. For example, the system 600 may include AP 105-e, which may be an example of a transmitting STA as described with reference to FIGS. 1 through 5. The transmitting STA may communicate with one or more receiving STAs (not pictured). In some examples, other types of transmitting and receiving STAs may perform similar procedures for handling broadcast transmissions for multiple BSSs 615 (e.g., in a multi-BSS broadcast system) as described below.

In some Wi-Fi systems, AP 105-e may support multiple BSSs 615, ESSs, or both. For example, AP 105-e may include or support multiple virtual APs at the same physical device. That is, AP 105-e may operate as a number of separate APs (e.g., 16 virtual APs, 32 virtual APs, etc.), where each virtual AP supports a different BSS 615. In some examples, AP 105-e may support separate resource units for the different BSSs 615 (e.g., where each resource unit corresponds to a BSS ID). AP 105-e may utilize the resource units for broadcast transmissions to specific BSSs 615. In some examples, AP 105-e may additionally or alternatively assign one or more resource units for broadcast transmissions to all BSSs 620 or multiple BSSs 615 of the total set of supported BSSs.

AP 105-e may support multicast transmissions for the supported BSSs 615 in addition to assigning directed resource units 605 for specific receiving STAs. For example, as illustrated, AP 105-e may assign directed resource unit 605-a for data transmissions to a first STA and directed resource unit 605-b for different data transmissions to a second STA. Additionally, AP 105-e may assign broadcast resource unit 610-a for broadcast transmissions to BSS 615-a (e.g., a first BSS corresponding to a first virtual AP implemented by AP 105-e). AP 105-e may assign broadcast resource units 610 up to broadcast resource unit 610-n for broadcast transmissions to BSS 615-n. In some examples, a STA assigned directed resource unit 605-a and operating in BSS 615-a may simultaneously monitor for transmissions in directed resource unit 605-a and broadcast resource unit 610-a corresponding to BSS 615-a. In some examples, the STA—and any other receiving STAs operating within any of the supported BSSs 615—may additionally monitor for transmissions in broadcast resource unit 610-b corresponding to all BSSs 620. In one specific case, AP 105-e may assign STA ID 2047 for the broadcast resource unit 610-b corresponding to all BSSs 620. Under the multi-resource unit scheme, and using all of the assigned resource units, a receiving STA may simultaneously receive unicast transmissions in one or more directed resource units 605, BSS-specific broadcast transmissions in one or more broadcast resource units 610, and global BSS broadcast transmissions in broadcast resource unit 610-b.

Figure 7:
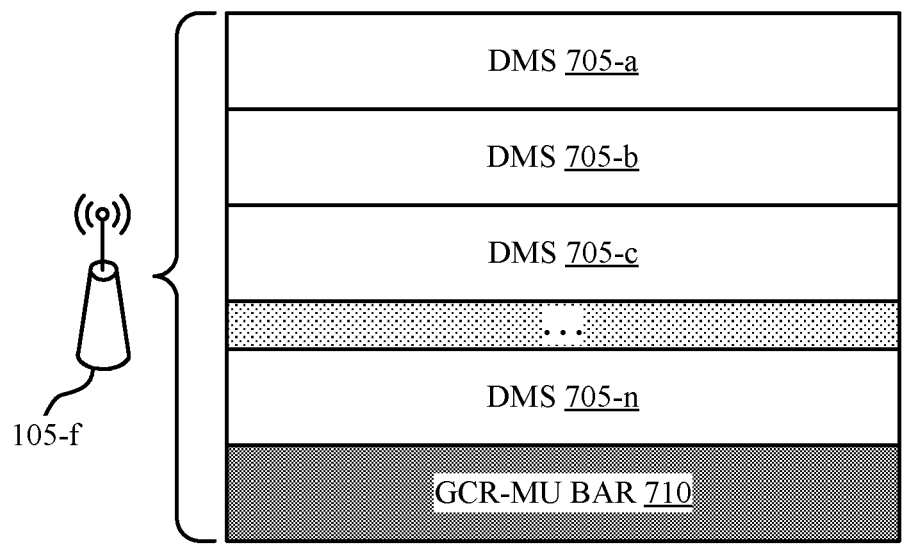
FIG. 7 illustrates an example of a system with GroupCast with Retries (GCR) acknowledgements (ACKs) that supports data channel and control/management channel separation in accordance with aspects of the present disclosure.

FIG. 7 illustrates an example of a system 700 with GroupCast with Retries (GCR) acknowledgements (ACKs) that supports data channel and control/management channel separation in accordance with aspects of the present disclosure. In some examples, system 700 may implement aspects of wireless communications systems 100 or 200. For example, the system 700 may include AP 105-*f*, which may be an example of a transmitting STA as described with reference to FIGS. 1 through 6. The transmitting STA may communicate with one or more receiving STAs (not pictured). In some examples, other types of transmitting and receiving STAs may perform similar procedures for live feedback handling as described below.

In some wireless systems, a transmitting STA (e.g., AP 105-*f*) may transmit multicast data. However, the transmitting STA may utilize a robust audio-video (AV) streaming mechanism to convert the multicast stream of data into multiple individual unicast streams of data. Each of the individual unicast streams may be referred to as a direct multicast stream (DMS) 705, and may be transmitted by the STA to a specific receiving STA. For example, AP 105-*f* may assign DMS 705-*a* to a first receiving STA, DMS 705-*b* to a second receiving STA, DMS 705-*c* to a third receiving STA, etc., up to DMS 705-*n* to an $n^{th}$ STA. In some examples, AP 105-*f* may assign multiple DMSs 705 to a same receiving STA. The transmitting STA may solicit live feedback from each receiving STA to determine whether the DMS 705 was received successfully by that STA.

For example, in one specific multi-resource unit scheme, AP 105-*f* may transmit a GCR-MU block acknowledgement request (BAR) 710 to request feedback information from one or more of the receiving STAs. AP 105-*f* may transmit the GCR-MU BAR 710 on a broadcast resource unit (e.g., a control channel, management channel, or both). In some examples, each receiving STA may monitor the broadcast resource unit, detect the GCR-MU BAR 710, and transmit feedback information to AP 105-*f* in response. This feedback information may be a positive or negative acknowledgement (ACK/NACK) message based on whether that receiving STA successfully received information in the corresponding DMS 705, a bandwidth quality report (BQR), a channel quality indicator (CQI) report, or some combination of this feedback information. In some examples, any STA detecting a request for feedback information (e.g., the GCR-MU BAR 710 on the control channel) may transmit feedback information. In other examples, AP 105-*f* may transmit indications of one or more STA IDs with the feedback request. As described, the STA IDs may correspond to STAs receiving one or more DMSs 705 in the same MU PPDU as the feedback request. For example, a first STA 705-*a* may monitor a first resource unit for data (e.g., a DMS 705-*a* on a data channel) and a second resource unit for a feedback request (e.g., a GCR-MU BAR 710 on a control channel). If the first STA receives the feedback request, the first STA may determine whether the DMS 705-*a* was received and decoded successfully (e.g., according to a decoding check). If the first STA received the DMS 705-*a* successfully, the first STA may transmit an ACK message to AP 105-*f* (e.g., either on the data channel or the control channel). If the first STA failed to successfully receive and decode the DMS 705-*a* successfully, the first STA may transmit a NACK message to AP 105-*f*. In some examples, a feedback request received by a STA may indicate a specific data channel or resource unit to provide feedback for.

Figure 8:
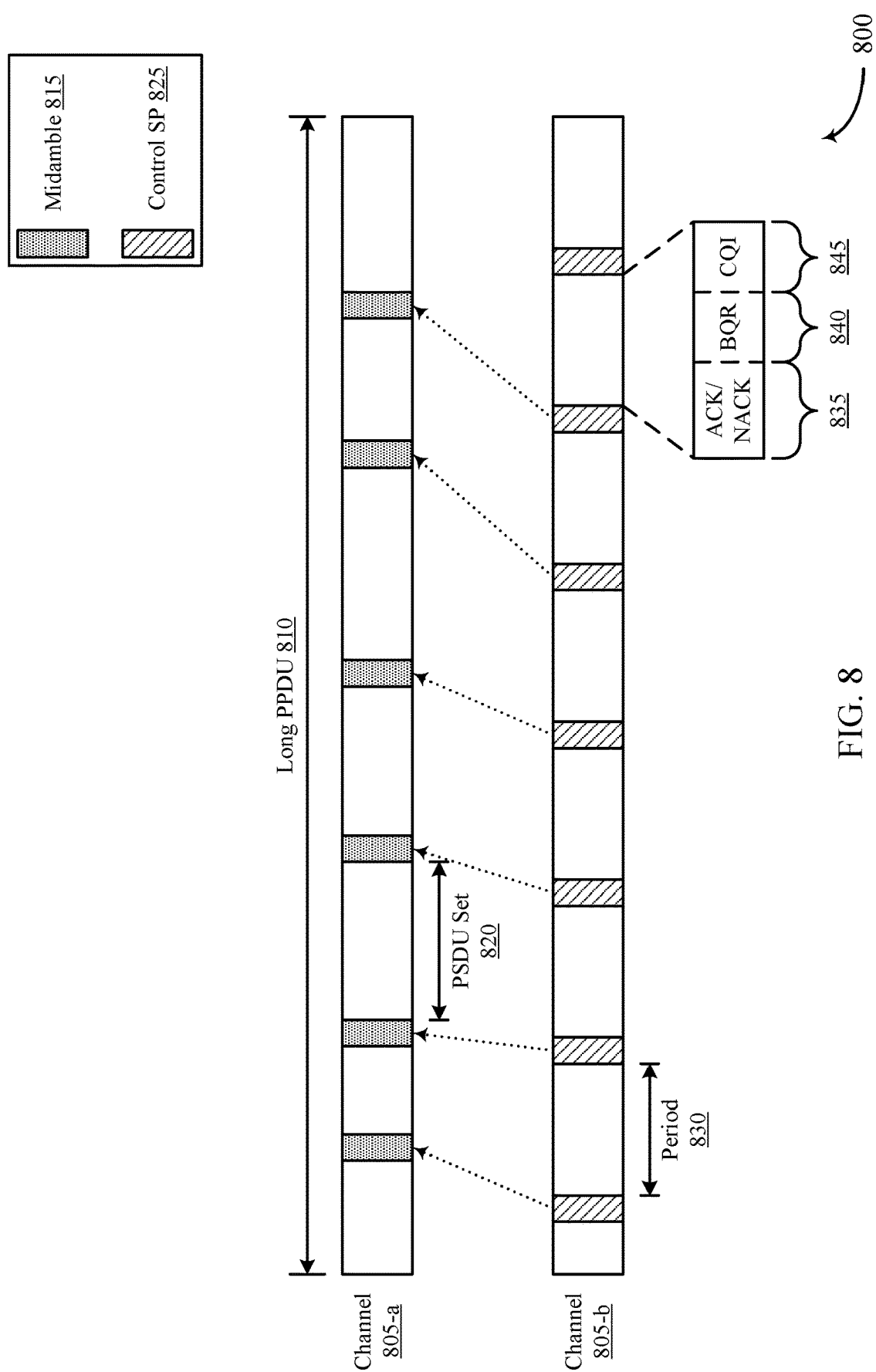
FIG. 8 illustrates an example of a communication timeline that supports data channel and control/management channel separation in accordance with aspects of the present disclosure.

FIG. 8 illustrates an example of a communication timeline 800 that supports data channel and control/management channel separation in accordance with aspects of the present disclosure. In some examples, communication timeline 800 may implement aspects of wireless communications systems 100 or 200. Additionally, communication timeline 800 may support simultaneous communications on separate channels 805-*a* and 805-*b*, which may be examples of a data channel and a control channel, respectively. This separation of data and control/management channels may be achieved based on implementing one or more techniques described above, for example, with respect to FIGS. 3 through 7. Communication timeline 800 may correspond to communications between two STAs (e.g., APs 105, STAs 115, or any other wireless devices in a wireless system) as described above.

Communicating STAs may leverage control-data separation to improve communication efficiency by reducing the interframe spacing (IFS) overhead and may support live feedback by allowing simultaneous communications on separate channels 805. A transmitting STA (e.g., an AP 105) may transmit data on a data channel 805-*a* in a long PPDU 810. The long PPDU 810 on the data channel 805-*a* may carry successive PSDUs transmitted for different STAs without any IFS separation. IFS may serve as a separator between uplink or downlink traffic, and may provide an opportunity for STAs to contend for access to the medium. However, as the transmitting STA is scheduled to transmit multiple PSDU sets 820 consecutively on the downlink (e.g., separated by midambles 815), the transmitting STA may not include any IFS within the long PPDU 810. That is, utilizing a long PPDU 810 instead of multiple PPDUs may allow the transmitting STA to avoid IFS. For example, the long PPDU 810 may contain a number of PSDU sets 820, where each PSDU set 820 is separated by a midamble 815. The midambles 815 may act as delimiters between successive PSDU sets 820. In some examples, the midamble 815 may be an example of a short IFS, where the transmitting STA may maintain access to the medium (e.g., the data channel 805-*a* resources) between PSDU transmissions (i.e., an SIFS may not support a contention procedure for the channel 805-*a*). The midamble 815 may aid in synchronization between the STAs during the long PPDU 810, and may carry some physical header information. Each PSDU (e.g., across sets or within a same set) may be addressed to a STA. A PSDU set 820 may include multiple recipient STAs between successive midambles 815 according to the addressed STAs. PSDU sets 820 may vary in length (e.g., based on an amount of data to send in each PSDU set 820), and, correspondingly, the midambles 815 may not occur at periodic intervals. The length of time (e.g., period) between successive midambles 815 may be referred to as the midamble interval.

The STAs may utilize the control channel 805-*b* to aid in STA scheduling and power-saving, while providing one mechanism for live feedback signaling. The control channel 805-*b* may support signaling in either one direction or both directions while the transmitting STA performs an on-going downlink transmission on the data channel 805-*a*. For example, in some multi-band schemes, the control channel 805-*b* may support transmissions in both directions (e.g., downlink and uplink). In some multi-resource unit with puncturing schemes, the control channel 805-*b* may support transmissions in the downlink, but not in the uplink. In some full duplex schemes, the control channel 805-*b* may support transmissions in the uplink, but not in the downlink.

In some examples, the control channel 805-*b* may include periodic or aperiodic control service periods (SPs) 825. The control SPs 825 may provide scheduling information for receiving STAs, and may occur periodically according to a period 830. Receiving STAs in the system may wake-up (e.g., transition into a higher power mode) during each control SP 825—or for a set number or pattern of control SPs 825—to receive information from the transmitting STA. In the higher power mode, the receiving STAs may monitor the control channel during the control SPs 825 for the control and/or management information. This information may include information about which STAs are scheduled to receive one or more PSDUs in an upcoming midamble interval (e.g., a subsequent PSDU set 820). If a receiving STA is scheduled to receive data, the receiving STA may remain in the higher power mode, or may transition into a higher power mode on the data channel 805-a to monitor for, receive, and decode the data from the transmitting STA. If a receiving STA is not scheduled to receive data, the receiving STA may enter a doze state (e.g., transition into a lower power mode) during the upcoming midamble interval for the data channel 805-a, and may wake back up for the next control SP 825 on the control channel 805-b. As the control SPs 825 include information for specific midamble intervals, each control SP 825 may correspond to an upcoming midamble 815 that starts an upcoming midamble interval (e.g., containing a PDSU set 820).

The information in the control SPs 825 may additionally or alternatively include parameters for upcoming transmissions on the data channel 805-a, such as the start of the next midamble interval, a length of the next midamble interval, a data rate, a resource unit allocation, or any combination of these or other relevant parameters. In some examples, a control SP 825 may include an indication for a receiving STA to remain awake and monitoring on the control channel 805-b after the control SP 825. The transmitting STA may send such an indication if the transmitting STA will transmit downlink data to the receiving STA on the control channel 805-b following the control SP 825 or if the transmitting STA is soliciting feedback or other information from the receiving STA from the control channel 805-b after the control SP 825. Other STAs not indicated may enter the doze state.

In the cases where the transmitting STA solicits feedback, the transmitting STA may transmit a feedback request to one or more STAs receiving data on the data channel 805-a. The receiving STA may respond by transmitting feedback information on the control channel 805-b (or, in some examples, on the data channel 805-a). In some examples, the receiving STA may provide feedback in a high-efficiency (HE) trigger-based (TB) PPDU. The transmitting STA may receive the feedback information and may retransmit or rate-adapt for the next midamble interval based on the received feedback. In some examples, this feedback may be an example of an ACK/NACK message 835.

In some examples, a receiving STA may transmit a solicited or unsolicited channel quality indicator (CQI) or bandwidth quality report (BQR) for the data channel 805-a. This type of feedback information may report conditions on the data channel 805-a, and the transmitting STA may use this information for scheduling STAs (e.g., including assigning resource units) on the data channel 805-a during a subsequent midamble interval. In some examples, the transmitting STA, the receiving STA, or both may include a mechanism to filter or factor in the channel busyness due to the on-going in-BSS transmission on the data channel 805-a. For example, the transmitting STA may correlate that some of the reported congestion on the data channel 805-a is due to the on-going PSDU transmissions in a PSDU set 820.

In one specific example, different portions of the period in between control SPs 825 on the control channel 805-b may be used for different types of feedback. For example, as illustrated, a first portion may be used for ACK/NACK feedback 835, a second portion may be scheduled for BQR feedback 840, and a third portion may be scheduled for QCI or CQI report feedback 845. In other examples, any of these types of feedback may be transmitted throughout the period between control SPs 825 (e.g., based on explicit request messages from the transmitting STA or automatically based on a pre-configuration of the receiving STA or triggered based on a change in the data channel 805-a conditions).

Figure 9A:
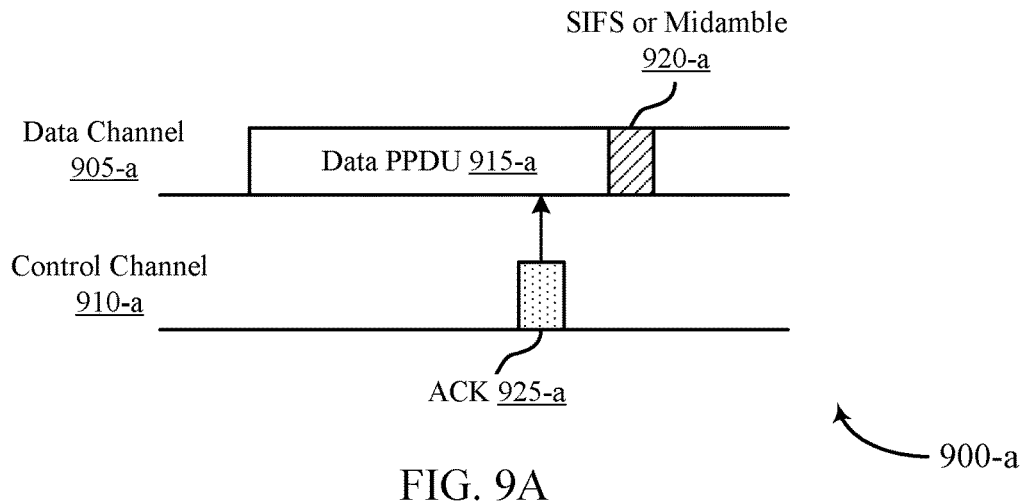
FIGS. 9A, 9B, and 9C illustrate examples of feedback procedures that support data channel and control/management channel separation in accordance with aspects of the present disclosure.
Figure 9B:
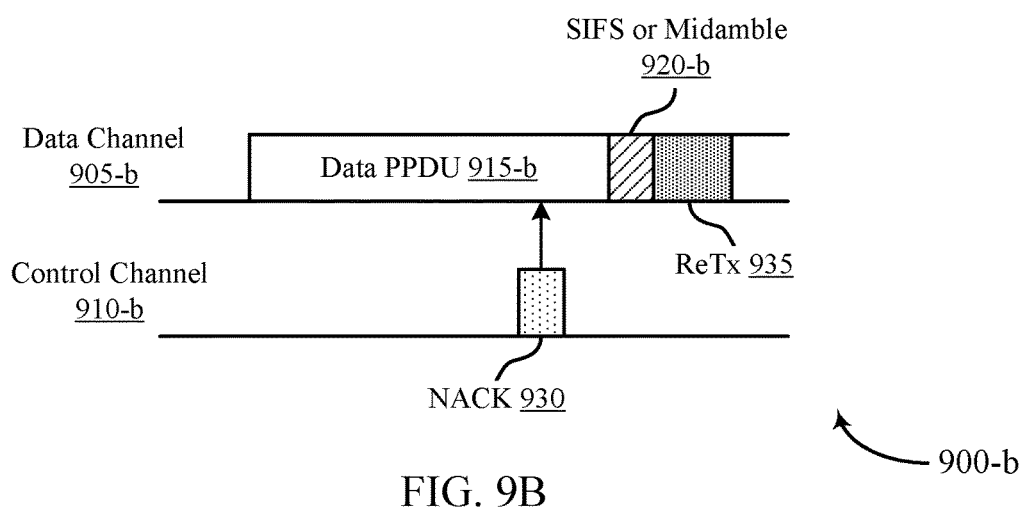
Figure 9C:
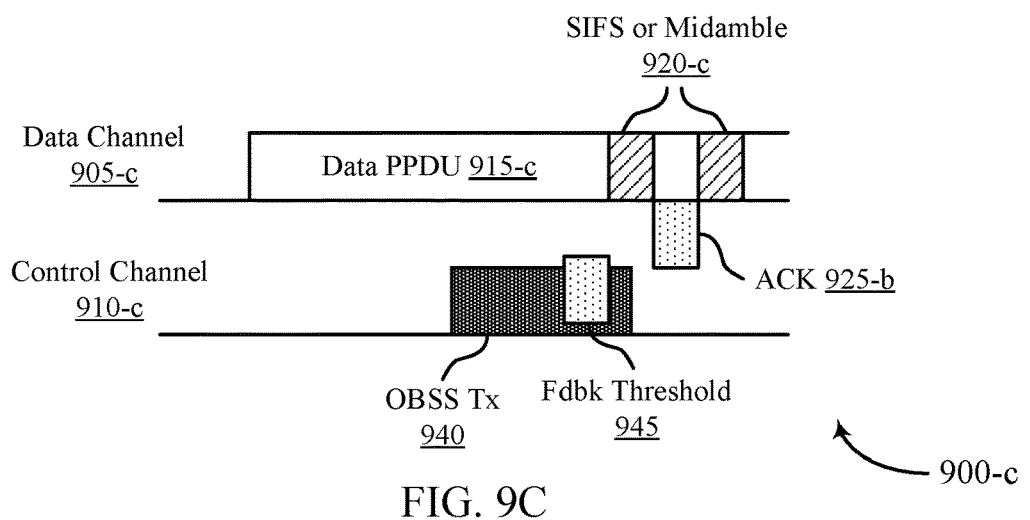

FIGS. 9A, 9B, and 9C illustrate examples of feedback procedures 900 that support data channel and control/management channel separation in accordance with aspects of the present disclosure. For example, FIG. 9A illustrates one example feedback procedure 900-a where data is successfully received and decoded at a receiving STA. In some examples, feedback procedure 900-a may be performed by STAs (e.g., APs 105, STAs 115, etc.) operating within systems as described with reference to FIGS. 1 through 7. The separation of the data channel 905-a and the control channel 910-a may enable a receiving STA (e.g., a peer STA) to acknowledge successful or unsuccessful reception of data frames while an on-going transmission occurs on the data channel 905-a. Such an ACK/NACK message may be referred to as live feedback.

For example, a transmitting STA may transmit a data PPDU 915-a on the data channel 905-a to the receiving STA. The receiving STA may transmit an ACK message 925-a on the control channel 910-a (e.g., automatically or in response to a feedback request). ACK message 925-a may acknowledge that data received from the transmitting STA up to a point was successfully received. For example, the ACK message 925-a may indicate that data transmitted in a previous data PPDU 915 was successfully received, or that data transmitted in a first portion of the data PPDU 915-a was successfully received. The receiving STA may transmit the ACK message 925-a during the ongoing data PPDU 915-a transmission. In this example, both the transmitting and receiving STAs may simultaneously transmit and receive information based on the separation of the data channel 905-a and the control channel 910-a. The transmitting STA may include a short IFS (SIFS) or midamble 920-a between data PPDU 915 transmissions. In some examples, the transmitting STA may adjust transmission parameters during the SIFS or midamble 920-a based on the feedback received from the receiving STA (e.g., feedback information in addition to the ACK message 925-a). The transmitting STA may maintain access to the medium during the SIFS or midamble 920-a. For example, even if the transmitting STA transmits a data PPDU 915 to a different set of receiving STAs following the SIFS or midamble 920-a, the transmitting STA many not lose the medium (e.g., corresponding to the data channel 905-a resources) during the IFS between the successive transmissions.

The early feedback from the receiving STA to the transmitting STA may enable the transmitting STA to update the scoreboard for the data transmissions and move the sequence window while the current data PPDU 915-a transmission is on-going on the data channel 905-a. Additionally, receiving the ACK 925-a and/or additional feedback information during the transmission may improve the latency involved in adjusting transmission parameters. For example, the transmitting STA may quickly rate-adapt for the next data PPDU 915 transmission based on the low-latency feedback from the receiving STA.

FIG. 9B illustrates another example feedback procedure 900-b where data is unsuccessfully received or decoded at a receiving STA. Similar to above, a transmitting STA may transmit a data PPDU 915-b on a data channel 905-d. Simultaneous to this data PPDU 915-b transmission, the receiving STA may transmit feedback information on a control channel 910-*b*. In some examples, the receiving STA may not successfully receive or decode the data from the transmitting STA (e.g., due to interference, signal corruption, etc.). In some examples, the receiving STA may transmit a NACK message 930 to the transmitting STA during the on-going data PPDU 915-*b* transmission. This NACK message 930 may indicate any frames that were not successfully decoded by the receiving STA (i.e., lost frames).

The transmitting STA may receive the NACK message 930, may identify the lost frames, and may queue the lost frames for retransmission during the on-going transmission opportunity (TxOp) or during a subsequent TxOp. Because receiving the NACK message 930, identifying the lost frames, and queueing the lost frames may occur during the on-going data PPDU 915-*b* transmission, these transmitting STA may prepare the frames for retransmission with very low latency and without delaying the data transmissions. In some examples, the transmitting STA may transmit the retransmission 935 in a subsequent data PPDU 915 transmission to the receiving STA. For example, the transmitting STA may transmit a sequence of PPDUs in quick succession separated by an SIFS or midamble 920-*b*, and may include this retransmission 935 at the start of the subsequent PPDU. In other examples, the transmitting STA may determine where to add the retransmission 935 into the queue based on a priority level of the lost frames contained in the retransmission 935.

FIG. 9C illustrates yet another example feedback procedure 900-*c* where feedback information may be transmitted by the receiving STA on either channel (e.g., the data channel 905-*c* or the control channel 910-*c*). In some systems, contention on the data channel 905-*c* and the control channel 910-*c* may be independent of one another. In these systems, a receiving STA may not be able to transmit feedback information on the control channel 910-*c* due to an overlapping basic service set (OBSS) transmission 940 on the control channel (e.g., in the same resources as the control channel 910-*c*). The inability to transmit feedback information may prevent the receiving STA from gaining access to the control channel 910-*c* medium. If the receiving STA cannot transmit feedback information on the control channel 910-*c* based on the OBSS transmission 940, the transmitting STA may not receive feedback in response to the on-going data transmission. The inability to receive feedback may result in blocking the data transmission on the data channel 905-*b* due to the window for the transmission being stuck waiting on an ACK message 925 or NACK message 930 from the receiving STA, and lead to a large latency overhead.

In some examples, to reduce the latency, the system may support the receiving STA transmitting feedback information on either the data channel 905-*c* or the control channel 910-*c*. For example, the receiving STA may contend (i.e., perform a contention procedure) on the control channel 910-*c* to send an ACK/NACK message. If the ACK/NACK message is not transmitted within a threshold time period (e.g., before a pre-determined or dynamically determined feedback threshold 945) after the start of the data PPDU 915-*c* transmission on the data channel 905-*c*, the receiving STA may instead transmit the feedback information on the data channel 905-*c*. The feedback threshold 945 for the control channel 910-*c* may be based on an ACK time out period (e.g., a block ACK timeout value field), the type of block acknowledgement (BA) setup (e.g., immediate or delayed), or some combination of these parameters. If one or more of these parameters change, the feedback threshold 945 may change accordingly. In the cases where the feedback threshold 945 is reached, the receiving STA may transmit the ACK/NACK message (e.g., ACK message 925-*b*) during the SIFS or midamble 920-*c* after the end of the data PPDU 915-*c* transmission. For example, as the transmitting STA may maintain access to the medium throughout the SIFS or midamble 920-*c*, the transmitting STA may have the TxOp on the data channel 905-*c* for the receiving STA to send an ACK 925-*b* (i.e., without having to contend for access to the medium). Such a system allows the receiving STA an opportunity to transmit simultaneous feedback on the control channel 910-*c* during an on-going data transmission, which may improve the communication latency in the system, while still allowing for timely feedback if the control channel 910-*c* is unavailable for sending an ACK/NACK.

Figure 10:
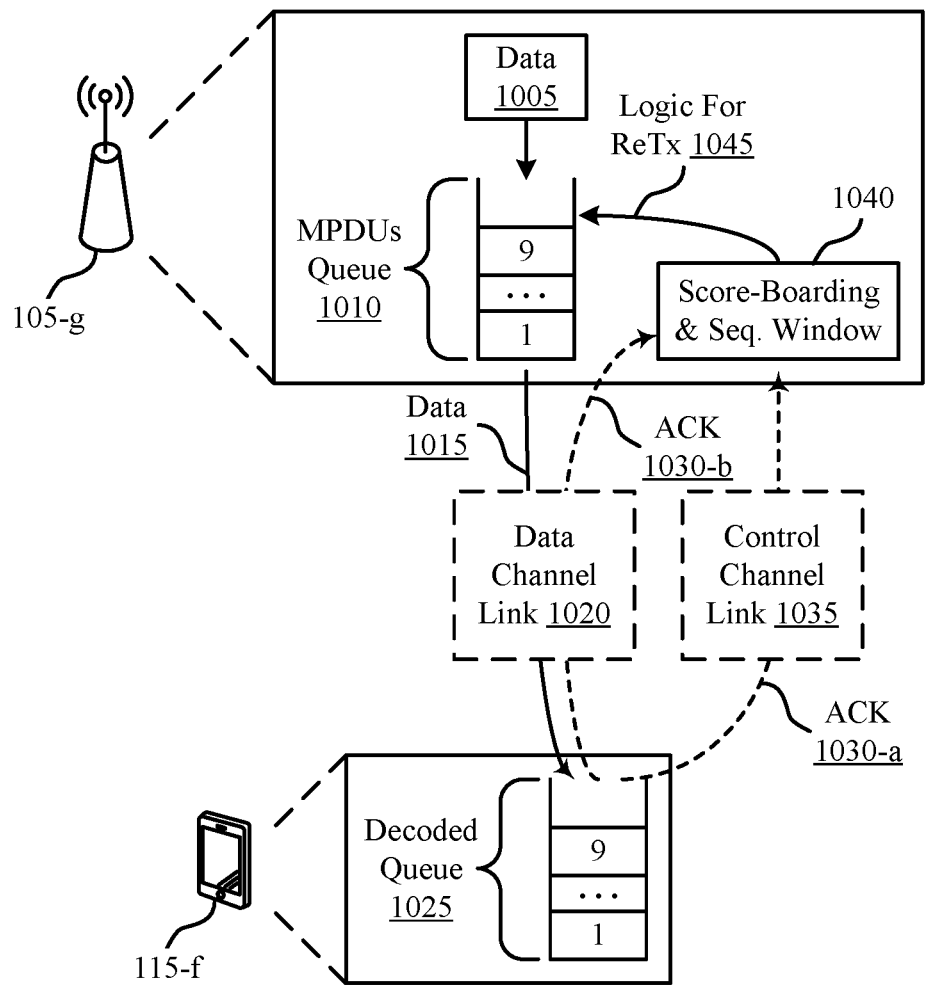
FIG. 10 illustrates an example of a system for add block acknowledgement (ADDBA) setup that supports data channel and control/management channel separation in accordance with aspects of the present disclosure.

FIG. 10 illustrates an example of a system 1000 for add block acknowledgement (ADDBA) setup that supports data channel and control/management channel separation in accordance with aspects of the present disclosure. In some examples, system 1000 may implement aspects of wireless communications systems 100 or 200, or any of systems 300, 400, 500, 600, or 700. The system 1000 may include AP 105-*g* and STA 115-*f*, which may be examples of a transmitting device or STA and a receiving device or STA as described above with reference to FIGS. 1 through 9. The system 1000 may illustrate an example feedback procedure between communicating STAs.

For example, the transmitting STA (e.g., AP 105-*g*) may have data 1005 to transmit. The data 1005 may be retrieved from memory of AP 105-*g* and organized into one or more medium access control (MAC) protocol data units (MPDUs) for transmission to a receiving STA (e.g., STA 115-*f*). AP 105-*g* may add the MPDUs into a queue 1010 for transmission. According to the ordering of the queue 1010, AP 105-*g* may transmit the MPDUs (e.g., as data 1015) to STA 115-*f* over the data channel link 1020. For example, AP 105-*g* may transmit the MPDUs one at a time, each separated by an IFS (e.g., which may be an example of an SIFS). STA 115-*f* may receive the data 1015 over the data channel 1020, and may perform decoding operations on the received signals. STA 115-*f* may store the received MPDUs in a queue 1025 (e.g., a decoded or non-decoded queue).

STA 115-*f* may determine whether any of the data 1015 was not successfully decoded at STA 115-*f*. For example, STA 115-*f* may identify a PDU, a portion of a PDU, a data frame, or any combination that STA 115-*f* did not successfully receive and decode. STA 115-*f* may transmit feedback information to AP 105-*g* indicating any missing data. In some examples, STA 115-*f* may transmit an ACK message 1030 indicating the data successfully received. Based on this indication, AP 105-*g* may implicitly determine any data not successfully received by STA 115-*f*. In other examples, STA 115-*f* may transmit an indication of data successfully received and an indication of data unsuccessfully received. In other examples, STA 115-*f* may provide feedback indicating data not successfully received, and may not transmit an indication for correctly decoded data. In any of the described examples, the feedback information may be referred to as an ACK message 1030.

STA 115-*f* may transmit the ACK message 1030 to AP 105-*g* over the control channel link 1035 or the data channel link 1020. For example, STA 115-*f* and AP 105-*g* may implement any of the feedback procedures 900-*a*, 900-*b*, or 900-*c* to send the ACK message 1030. In a first case, STA 115-*f* may transmit ACK message 1030-*a* over the control channel link 1035. In a second case, STA 115-*f* may transmit ACK message 1030-b over the data channel link 1020 (e.g., if the control channel link 1035 is busy).

AP 105-g may receive the ACK message 1030, and may update a score-boarding and sequence window 1040 based on the feedback information. For example, the score-boarding and sequence window 1040 may allow AP 105-g to adjust the ordering of PDUs in the queue 1010 to provide punctual retransmissions to STA 115-f. That is, if the ACK message 1030 indicates that STA 115-f failed to receive a portion of the data 1015, AP 105-g may utilize the score-boarding and sequence window 1040 in conjunction with logic for retransmission 1045 to re-retrieve the missing portion of data from memory, and position the missing portion of data in the queue 1010 such that the missing data may be retransmitted to STA 115-f with low latency.

The system 1000 may support BAs between the STAs (e.g., the peer STAs). To setup up the BA feedback, the system 1000 may extend an ADDBA setup procedure to indicate whether the BA setup applies to the data channel link 1020, the control channel link 1035, or both links.

For example, the BA session setup by the ADDBA setup procedure applies to the data channel link 1020, and may be based on one or both of the STAs not supporting control channel feedback (e.g., based on the capabilities of the STAs). In other examples, the BA session setup by the ADDBA setup procedure applies to the control channel link 1035. For example, the STAs may provide control channel information for where the feedback is to be received (e.g., by extending a multi-band element). The STAs may provide control channel information when access to, or availability of, the control channel is unrestricted (i.e., the control channel link 1035 is always available to the STAs). In other examples, the BA session applies to both the data channel link 1020 and the control channel link 1035. In some examples, similar to above, the STAs may provide control channel information for where the feedback is to be received (e.g., by extending a multi-band element). The STAs may provide control channel information when access to, or availability of, the control channel is restricted or not guaranteed (i.e., the STAs may have to perform contention procedures to gain access to the control channel link 1035 medium).

Figure 11:
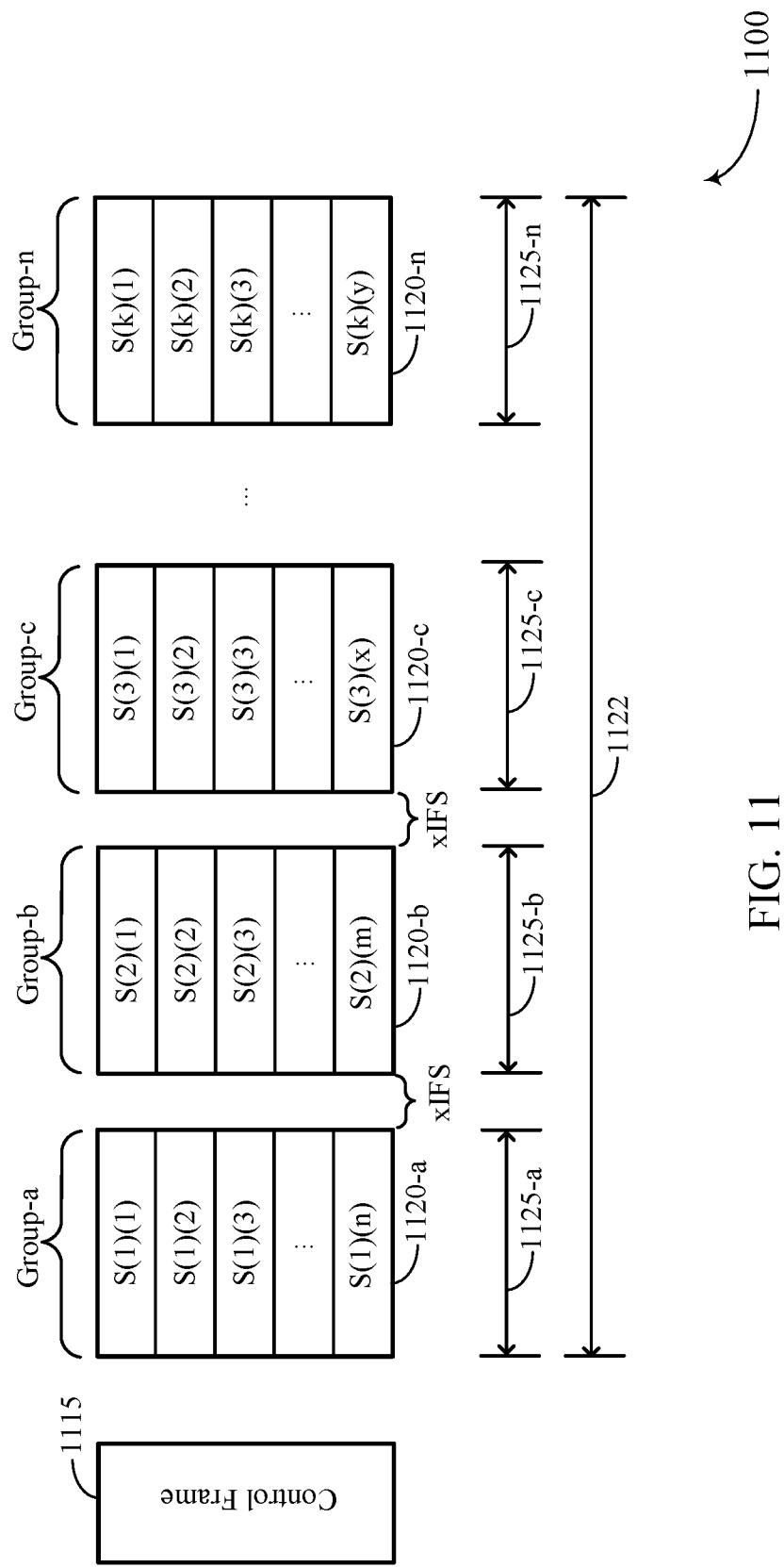
FIGS. 11 through 14 illustrate examples of communication timelines that support data channel and control/management channel separation in accordance with aspects of the present disclosure.

FIG. 11 illustrates an example of a communication timeline 1100 that supports data channel and control/management channel separation in accordance with aspects of the present disclosure. In some examples, communication timeline 1100 may implement aspects of wireless communications systems 100 or 200. Additionally, communication timeline 1100 may support group information for control transmissions. The group information may be achieved based on implementing one or more techniques described above, for example, with respect to FIGS. 3 through 10. Communication timeline 1100 may correspond to communications between two STAs (e.g., transmitting STAs 105, STAs 115, or any other wireless devices in a wireless system) as described above.

For example, one or more receiving STAs may utilize a control channel to aid in STA scheduling and power-saving, while providing a mechanism for live feedback signaling. The control channel may support signaling in either one direction or both directions while the transmitting STA performs an on-going downlink transmission on an associated data channel. For example, in some multi-band schemes, the control channel may support transmissions in both directions (e.g., downlink and uplink). In some multi-resource unit with puncturing schemes, the control channel may support transmissions in the downlink, but not in the uplink. In some full duplex schemes, the control channel may support transmissions in the uplink, but not in the downlink.

The communication timeline 1100 may include a control frame 1115 and a sequence of control transmissions 820-a to 820-n (e.g., control PPDUs). As shown in FIG. 11, the control frame 1115 may be transmitted first followed by the sequence of the control transmissions 1120-a, 1120-b, and 1120-c to 1120-n. The sequence of control transmissions 1120-a to 1120-n may be transmitted within a time interval 1122 (e.g., transmit opportunity (TXOP) interval) that has been reserved on the control channel for the control transmissions 1120. The time interval 1122 may include multiple time slots 1125-a, 1125-b, and 1125-c to 1125-n, in which each control transmission 1120-a, 1120-b, and 1120-c to 1120-n is transmitted in a respective one of the time slots 1125-a, 1125-b, and 1125-c to 1125-n. Adjacent control transmissions may be separated by an interframe space (i.e., labeled "xIFS", where "x" indicates that the length of the interframe space may vary). For example, the interframe space xIFS may be approximately equal to a short interframe space (SIFS).

As described herein, the receiving STAs serviced by the transmitting STA may be grouped into multiple groups, where each group includes a subset of the receiving STAs. The groups may be overlapping (i.e., a receiving STA may be a member of more than one group) or non-overlapping (i.e., each receiving STA is a member of a single group). Each group may be identified by a unique group identification (ID). The transmitting STA may assign each receiving STA to one or more groups, and transmit the group assignments to the receiving STAs. In some examples, the transmitting STA may assign each control transmission 1120-a to 1120-n (and hence corresponding time slot 1125-a to 1125-n) to one of the groups of receiving STAs. As a result, each control transmission 1120-a to 1120-n may be used to transmit control information from the transmitting STA to the receiving STAs in the assigned group or transmit control information from the receiving STAs in the assigned group to the transmitting STA.

In the example shown in FIG. 11, n groups of receiving STAs (labeled "Group-a" to "Group-n), in which each control transmission 1120-a to 1120-n (and hence corresponding time slot 1125-a to 1125-n) may be assigned to one of the k groups of receiving STAs. It is to be appreciated that the sequence of control transmissions is not limited to one control transmission per group. For example, the sequence of control transmissions may include two or more control transmissions assigned to the same group, as discussed further below. In other words, a group may be repeated in the sequence of control transmissions.

The control frame 1115 may include information about the control transmissions 1120-a to 1120-n. For example, the control frame 1115 may include group information for the control transmissions. In this example, for each control transmission 1120-a to 1120-n (time slot 1125-a to 1125-n), the control frame 1115 may indicate the group assigned to the control transmission 1120-a to 1120-n (time slot 1125-a to 1125-n). For example, for each control transmission (time slot), the control frame 1115 may include the group ID of the assigned group. Each receiving STA may use this information to determine which control transmission is assigned to the receiving STA's group.

For each control transmission 1120-a to 1120-n (time slot 1125-a to 1125-n), the control frame 1115 may identify each receiving STA in the assigned group (e.g., include the AID of each receiving STA in the assigned group). The identified information may indicate a receiving STA to determine which control transmission (time slot) is assigned to its group based on the identity of the receiving STA. In this example, the control frame 1115 may identify the group of receiving STAs assigned to each control transmission 1120-*a* to 1120-*n* (time slot 1125-*a* to 1125-*n*) by identifying the receiving STAs in the assigned group. In one example, the control frame may identify the receiving STAs in the assigned group using the AIDs of the receiving STAs. Additionally or alternatively, control frame 1115 may indicate whether the control transmission is a DL control transmission or a UL control transmission (i.e., indicate whether the receiving STAs in the assigned group are to receive or transmit control information). Thus, the control frame 1115 may indicate the transmission type (i.e., UL or DL) of each control transmission 1120-*a* to 1120-*n* (time slot 1125-*a* to 1125-*n*).

For each control transmission 1120-*a* to 1120-*n* (time slot 1125-*a* to 1125-*n*), the transmitting STA may assign a different resource unit in the control channel to each receiving STA in the corresponding group. In this example, each receiving STA may transmit or receive a respective control signal on its assigned RU. For example, as shown, for each control transmission, the resource units in the control transmission may be labeled "S", in which the number in the first parenthesis indicates the corresponding group and the number in the second parenthesis indicates a particular resource unit in the corresponding control transmission. In this example, each control transmission may comprise multiple control transmissions that are approximately aligned in time, in which each of the multiple control transmissions is transmitted on a different RU. In this example, the control channel may be a narrow-bandwidth channel (e.g., 20 MHz channel) divided (partitioned) into multiple resource units (e.g., 26-tone resource units).

In some examples, for each control transmission 1120-*a* to 1120-*n* (time slot 1125-*a* to 1125-*n*), the control frame 1115 may indicate the resource unit assigned to each receiving STA in the corresponding group and a start time of the control transmission (time slot). A receiving STA may use this information to determine the start time of a control transmission (time slot) assigned to the receiving STA's group. In this example, the receiving STA may use the determined start time to turn off its control channel receiver/transmitter after receiving the control frame 1115 to conserve power and turn its control channel receiver/transmitter back on at the start time of the control transmission (time slot) assigned to the receiving STA's group. As a result, the receiving STA may turn off its control channel receiver/transmitter between the end of the control frame 1115 and the start of the control transmission (time slot) assigned to the receiving STA's group to reduce power consumption. Power reduction may be desirable, especially for the case where the receiving STA is a battery-powered device.

In some examples, for each control transmission 1120-*a* to 1120-*n* (time slot 1125-*a* to 1125-*n*), the control frame 1115 may indicate a type of control information to be transmitted in the control transmission (time slot). For example, the type of control information may include at least one of buffer status information, channel quality information, bandwidth information, resource assignment information, resource request information, acknowledgement information, power headroom information, scheduling information, etc. The control information may allow a receiving STAs in a group to determine beforehand what type of control information is to be transmitted in a control transmission assigned to the group. In addition, since the control frame 1115 indicates the type of control information for each control transmission, this information does not need to be inserted in the control transmissions themselves, which reduces the overhead of the control transmissions. Also, the transmitting STA can solicit a group of receiving STAs for a specific type of control information (e.g., CQI, BQR, buffer status report, etc.) by indicating, in the control frame 1115, the type of control information for the control transmission (time slot) assigned to the group.

As described, the communication timeline 1100 may support control signaling for multiple receiving STAs within a time interval 1122 (e.g., TXOP interval). The control frame 1115 may indicate the receiving STAs that are to receive or transmit control information within the time interval 1122 (e.g., TXOP interval). The control frame 1115 also provides the receiving STAs with information for transmitting and/or receiving their respective control information such as the receiving STAs assigned to each control transmission 1120-*a* to 1120-*n*, the start time of each control transmission 1120-*a* to 1120-*n*, the type of transmission (i.e., DL or UL) of each control transmission 1120-*a* to 1120-*n*, the type of control information to be transmitted in each control transmission 1120-*a* to 1120-*n*, etc. The communication timeline 1100 may support reduced overhead in data packets transmitted on a data channel by moving some or all of the control information for the data packets to the control channel. Also, the control channel may be a narrow-bandwidth control channel (e.g., 20 MHz channel) to increase the robustness and range of the control transmissions 1120-*a* to 1120-*n*. This helps ensure that control information is reliably received by the transmitting STA and the receiving STAs.

When the transmitting STA transmits the control frame 1115 on the control channel, each receiving STA receives the control frame 1115 and determines which control transmission 1120-*a* to 1120-*n* (time slot 1125-*a* to 1125-*n*) is assigned to the receiving STA's group based on the group information in the control frame 1115. Each receiving STA may also determine, based on the received control frame 1115, the start time of the assigned control transmission 1120-*a* to 1120-*n* (time slot 1125-*a* to 1125-*n*), the type of transmission (i.e., DL or UL) of the assigned control transmission 1120-*a* to 1120-*n* (time slot 1125-*a* to 1125-*n*), the type of control information to be transmitted in the assigned control transmission 1120-*a* to 1120-*n* (time slot 1125-*a* to 1125-*n*), a resource unit assigned to the receiving STA for the assigned control transmission 1120-*a* to 1120-*n* (e.g., during time slot 1125-*a* to 1125-*n*).

In some examples, the communication timeline 1100 may be configured to include multiple control transmissions (e.g., assigned control transmissions 1120-*b* and 1120-*c*) assigned to the same group of receiving STAs (e.g., "Group-b"). For example, control transmission 1120-*b* may be transmitted in a time slot 1125-*b* and control transmissions 1120-*c* may be transmitted in a time slot 1125-*c*. Time slots 1125-*b* and 1125-*c* may be within the time interval 1122.

Figure 12:
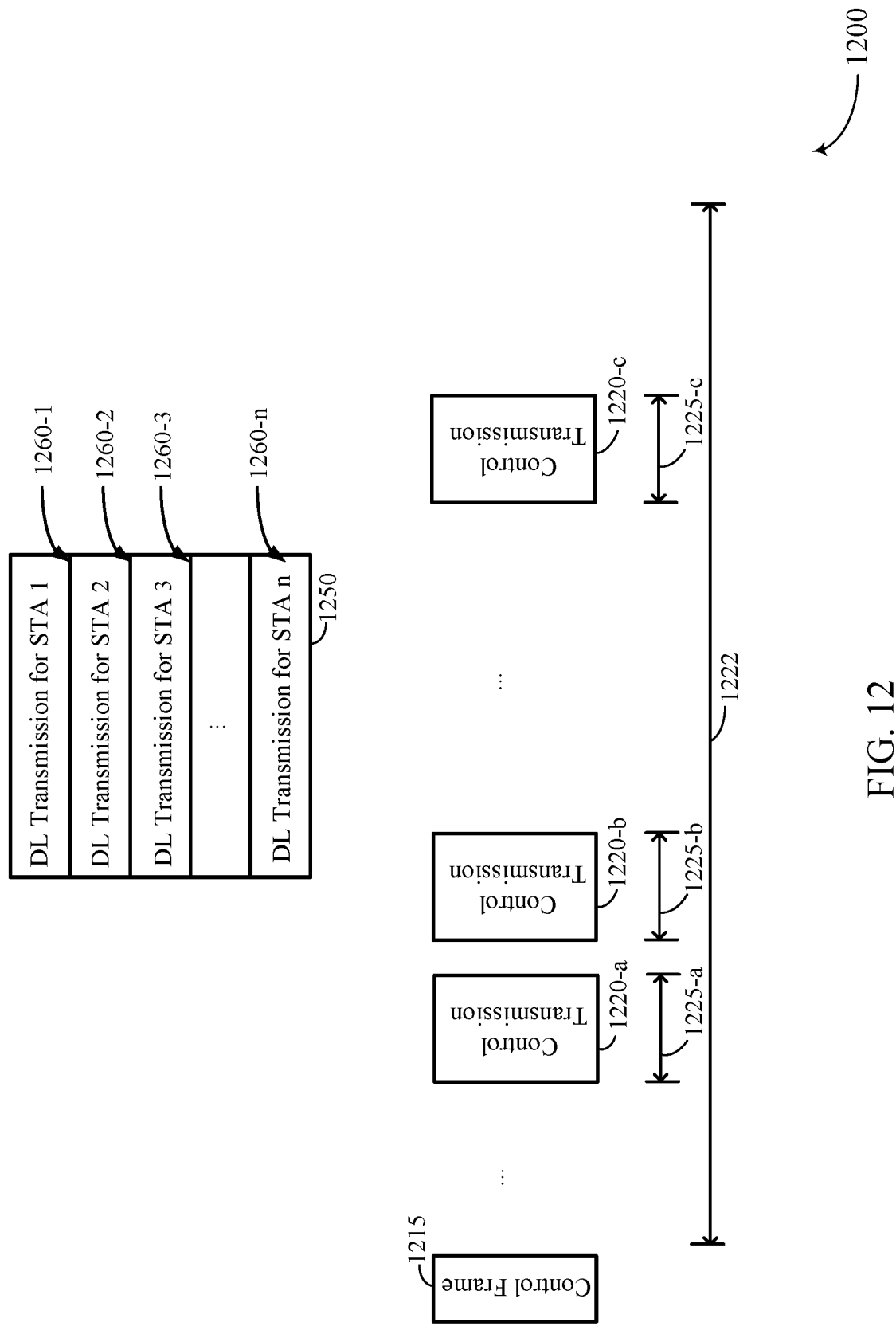

FIG. 12 illustrates an example of a communication timeline 1200 that supports data channel and control/management channel separation in accordance with aspects of the present disclosure. In some examples, communication timeline 1200 may implement aspects of wireless communications systems 100 or 200. Additionally, communication timeline 1200 may support group information for control transmissions during a time interval 1222. The group information may be achieved based on implementing one or more techniques described above, for example, with respect to FIGS. 3 through 11. Communication timeline 1200 may correspond to communications between two STAs (e.g., transmitting STAs 105, STAs 125, or any other wireless devices in a wireless system) as described above.

In this example, control transmission 1220-b may be a downlink control transmission transmitted from the transmitting STA to the receiving STAs in the assigned group. Control transmission 1220-b may include scheduling information for downlink data transmissions from the transmitting STA to the receiving STAs in the assigned group. The downlink resource units assigned to the receiving STAs may be within a wide-bandwidth data channel (e.g., 80 MHz channel, 160 MHz channel, etc.). The scheduling information may also indicate the start time of the downlink transmissions and the duration of the downlink transmissions. As discussed above, the control frame 1215 may include an indication to the receiving STAs in the assigned group of time slot 1225-b, so that the receiving STAs are able to receive control transmission 1220-b.

After receiving the scheduling information, each receiving STA (labeled "STA 1" to STA n") receive a respective downlink data transmission 1260-1 to 1260-n from the transmitting STA on the assigned downlink RU. In the example shown in FIG. 12, the receiving STAs transmit the UL data transmissions 1260-1 to 1260-n in a UL MU PPDU 1250 using, e.g., OFDMA. After the downlink data transmission, each receiving STA may determine whether it has successfully received the respective downlink data, and generate an acknowledgement (ACK) if the receiving STA has successfully received the respective downlink data transmissions 1260. Each receiving STA may, in some examples, transmit an acknowledgement (ACK) to the transmitting STA during time slot 1225-c corresponding to control transmission 1220-c. In this example, control transmission 1220-c may be a uplink control transmission used to transmit acknowledgements (ACKs) from the receiving STAs to the transmitting STA. In this example, the control frame 1215 may indicate that control transmission 1220-c may be a uplink control transmission and indicate that the type of control information for control transmission 1220-c may be acknowledgement information so that the receiving STAs know to transmit their acknowledgements (ACKs) during time slot 1225-c. For the example in which the transmitting STA assigns each receiving STA a different resource unit in the control channel, each receiving STA may transmit its acknowledgement on the resource unit in the control channel assigned to the receiving STA. In this example, if the transmitting STA fails to receive an acknowledgement (ACK) from a receiving STA, the transmitting STA may retransmit the respective downlink data to the receiving STA.

Additionally or alternatively, the transmitting STA may generate the scheduling information discussed above based on feedback information (e.g., channel quality information) from the receiving STAs. For example, the communication timeline 1200 may include a control transmission 1220-a at time interval 1225-a, and preceding control transmission 1220-b. In this example, control transmission 1220-a and control transmission 1220-b may be assigned to the same group of receiving STAs. Control transmission 1220-a may be an uplink control transmission used to transmit feedback information (e.g., CQI, BQR, etc.) from the receiving STAs in the assigned group to the transmitting STA. The transmitting STA uses the received feedback information to determine which resource units or data channels to assign to the receiving STAs in the scheduling information, which may be transmitted to the receiving STAs in control transmission 1220-b. In some examples, the control frame 1215 may indicate that control transmission 1220-a may be a uplink control transmission and indicate that the type of control information for control transmission 1220-a may be feedback information (e.g., CQI, BQR, etc.) so that the receiving STAs know to transmit their feedback information during time slot 1025.

After receiving the CQIs and BQRs from the receiving STAs, the transmitting STA may use this information in assigning (allocating) data channels or resource units to the receiving STAs in the scheduling information. For example, the transmitting STA may assign a data channel to a receiving STA that the BQR indicates is available, and avoid channels that are indicated as unavailable in the BQR. In another example, the transmitting STA may avoid assigning a channel or resource unit to a receiving STA that the CQI from the receiving STA indicates is of poor quality. Thus, the CQIs and BQRs from the receiving STAs assist the transmitting STA in assigning (allocating) data channels and/or resource units to the receiving STAs for the downlink data transmissions directed to the receiving STAs.

Figure 13:
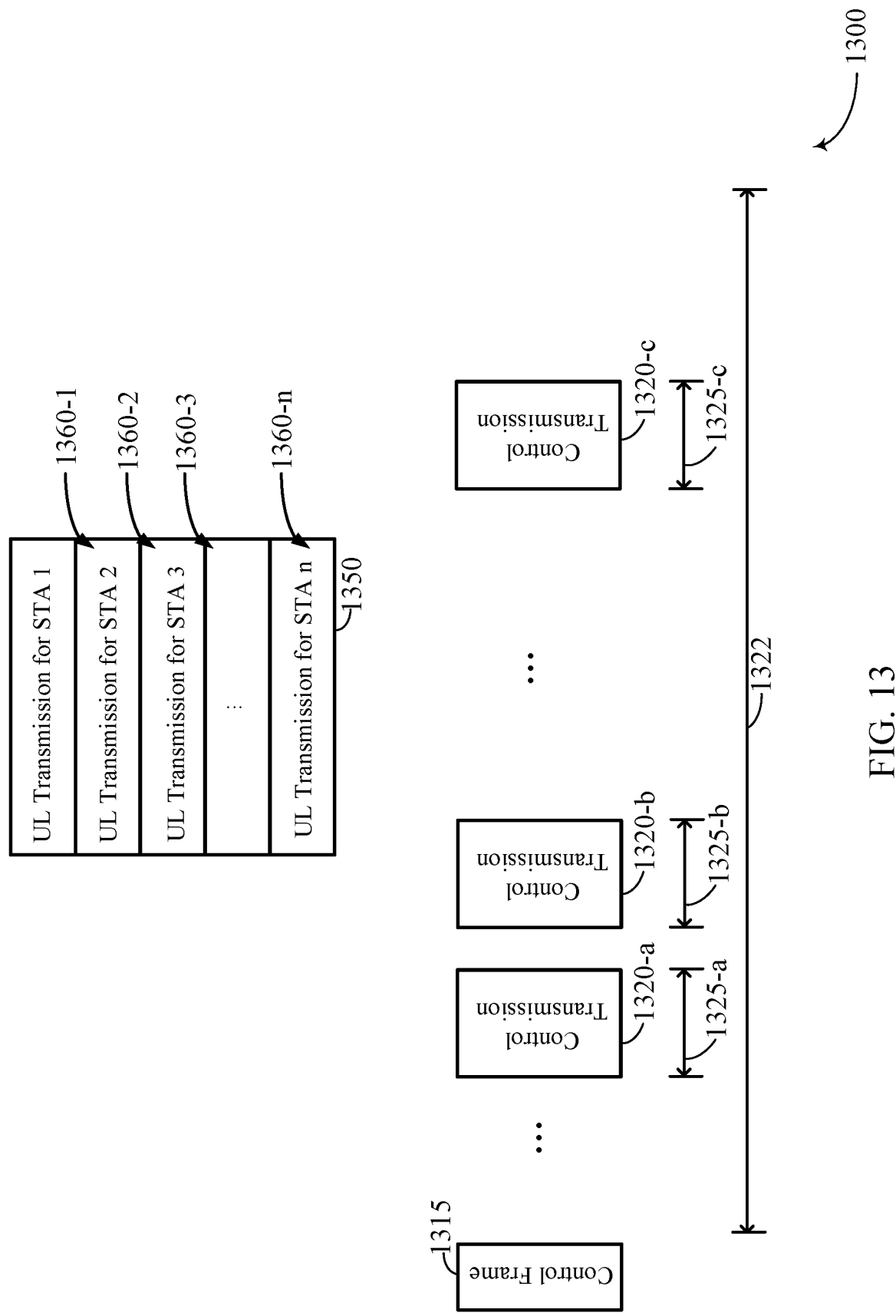

FIG. 13 illustrates an example of a communication timeline 1300 that supports data channel and control/management channel separation in accordance with aspects of the present disclosure. In some examples, communication timeline 1300 may implement aspects of wireless communications systems 100 or 200. Additionally, communication timeline 1300 may support group information for control transmissions during a time interval 1322. The group information may be achieved based on implementing one or more techniques described above, for example, with respect to FIGS. 3 through 12. Communication timeline 1300 may correspond to communications between two STAs (e.g., transmitting STAs 105, STAs 135, or any other wireless devices in a wireless system) as described above.

In this example, control transmission 1320-b may be a downlink control transmission transmitted from the transmitting STA to the receiving STAs in the assigned group at the time slot 1325-b. Control transmission 1320-b may include scheduling information for uplink data transmissions from the receiving STAs in the assigned group to the transmitting STA. For example, the scheduling information may indicate a uplink resource unit assignment for each receiving STA in the assigned group (e.g., by mapping the AID of each receiving STA to the uplink resource unit assigned to the receiving STA). The uplink resource units assigned to the receiving STAs may be within a wide-bandwidth data channel (e.g., 80 MHz channel, 160 MHz channel, etc.). The scheduling information may also indicate the start time of the uplink transmissions and the duration of the uplink transmissions. For the example in which the transmitting STA assigns each receiving STA in the assigned group a different resource unit in the control channel, the transmitting STA may transmit the scheduling information for each receiving STA on the resource unit assigned to the receiving STA. In this example, each receiving STA receives its scheduling information (e.g., uplink resource unit assignment, start time and duration of uplink transmission, etc.) on its assigned resource unit in the control channel.

After receiving the scheduling information, each receiving STA (labeled "STA 1" to STA n") transmits its respective uplink data transmission 1360-1 to 1360-n to the transmitting STA on its assigned uplink RU. In the example shown in FIG. 13, the receiving STAs transmit the uplink data transmissions 1360-1 to 1360-n in a uplink MU PPDU 1350 using, e.g., OFDMA. After the uplink data transmissions 1260, the transmitting STA may determine whether it has successfully received each uplink data transmission. For each uplink data transmission, the transmitting STA may generate an acknowledgement (ACK) if the transmitting STA has successfully received the uplink data transmission. The transmitting STA may then transmit the acknowledgments to the receiving STAs during time slot 1325-*c* corresponding to control transmission 1320-*c*. In this example, control transmission 1325-*c* may be a downlink control transmission used to transmit acknowledgements (ACKs) from the transmitting STA to the receiving STAs.

In some examples, the control frame 1315 may indicate that control transmission 1320-*c* may be a downlink control transmission and indicate that the type of control information for control transmission 1320-*c* may be acknowledgement information so that the receiving STAs know to receive the acknowledgements (ACKs) during time slot 1325-*c*. For the example in which the transmitting STA assigns each receiving STA a different resource unit in the control channel, each receiving STA may receive its acknowledgement on the resource unit in the control channel assigned to the receiving STA. In this example, if a receiving STA fails to receive an acknowledgement (ACK) from the transmitting STA, the receiving STA may retransmit the respective uplink data to the transmitting STA.

Additionally or alternatively, the transmitting STA may generate the scheduling information for uplink transmissions in response to buffer status reports from the receiving STAs. For example, communication timeline 1300 may include a control transmission 1320-*a* at time interval 1325-*a*, and preceding control transmission 1320-*b*. In this example, control transmission 1320-*a* and control transmission 1320-*b* may be assigned to the same group of receiving STAs. Control transmission 1320-*a* may be a uplink control transmission used to transmit buffer status reports from the receiving STAs in the assigned group to the transmitting STA. The transmitting STA may use the received buffer status reports to determine for which receiving STAs the transmitting STA to schedule uplink transmissions. In some examples, the transmitting STA may transmit a poll trigger frame to the receiving STAs to solicit the buffer status reports, and the receiving STAs may transmit their buffer status reports in response to the poll trigger frame.

The buffer status report from each receiving STA may indicate the amount of buffered data at the receiving STA to be transmitted to the transmitting STA. For example, after receiving the buffer status reports from the receiving STAs, the transmitting STA may use this information to determine which of the receiving STAs to transmit uplink data to the transmitting STA. For example, if a buffer status report from a receiving STA indicates that there is data in the receiving STA's buffer awaiting transmission to the transmitting STA, then the transmitting STA may schedule a uplink transmission for the receiving STA. The transmitting STA may then generate the scheduling information transmitted in control transmission 1325-*b* in which the scheduling information schedules uplink transmission for the receiving STAs determined to have buffered data to be transmitted to the transmitting STA.

Figure 14:
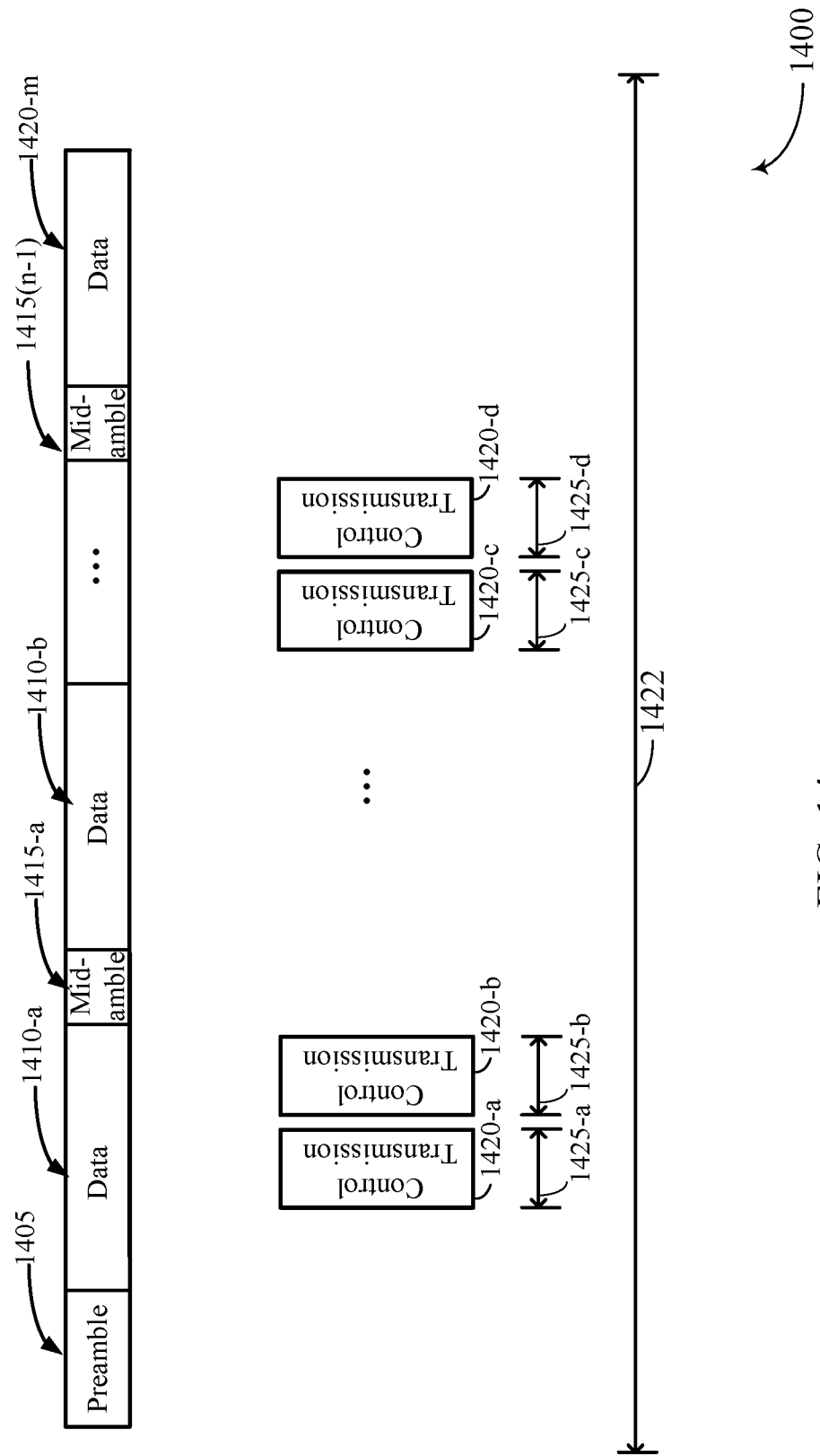

FIG. 14 illustrates an example of a communication timeline 1400 that supports data channel and control/management channel separation in accordance with aspects of the present disclosure. In some examples, communication timeline 1400 may implement aspects of wireless communications systems 100 or 200. Additionally, communication timeline 1400 may support adjusting a modulation and coding scheme (MCS) for a data transmission during a time interval 1422. The adjusting may be achieved based on implementing one or more techniques described above, for example, with respect to FIGS. 3 through 13. Communication timeline 1400 may correspond to communications between two STAs (e.g., transmitting STAs 105, STAs 145, or any other wireless devices in a wireless system) as described above.

A downlink packet may include a preamble 1405, multiple data portions 1410-*a* to 1410-*n*, and midambles 1415-*a* to 1415-(*n*−1) between the data portions 1410-*a* to 1410-*n*. In some examples, a downlink packet may be received by one receiving STA on the data channel. In other examples, the downlink packet may be a MU packet received by multiple receiving STAs, in which the downlink packet may include downlink data for each receiving STA on a different resource unit in the data channel. In this example, each receiving STA may receive its downlink data on the respective RU.

In some examples, a control transmission 1420-*a* in time slot 1425-*a* may contain CQI transmission from the one or more receiving STAs to the transmitting STA, in which the one or more CQIs are generated based on measurements on the current data portion 1410-*a* of the downlink packet For the example of multiple receiving STAs, each receiving STA may receive respective downlink data in the downlink packet on the respective resource unit assigned to the receiving STA. In this example, the CQI from each receiving STA may indicate the quality of the respective RU.

The transmitting STA may adjust one or more MCSs for the next data portion 1410-*b* based on the received one or more CQIs. The transmitting STA may then transmit the one or more MCSs to the one or more receiving STAs in control transmission 1420-*b* in time slot 1425-*b* so that each receiving STA knows which MCS to use to demodulate and decode the next data portion 1410-*b*. For the example of multiple receiving STAs, the transmitting STA may adjust the MCS for each resource unit in the next data portion based on the received CQI for the RU.

As described, the transmitting STA may perform the adjusting for each subsequent data portion in the downlink packet. This allows the transmitting STA to dynamically adjust (update) the MCS for each data portion as the downlink packet is transmitted. FIG. 14 shows the control transmissions 1420-*c* and 1420-*d* for adjusting the MCS of the last data portion 1410-*n*, in which control transmission 1420-*c* in time slot 1425-*c* is used to report CQI information from one or more receiving STAs to the transmitting STA, and control transmission 1330 in time slot 1425-*d* is used transmit one or more MCSs for the last data portion 1410-*n* from the transmitting STA to the one or more receiving STAs. In some examples, different groups of receiving STAs may receive different data portions of the downlink packet 1310. In these aspects, the transmitting STA may schedule a group of receiving STAs for each data portion 1410-*a* to 1410-*n* by transmitting scheduling information in a downlink control transmission for each data portion. By specifying the recipients for each data portion, the transmitting STA is able to change the recipients of the data portions of the downlink packet.

Figure 15:
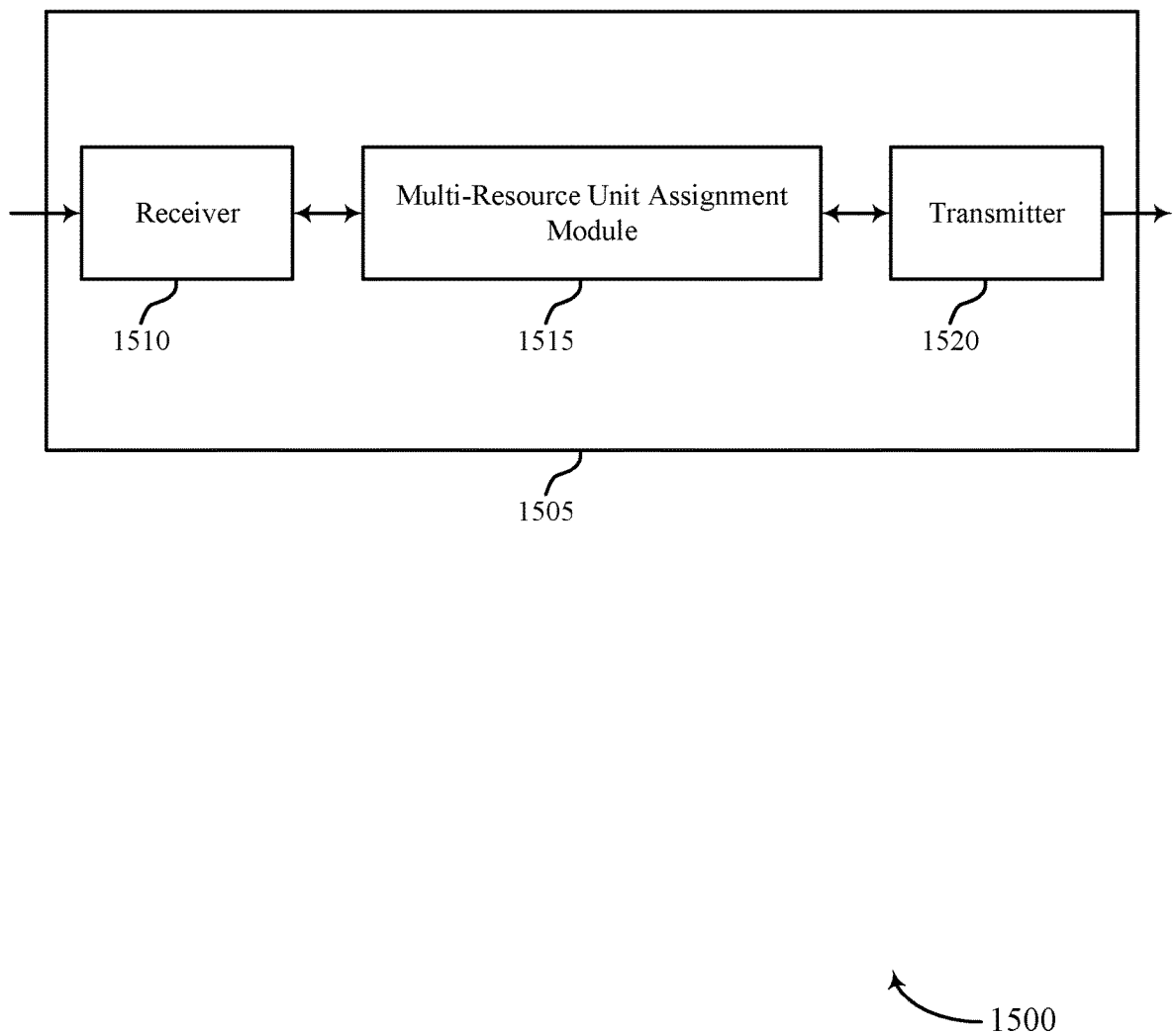
FIGS. 15 and 16 show block diagrams of devices that support data channel and control/management channel separation in accordance with aspects of the present disclosure.

FIG. 15 shows a block diagram 1500 of a device 1505 that supports data channel and control/management channel separation in accordance with aspects of the present disclosure. The device 1505 may be an example of aspects of a transmitting STA (e.g., an AP or a mobile STA) as described herein. The device 1505 may include a receiver 1510, a multi-resource unit assignment module 1515, and a transmitter 1520. The device 1505 may also include a processor. Each of these components may be in communication with one another (e.g., via one or more buses).

The receiver 1510 may receive information such as packets, user data, or control information associated with various information channels (e.g., control channels, data channels, information related to data channel and control/management channel separation, etc.). Information may be passed on to other components of the device. The receiver 1510 may be an example of aspects of the transceiver 1820 described with reference to FIG. 18. The receiver 1510 may utilize a single antenna or a set of antennas.

The multi-resource unit assignment module 1515 may assign a set of resource units for communication with a receiving STA, transmit data to the receiving STA in at least a first resource unit of the set of resource units, and communicate with the receiving STA in at least a second resource unit of the set of resource units, where the communicating includes transmitting or receiving information that is different from the transmitted data of the first resource unit, and where at least a portion of data is transmitted simultaneously with transmitting or receiving a portion of the information communicated with the receiving STA. The multi-resource unit assignment module 1515 may be an example of aspects of the multi-resource unit assignment module 1410 described herein.

The multi-resource unit assignment module 1515, or its sub-components, may be implemented in hardware, code (e.g., software or firmware) executed by a processor, or any combination thereof. If implemented in code executed by a processor, the functions of the multi-resource unit assignment module 1515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The multi-resource unit assignment module 1515, or its sub-components, may be physically located at various positions, including being distributed such that portions of functions are implemented at different physical locations by one or more physical components. In some examples, the multi-resource unit assignment module 1515, or its sub-components, may be a separate and distinct component in accordance with various aspects of the present disclosure. In some examples, the multi-resource unit assignment module 1515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The multi-resource unit assignment module 1515, or its sub-components may be implemented by a wireless modem. The wireless modem may be coupled to the receiver 1510 over a first interface and coupled to the transmitter 1520 over a second interface. In some examples, the wireless modem may obtain messages and signaling received at the receiver 1510 over the first interface. In other examples, the wireless modem may output messages or signaling for transmission by the transmitter 1520 over a second interface.

The transmitter 1520 may transmit signals generated by other components of the device. In some examples, the transmitter 1520 may be collocated with a receiver 1510 in a transceiver module. For example, the transmitter 1520 may be an example of aspects of the transceiver 1820 described with reference to FIG. 18. The transmitter 1520 may utilize a single antenna or a set of antennas.

Figure 16:
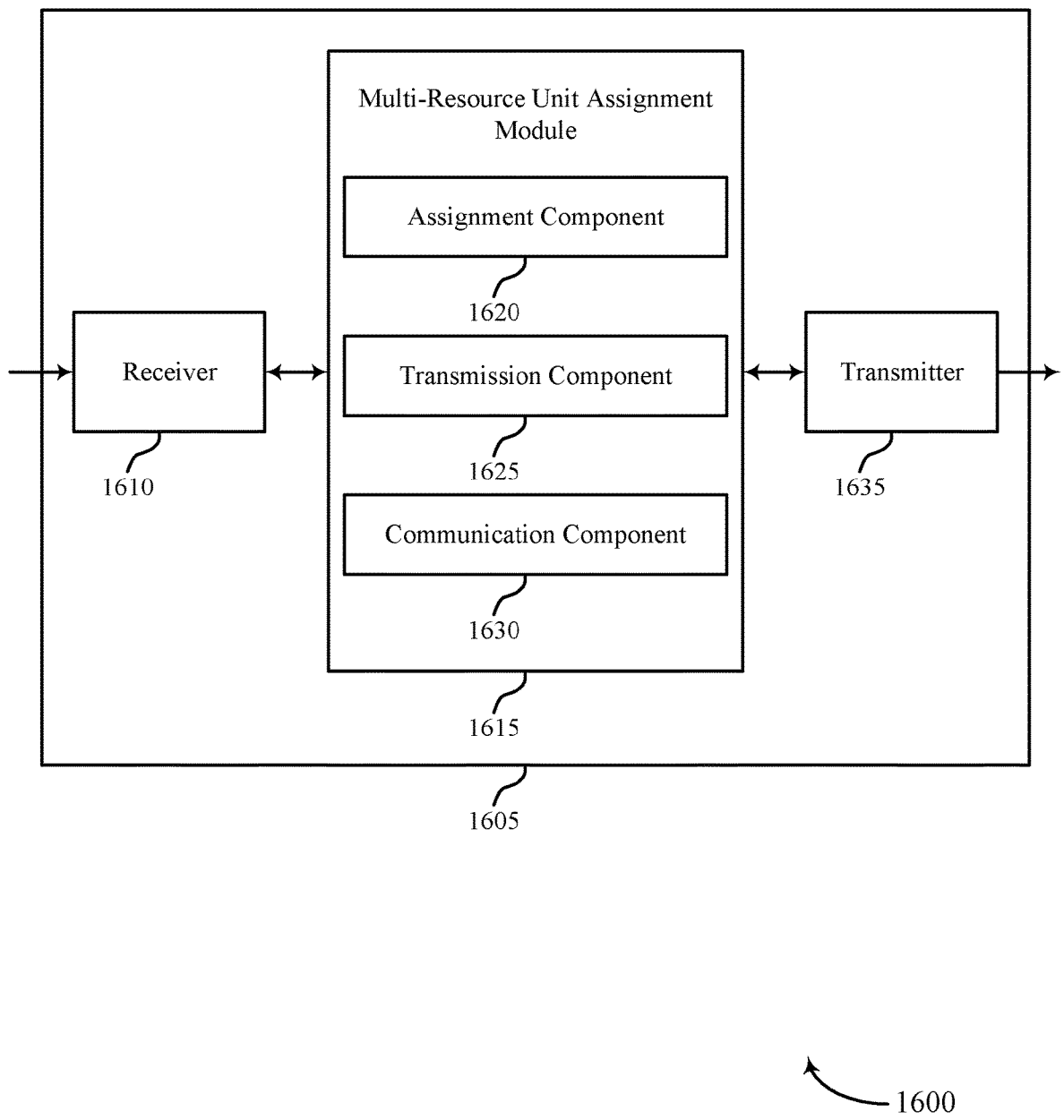

FIG. 16 shows a block diagram 1600 of a device 1605 that supports data channel and control/management channel separation in accordance with aspects of the present disclosure. The device 1605 may be an example of aspects of a device 1105, a transmitting STA, an AP 105, or a mobile STA 115, as described herein. The device 1605 may include a receiver 1610, a multi-resource unit assignment module 1615, and a transmitter 1635. The device 1605 may also include a processor. Each of these components may be in communication with one another (e.g., via one or more buses).

The receiver 1610 may receive information such as packets, user data, or control information associated with various information channels (e.g., control channels, data channels, and information related to data channel and control/management channel separation, etc.). Information may be passed on to other components of the device. The receiver 1610 may be an example of aspects of the transceiver 1820 described with reference to FIG. 18. The receiver 1610 may utilize a single antenna or a set of antennas.

The multi-resource unit assignment module 1615 may be an example of aspects of the multi-resource unit assignment module 1115 as described herein. The multi-resource unit assignment module 1615 may include an assignment component 1620, a transmission component 1625, and a communication component 1630. The multi-resource unit assignment module 1615 may be an example of aspects of the multi-resource unit assignment module 1410 described herein.

The assignment component 1620 may assign a set of resource units for communication with a receiving STA. The transmission component 1625 may transmit data to the receiving STA in at least a first resource unit of the set of resource units. The communication component 1630 may communicate with the receiving STA in at least a second resource unit of the set of resource units, where the communicating includes transmitting or receiving information that is different from the transmitted data of the first resource unit, and where at least a portion of data is transmitted simultaneously with transmitting or receiving a portion of the information communicated with the receiving STA.

The transmitter 1635 may transmit signals generated by other components of the device. In some examples, the transmitter 1635 may be collocated with a receiver 1610 in a transceiver module. For example, the transmitter 1635 may be an example of aspects of the transceiver 1820 described with reference to FIG. 18. The transmitter 1635 may utilize a single antenna or a set of antennas.

Figure 17:
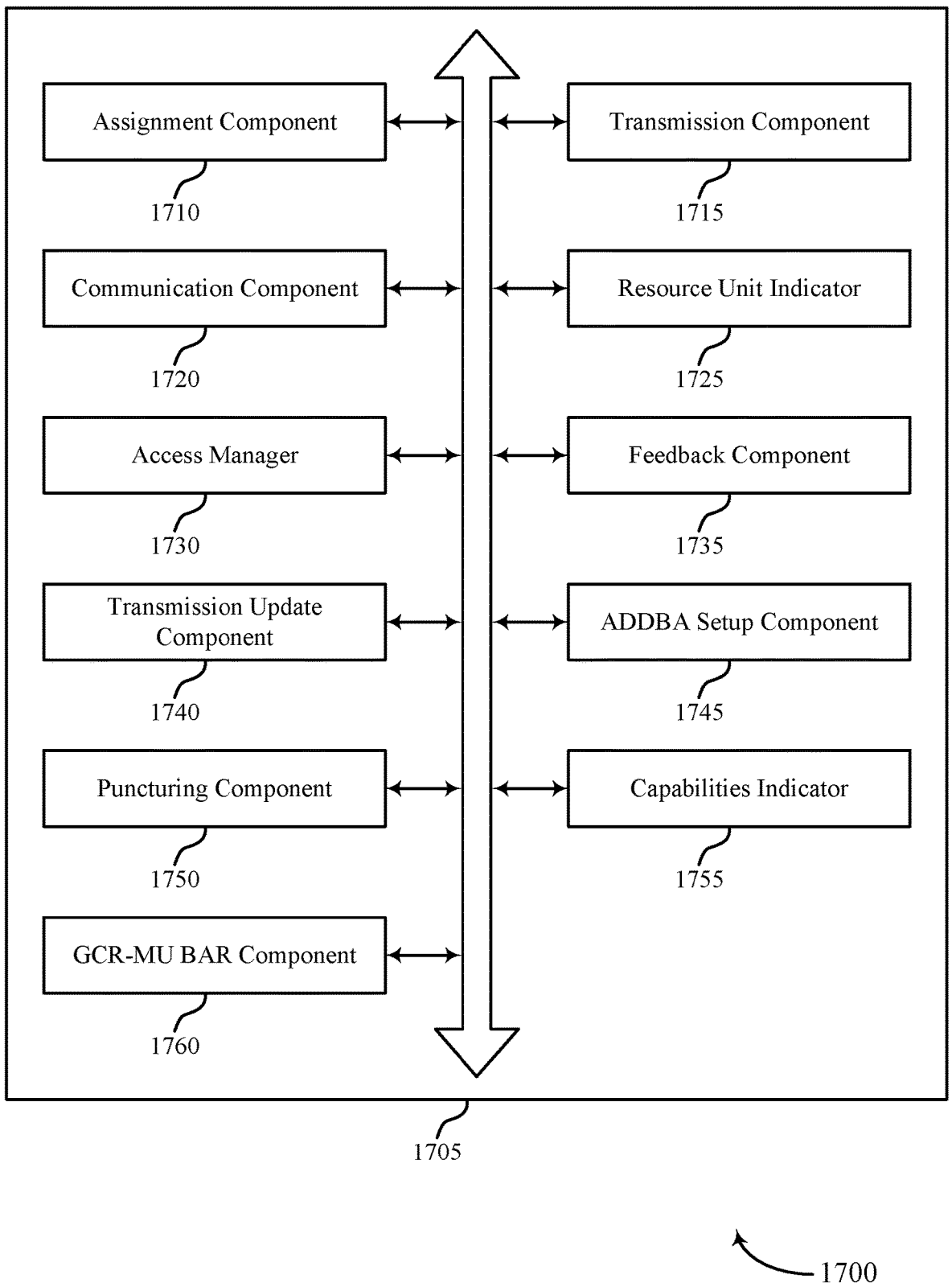
FIG. 17 shows a block diagram of a multi-resource unit assignment module that supports data channel and control/management channel separation in accordance with aspects of the present disclosure.

FIG. 17 shows a block diagram 1700 of a multi-resource unit assignment module 1705 that supports data channel and control/management channel separation in accordance with aspects of the present disclosure. The multi-resource unit assignment module 1705 may be an example of aspects of a multi-resource unit assignment module 1115, 1215, or 1410 as described herein. The multi-resource unit assignment module 1705 may include an assignment component 1710, a transmission component 1715, a communication component 1720, a resource unit indicator 1725, an access manager 1730, a feedback component 1735, a transmission update component 1740, an ADDBA setup component 1745, a puncturing component 1750, a capabilities indicator 1755, and a GCR-MU BAR component 1760. Each of these modules may communicate, directly or indirectly, with one another (e.g., via one or more buses).

The assignment component 1710 may assign a set of resource units for communication with a receiving STA. In some examples, assigning the set of resource units may involve assigning resource units for an MU PPDU to one or more STAs, where the resource units include the set of resource units. In some examples, the resource units further include one or more additional resource units for communication with one or more additional STAs.

In some examples, assigning the set of resource units may involve the assignment component 1710 assigning a packet to each resource unit of the set of resource units based on a bandwidth of each resource unit. In some examples, a first resource unit may span a first bandwidth and a second resource unit may span a second bandwidth greater than the first bandwidth. For example, the assignment component 1710 may assign a first packet to at least the first resource unit and a second packet longer than the first packet to at least the second resource unit based on the second bandwidth being greater than the first bandwidth.

The transmission component 1715 may transmit data to the receiving STA in at least a first resource unit of the set of resource units. In some examples, the data includes unicast data. The transmitting may include transmitting the data on a data channel. The data may include a long PPDU including a set of PSDUs, each PSDU separated by a midamble.

The communication component 1720 may communicate with the receiving STA in at least a second resource unit of the set of resource units. The communicating may include transmitting or receiving information that is different from the transmitted data of the first resource unit, and at least a portion of data may be transmitted simultaneously with transmitting or receiving a portion of the information communicated with the receiving STA. In some examples, the second resource unit is an example of a broadcast resource unit.

In some examples, the additional information includes broadcast data. In some examples, the broadcast data may contain broadcast data specific to a single BSS, and the communication component 1720 may transmit broadcast data for a set of BSSs to the receiving STA in at least a third resource unit of the set of resource units, where at least a portion of the unicast data, the broadcast data specific to the single BSS, and the broadcast data for the set of BSSs are transmitted simultaneously.

In some examples, the communication component 1720 may transmit additional information to the receiving STA in at least the second resource unit of the set of resource units. In some examples, the additional information includes control information, management information, or a combination thereof. In some examples, if the additional information contains control information, the communication component 1720 may transmit management information to the receiving STA in at least a third resource unit of the set of resource units, where at least a portion of transmitting the data, the control information, and the management information occur simultaneously.

In some examples, the communicating includes transmitting service information on a control channel. The service information may be transmitted during one or more periodic service periods. In some examples, the service information indicates one or more STAs for data reception on one or more data channels, timing for the data reception on the one or more data channels, parameters for a next midamble, or a combination thereof.

The resource unit indicator 1725 may transmit, to the receiving STA, an indication of the second resource unit, where the indication includes a broadcast ID or a special resource unit ID that indicates the second resource unit includes control information or management information. In some examples, the second resource unit contains a primary bandwidth for an AP.

The access manager 1730 may maintain access to the data channel during each midamble separating the set of PSDUs. In some examples, the access manager 1730 may identify an absence of IFS being scheduled on the data channel, and may skip performing a contention procedure for the data channel due to the absence of the IFS, where the access is maintained on the data channel based on the skipping.

The feedback component 1735 may receive feedback information from the receiving STA on the control channel based on the service information, where the feedback information includes an ACK/NACK message, a BQR, a CQI report, or a combination thereof for the data channel. In some examples, the feedback component 1735 may handle the feedback information based on an on-going data transmission on the data channel. In some examples, the feedback component 1735 may monitor for the feedback information on the control channel, may identify that a feedback timeout period has elapsed, and may monitor for the feedback information on the data channel based on identifying that the feedback timeout period has elapsed.

The transmission update component 1740 may update an additional data transmission to the receiving STA based on the feedback information. In some examples, the transmission update component 1740 may identify missing data for the receiving STA based on the feedback information, and may add the missing data to a data queue for transmission to the receiving STA. Additionally or alternatively, the transmission update component 1740 may adapt a coding rate for the additional data transmission based on the feedback information.

The ADDBA setup component 1745 may perform an ADDBA setup procedure with the receiving STA, where the ADDBA setup procedure indicates whether the corresponding BA session applies to the data channel, the control channel, or both.

The puncturing component 1750 may puncture a SU PPDU to generate a set of discontinuous sub-channels, where the first resource unit corresponds to a first discontinuous sub-channel of the set of discontinuous sub-channels and the second resource unit corresponds to a second discontinuous sub-channel of the set of discontinuous sub-channels.

The capabilities indicator 1755 may indicate, to the receiving STA, support for at least the portion of the transmitting and at least the portion of the communicating occurring simultaneously.

The GCR-MU BAR component 1760 may transmit a GCR-MU BAR in the second resource unit, and may receive, from the receiving STA, an ACK/NACK message based on the GCR-MU BAR.

Figure 18:
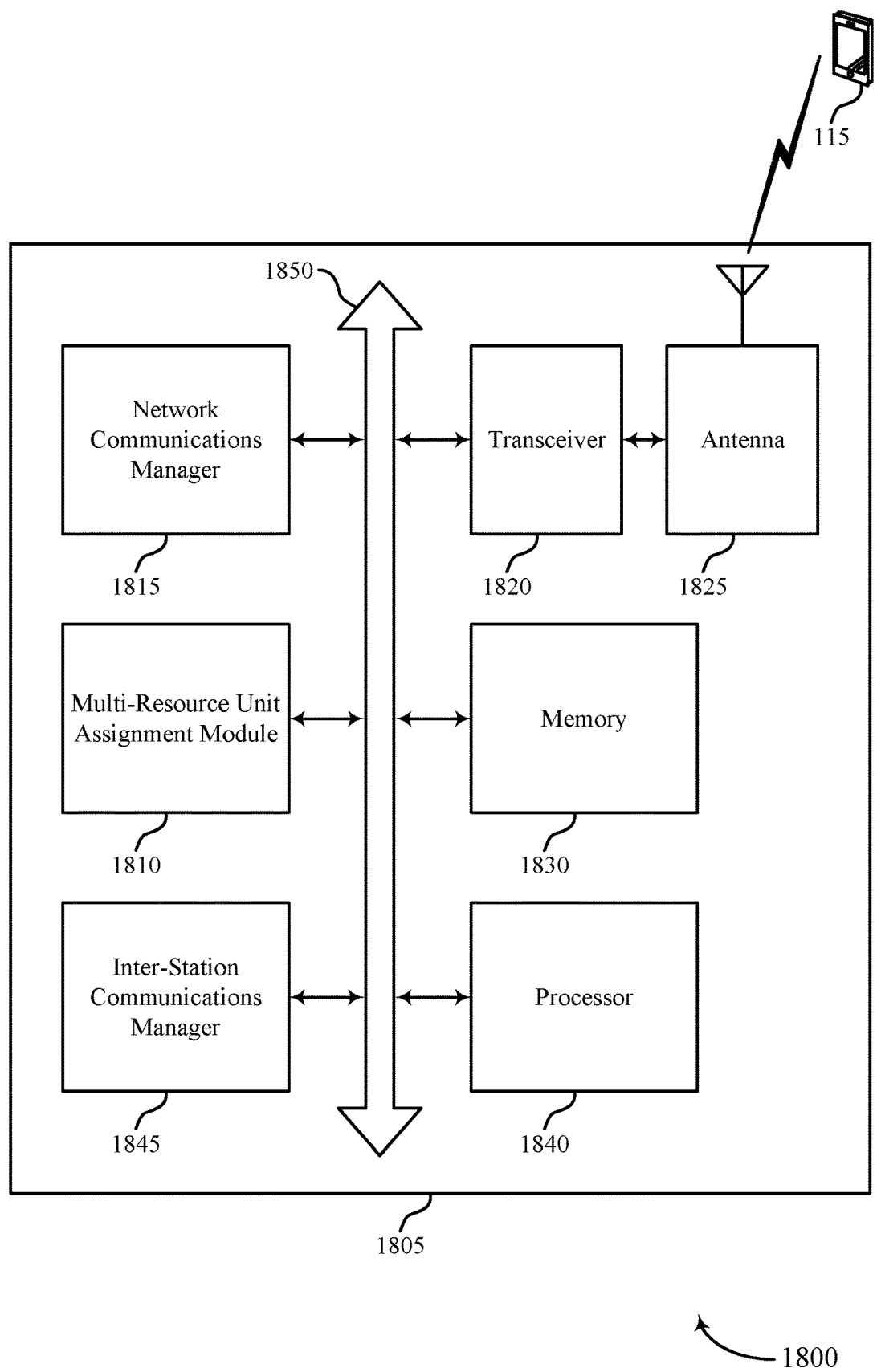
FIG. 18 shows a diagram of a system including a device that supports data channel and control/management channel separation in accordance with aspects of the present disclosure.

FIG. 18 shows a diagram of a system 1800 including a device 1805 that supports data channel and control/management channel separation in accordance with aspects of the present disclosure. The device 1805 may be an example of or include the components of device 1105, device 1205, a transmitting STA, an AP, a mobile STA, or some combination of these as described herein. The device 1805 may include components for bi-directional voice and data communications including components for transmitting and receiving communications, including a multi-resource unit assignment module 1810, a network communications manager 1815, a transceiver 1820, an antenna 1825, memory 1830, a processor 1840, and an inter-station communications manager 1845. These components may be in electronic communication via one or more buses (e.g., bus 1850).

The multi-resource unit assignment module 1810 may assign a set of resource units for communication with a receiving STA, transmit data to the receiving STA in at least a first resource unit of the set of resource units, and communicate with the receiving STA in at least a second resource unit of the set of resource units, where the communicating includes transmitting or receiving information that is different from the transmitted data of the first resource unit, and where at least a portion of data is transmitted simultaneously with transmitting or receiving a portion of the information communicated with the receiving STA.

The network communications manager 1815 may manage communications with the core network (e.g., via one or more wired or wireless backhaul links). For example, the network communications manager 1815 may manage the transfer of data communications for client devices, such as one or more STAs 115.

The transceiver 1820 may communicate bi-directionally, via one or more antennas, wired, or wireless links as described above. For example, the transceiver 1820 may represent a wireless transceiver and may communicate bi-directionally with another wireless transceiver. The transceiver 1820 may also include a modem to modulate the packets and provide the modulated packets to the antennas for transmission, and to demodulate packets received from the antennas.

In some examples, the wireless device may include a single antenna 1825. However, in some examples the device may have more than one antenna 1825, which may be capable of concurrently transmitting or receiving multiple wireless transmissions.

The memory 1830 may include random access memory (RAM) and read-only memory (ROM). The memory 1830 may store computer-readable, computer-executable code including instructions that, when executed, cause the processor to perform various functions described herein. In some examples, the memory 1830 may contain, among other things, a basic input/output system (BIOS) which may control basic hardware or software operation such as the interaction with peripheral components or devices.

The processor 1840 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some examples, the processor 1840 may be configured to operate a memory array using a memory controller. In other examples, a memory controller may be integrated into processor 1840. The processor 1840 may be configured to execute computer-readable instructions stored in a memory to perform various functions (e.g., functions or tasks supporting data channel and control/management channel separation).

The inter-station communications manager 1845 may manage communications with other APs 105 or STAs 115, and may include a controller or scheduler for controlling communications with STAs 115 in cooperation with other APs 105. For example, the inter-station communications manager 1845 may coordinate scheduling for transmissions to STAs 115 for various interference mitigation techniques such as beamforming or joint transmission. In some examples, the inter-station communications manager 1845 may provide an X2 interface within a Long Term Evolution (LTE), LTE-Advanced (LTE-A), or wireless local area network (WLAN) wireless communication network technology to provide communication between STAs (e.g., APs 105 or STAs 115).

Figure 19:
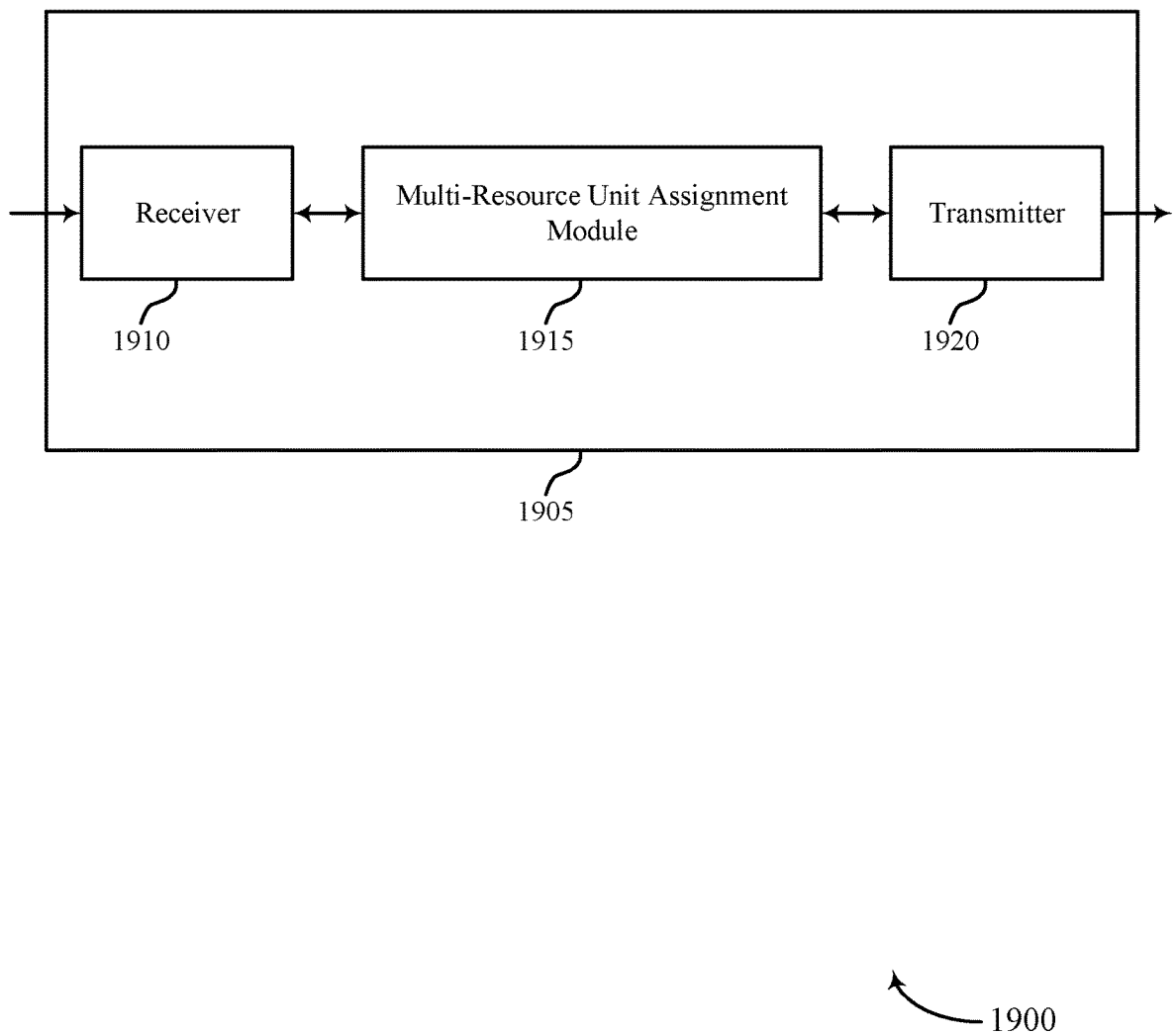
FIGS. 19 and 20 show block diagrams of devices that support data channel and control/management channel separation in accordance with aspects of the present disclosure.

FIG. 19 shows a block diagram 1900 of a device 1905 that supports data channel and control/management channel separation in accordance with aspects of the present disclosure. The device 1905 may be an example of aspects of a receiving STA (e.g., an AP or mobile STA) as described herein. The device 1905 may include a receiver 1910, a multi-resource unit assignment module 1919, and a transmitter 1920. The device 1905 may also include a processor. Each of these components may be in communication with one another (e.g., via one or more buses).

Receiver 1910 may receive information such as packets, user data, or control information associated with various information channels (e.g., control channels, data channels, and information related to data channel and control/management channel separation, etc.). Information may be passed on to other components of the device. The receiver 1910 may be an example of aspects of the transceiver 2220 described with reference to FIG. 22. The receiver 1910 may utilize a single antenna or a set of antennas.

The multi-resource unit assignment module 1919 may identify a set of resource units for communication with a transmitting STA, receive data from the transmitting STA in at least a first resource unit of the set of resource units, and communicate with the transmitting STA in at least a second resource unit of the set of resource units. The communicating may include receiving or transmitting information that is different from the received data of the first resource unit, and at least a portion of data may be received simultaneously with receiving or transmitting a portion of the information communicated with the transmitting STA. The multi-resource unit assignment module 1919 may be an example of aspects of the multi-resource unit assignment module 1810 described herein.

The multi-resource unit assignment module 1919, or its sub-components, may be implemented in hardware, code (e.g., software or firmware) executed by a processor, or any combination thereof. If implemented in code executed by a processor, the functions of the multi-resource unit assignment module 1919, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The multi-resource unit assignment module 1919, or its sub-components, may be physically located at various positions, including being distributed such that portions of functions are implemented at different physical locations by one or more physical components. In some examples, the multi-resource unit assignment module 1919, or its sub-components, may be a separate and distinct component in accordance with various aspects of the present disclosure. In some examples, the multi-resource unit assignment module 1919, or its sub-components, may be combined with one or more other hardware components, including but not limited to an I/O component, a transceiver, a network server, another computing device, one or more other components described in the present disclosure, or a combination thereof in accordance with various aspects of the present disclosure.

The multi-resource unit assignment module 1919, or its sub-components may be implemented by a wireless modem. The wireless modem may be coupled to the receiver 1910 over a first interface and coupled to the transmitter 1920 over a second interface. In some examples, the wireless modem may obtain messages and signaling received at the receiver 1910 over the first interface. In other examples, the wireless modem may output messages or signaling for transmission by the transmitter 1920 over a second interface.

Transmitter 1920 may transmit signals generated by other components of the device. In some examples, the transmitter 1920 may be collocated with a receiver 1910 in a transceiver module. For example, the transmitter 1920 may be an example of aspects of the transceiver 2220 described with reference to FIG. 20. The transmitter 1920 may utilize a single antenna or a set of antennas.

Figure 20:
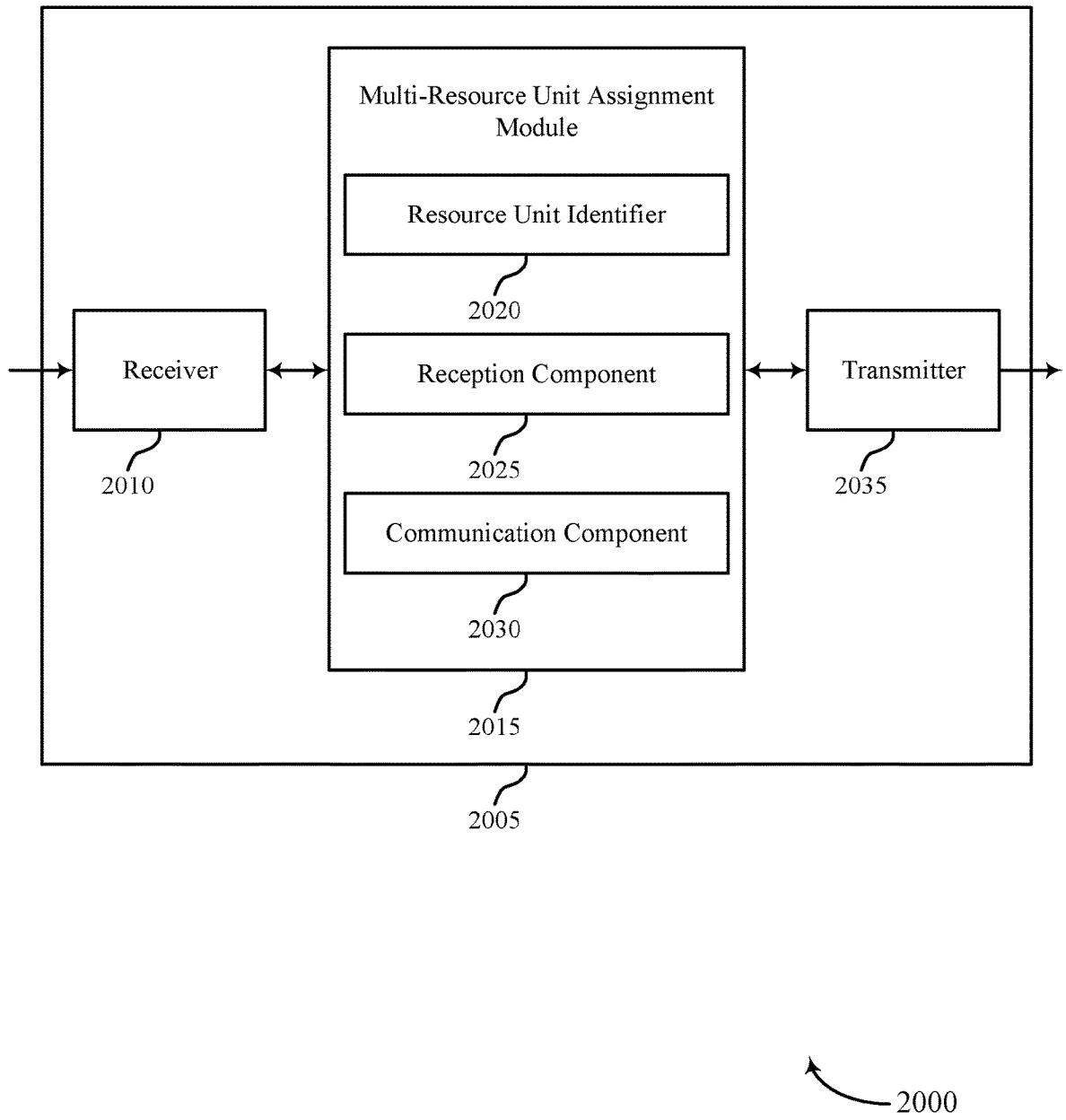

FIG. 20 shows a block diagram 2000 of a device 2005 that supports data channel and control/management channel separation in accordance with aspects of the present disclosure. The device 2005 may be an example of aspects of a device 1505 or a STA 115 as described herein. The device 2005 may include a receiver 2010, a multi-resource unit assignment module 2015, and a transmitter 2035. The device 2005 may also include a processor. Each of these components may be in communication with one another (e.g., via one or more buses).

Receiver 2010 may receive information such as packets, user data, or control information associated with various information channels (e.g., control channels, management channels, data channels, and information related to data channel and control/management channel separation, etc.). Information may be passed on to other components of the device. The receiver 2010 may be an example of aspects of the transceiver 2220 described with reference to FIG. 22. The receiver 2010 may utilize a single antenna or a set of antennas.

The multi-resource unit assignment module 2015 may be an example of aspects of the multi-resource unit assignment module 1515 as described herein. The multi-resource unit assignment module 2015 may include a resource unit identifier 2020, a reception component 2025, and a communication component 2030. The multi-resource unit assignment module 2015 may be an example of aspects of the multi-resource unit assignment module 1810 described herein.

The resource unit identifier 2020 may identify a set of resource units for communication with a transmitting STA. The reception component 2025 may receive data from the transmitting STA in at least a first resource unit of the set of resource units. The communication component 2030 may communicate with the transmitting STA in at least a second resource unit of the set of resource units, where the communicating includes receiving or transmitting information that is different from the received data of the first resource unit, and where at least a portion of data is received simultaneously with receiving or transmitting a portion of the information communicated with the transmitting STA.

Transmitter 2035 may transmit signals generated by other components of the device. In some examples, the transmitter 2035 may be collocated with a receiver 2010 in a transceiver module. For example, the transmitter 2035 may be an example of aspects of the transceiver 2220 described with reference to FIG. 22. The transmitter 2035 may utilize a single antenna or a set of antennas.

Figure 21:
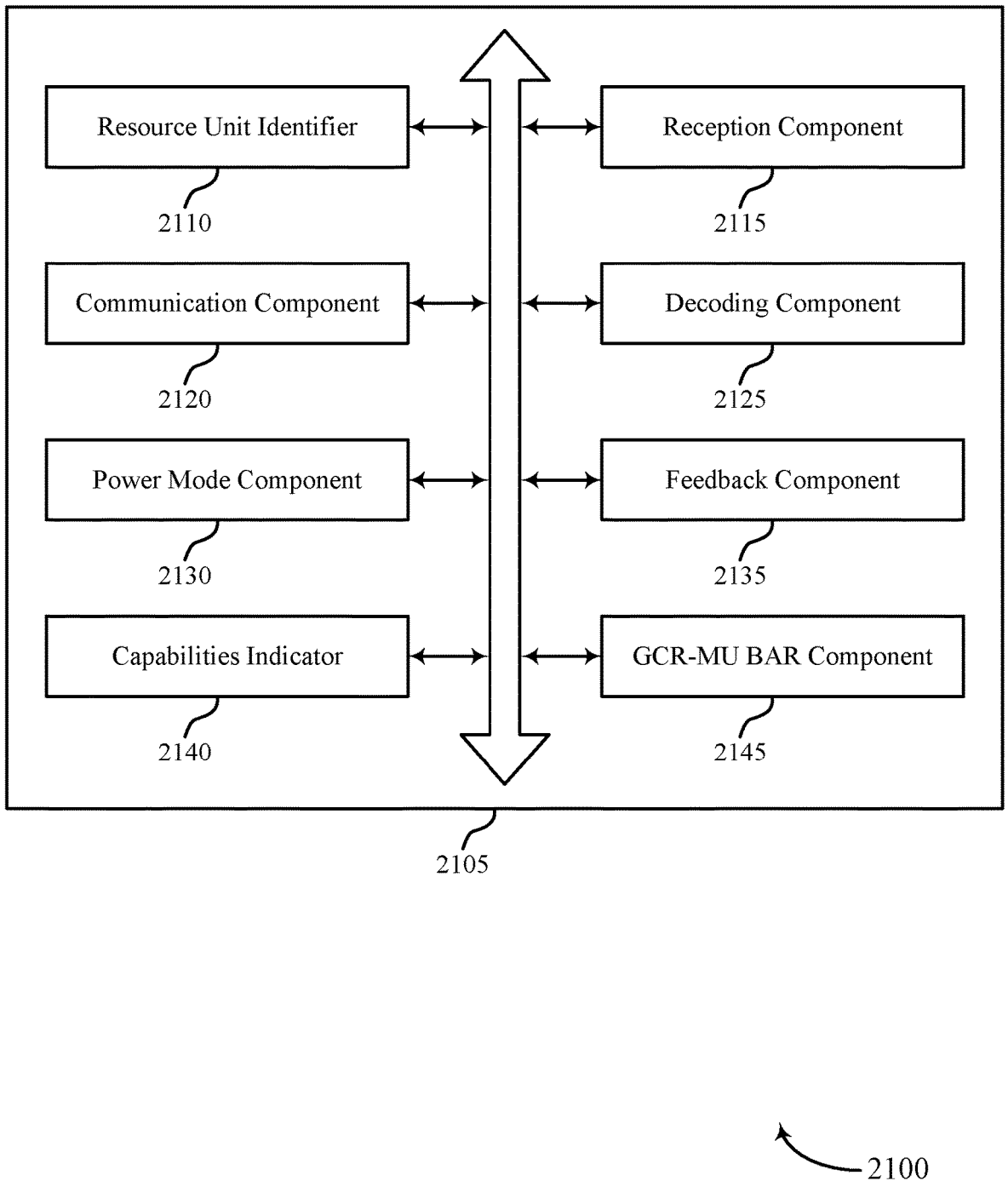
FIG. 21 shows a block diagram of a multi-resource unit assignment module that supports data channel and control/management channel separation in accordance with aspects of the present disclosure.

FIG. 21 shows a block diagram 2100 of a multi-resource unit assignment module 2105 that supports data channel and control/management channel separation in accordance with aspects of the present disclosure. The multi-resource unit assignment module 2105 may be an example of aspects of a multi-resource unit assignment module 1515, a multi-resource unit assignment module 1615, or a multi-resource unit assignment module 1810 described herein. The multi-resource unit assignment module 2105 may include a resource unit identifier 2110, a reception component 2115, a communication component 2120, a decoding component 2125, a power mode component 2130, a feedback component 2135, a capabilities indicator 2140, and a GCR-MU BAR component 2145. Each of these modules may communicate, directly or indirectly, with one another (e.g., via one or more buses).

The resource unit identifier 2110 may identify a set of resource units for communication with a transmitting STA. In some examples, the resource unit identifier 2110 may receive, from the transmitting STA, an indication of a second resource unit, where the indication includes a broadcast ID or a special resource unit ID that indicates the second resource unit contains control information or management information. In some examples, the second resource unit includes a primary bandwidth for the transmitting STA.

The reception component 2115 may receive data from the transmitting STA in at least a first resource unit of the set of resource units. In some examples, the receiving includes receiving the data on a data channel. The data may include a long PPDU containing a set of PSDUs, each PSDU separated by a midamble.

The communication component 2120 may communicate with the transmitting STA in at least a second resource unit of the set of resource units. The communicating may include receiving or transmitting information that is different from the received data of the first resource unit, and at least a portion of the data may be received simultaneously with receiving or transmitting a portion of the information communicated with the transmitting STA.

In some examples, the communicating may involve the communication component 2120 receiving additional information from the transmitting STA in at least the second resource unit of the set of resource units. In some examples, the additional information includes control information, management information, or a combination thereof. In some examples, the additional information contains control information. In these examples, the communication component 2120 may receive management information from the transmitting STA in at least a third resource unit of the set of resource units, where at least a portion of receiving the data, the control information, and the management information occur simultaneously.

In some examples, the communicating includes receiving service information on a control channel. The service information may be received during one or more periodic service periods. In some examples, the service information indicates timing for data reception on the data channel, parameters for a next midamble, or a combination thereof.

The decoding component 2125 may decode the data and the additional information using a set of decode chains, where at least a portion of the decoding the data and at least a portion of the decoding the additional information occur simultaneously.

The power mode component 2130 may transition to a first power mode for receiving the service information during the one or more periodic service periods. In some examples, the power mode component 2130 may transition to a second power mode based on the service information, where the second power mode is different from the first power mode.

The feedback component 2135 may transmit feedback information to the transmitting STA on the control channel based on the service information, where the feedback information includes an ACK/NACK message, a BQR, a CQI report, or a combination thereof for the data channel. In some examples, the feedback component 2135 may modify the feedback information based on an on-going data transmission on the data channel.

The feedback component 2135 may perform a contention procedure on the control channel to transmit the feedback information. In some examples, the feedback component 2135 may identify that a feedback timeout period has elapsed prior to transmitting the feedback information, and the feedback component 2135 may transmit the feedback information during a TxOp on the data channel based on the identifying that the feedback timeout period has elapsed.

The capabilities indicator 2140 may indicate, to the transmitting STA, support for at least the portion of the receiving and at least the portion of the communicating occurring simultaneously.

The GCR-MU BAR component 2145 may receive a GCR-MU BAR in the second resource unit. In some examples, the GCR-MU BAR component 2145 may transmit, to the transmitting STA, an ACK/NACK message based on the GCR-MU BAR.

Figure 22:
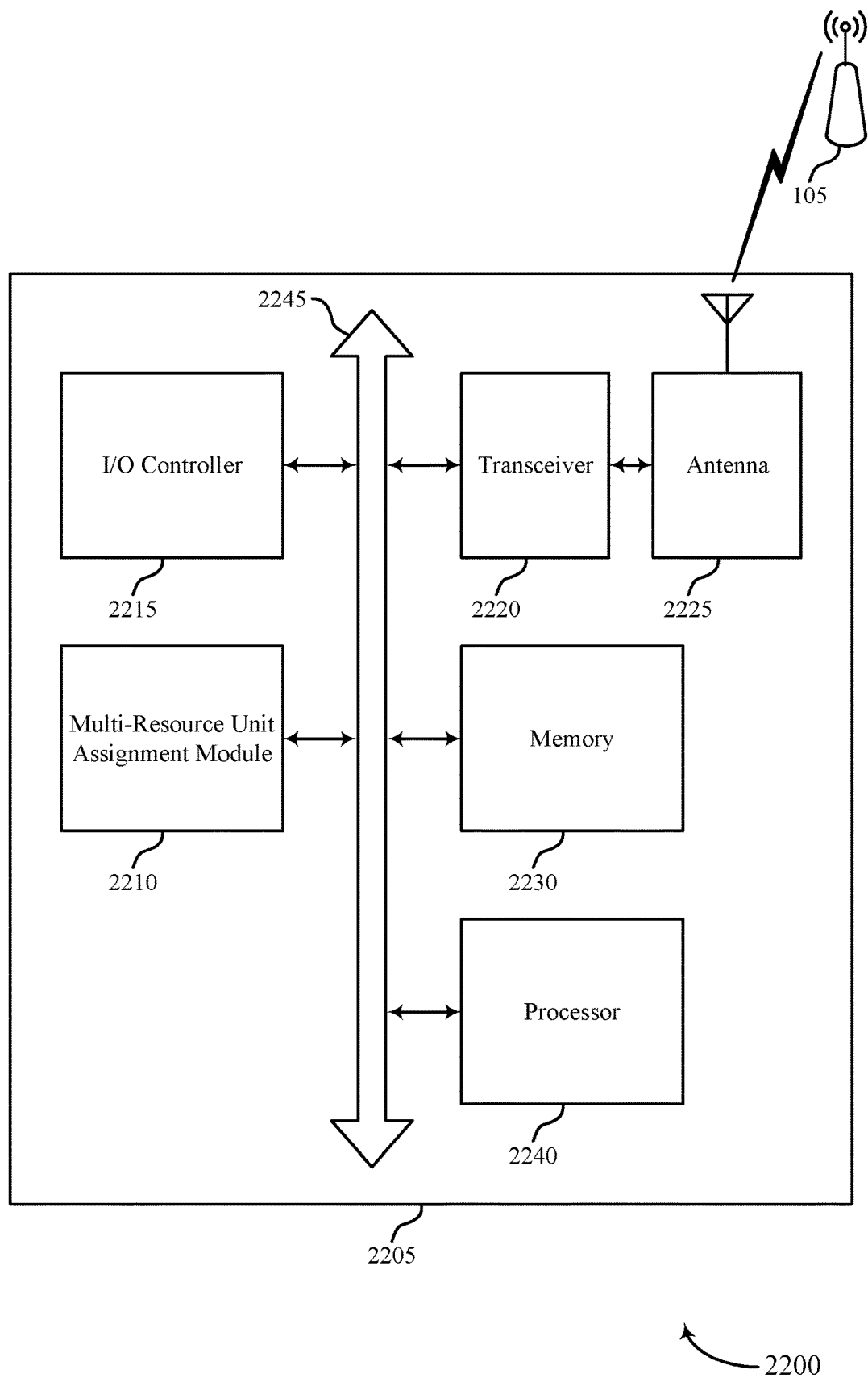
FIG. 22 shows a diagram of a system including a device that supports data channel and control/management channel separation in accordance with aspects of the present disclosure.

FIG. 22 shows a diagram of a system 2200 including a device 2205 that supports data channel and control/management channel separation in accordance with aspects of the present disclosure. The device 2205 may be an example of or include the components of device 1505, device 1605, or a STA as described herein. The device 2205 may include components for bi-directional voice and data communications including components for transmitting and receiving communications, including a multi-resource unit assignment module 2210, an I/O controller 2215, a transceiver 2220, an antenna 2225, memory 2230, and a processor 2240. These components may be in electronic communication via one or more buses (e.g., bus 2245).

The multi-resource unit assignment module 2210 may identify a set of resource units for communication with a transmitting STA, receive data from the transmitting STA in at least a first resource unit of the set of resource units, and communicate with the transmitting STA in at least a second resource unit of the set of resource units, where the communicating includes receiving or transmitting information that is different from the received data of the first resource unit, and where at least a portion of data is received simultaneously with receiving or transmitting a portion of the information communicated with the transmitting STA.

I/O controller 2215 may manage input and output signals for device 2205. I/O controller 2215 may also manage peripherals not integrated into device 2205. In some examples, I/O controller 2215 may represent a physical connection or port to an external peripheral. In some examples, I/O controller 2215 may utilize an operating system such as iOS®, ANDROID®, MS-DOS®, MS-WINDOWS®, OS/2®, UNIX®, LINUX®, or another known operating system. In other examples, I/O controller 2215 may represent or interact with a modem, a keyboard, a mouse, a touchscreen, or a similar device. In some examples, I/O controller 2215 may be implemented as part of a processor. In some examples, a user may interact with device 2205 via I/O controller 2215 or via hardware components controlled by I/O controller 2215.

Transceiver 2220 may communicate bi-directionally, via one or more antennas, wired, or wireless links as described above. For example, the transceiver 2220 may represent a wireless transceiver and may communicate bi-directionally with another wireless transceiver. The transceiver 2220 may also include a modem to modulate the packets and provide the modulated packets to the antennas for transmission, and to demodulate packets received from the antennas.

In some examples, the wireless device may include a single antenna 2225. However, in some examples the device may have more than one antenna 2225, which may be capable of concurrently transmitting or receiving multiple wireless transmissions.

Memory 2230 may include RAM and ROM. The memory 2230 may store computer-readable, computer-executable software 2235 including instructions that, when executed, cause the processor to perform various functions described herein. In some examples, the memory 2230 may contain, among other things, a BIOS which may control basic hardware or software operation such as the interaction with peripheral components or devices.

Processor 2240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some examples, processor 2240 may be configured to operate a memory array using a memory controller. In other examples, a memory controller may be integrated into processor 2240. Processor 2240 may be configured to execute computer-readable instructions stored in a memory to perform various functions (e.g., functions or tasks supporting data channel and control/management channel separation).

Figure 23:
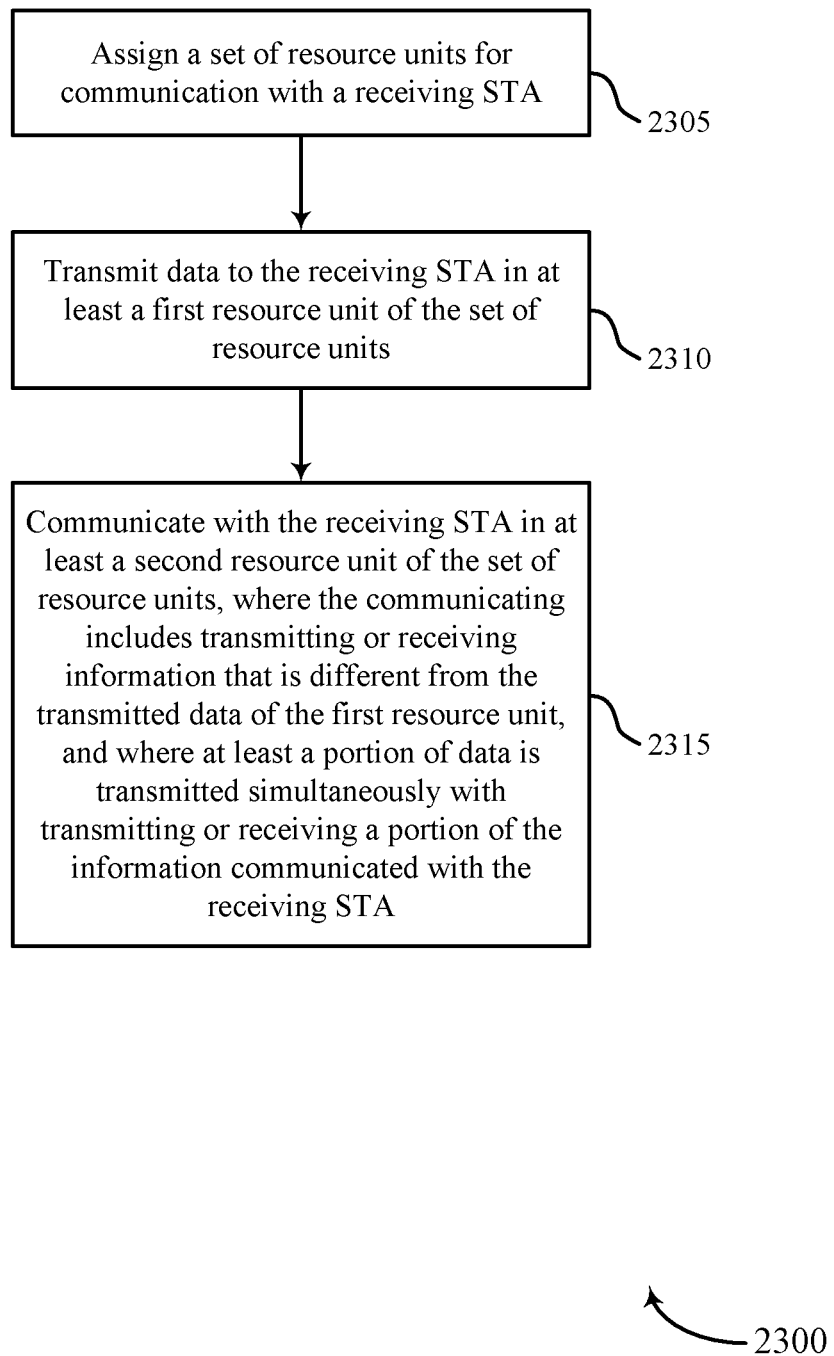
FIGS. 23 through 31 show flowcharts illustrating methods that support data channel and control/management channel separation in accordance with aspects of the present disclosure.

FIG. 23 shows a flowchart illustrating a method 2300 that supports data channel and control/management channel separation in accordance with aspects of the present disclosure. The operations of method 2300 may be implemented by a transmitting STA (e.g., an AP or mobile STA) or its components as described herein. For example, the operations of method 2300 may be performed by a multi-resource unit assignment module as described with reference to FIGS. 15 through 18. In some examples, an AP or STA may execute a set of instructions to control the functional elements of the AP or STA to perform the functions described below. Additionally or alternatively, an AP or STA may perform aspects of the functions described below using special-purpose hardware.

At 2305, the transmitting STA may assign a set of resource units for communication with a receiving STA. The operations of 2305 may be performed according to the methods described herein. In some examples, aspects of the operations of 2305 may be performed by an assignment component as described with reference to FIGS. 15 through 18.

At 2310, the transmitting STA may transmit data to the receiving STA in at least a first resource unit of the set of resource units. The operations of 2310 may be performed according to the methods described herein. In some examples, aspects of the operations of 2310 may be performed by a transmission component as described with reference to FIGS. 15 through 18.

At 2315, the transmitting STA may communicate with the receiving STA in at least a second resource unit of the set of resource units, where the communicating includes transmitting or receiving information that is different from the transmitted data of the first resource unit, and where at least a portion of data is transmitted simultaneously with transmitting or receiving a portion of the information communicated with the receiving STA. The operations of 2315 may be performed according to the methods described herein. In some examples, aspects of the operations of 2315 may be performed by a communication component as described with reference to FIGS. 15 through 18.

Figure 24:
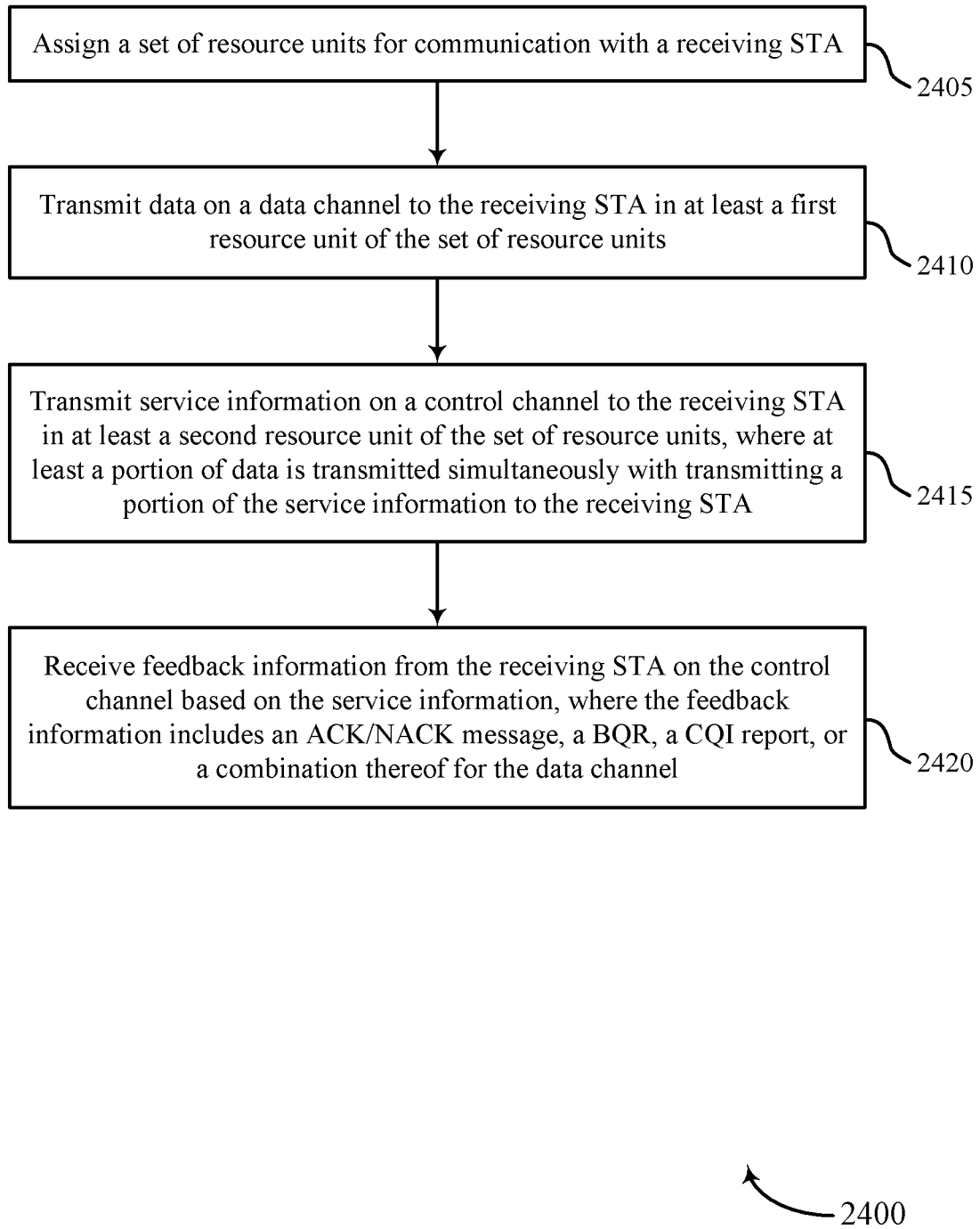

FIG. 24 shows a flowchart illustrating a method 2400 that supports data channel and control/management channel separation in accordance with aspects of the present disclosure. The operations of method 2400 may be implemented by a transmitting STA, such as an AP or mobile STA, or its components as described herein. For example, the operations of method 2400 may be performed by a multi-resource unit assignment module as described with reference to FIGS. 15 through 18. In some examples, a transmitting STA may execute a set of instructions to control the functional elements of the transmitting STA to perform the functions described below. Additionally or alternatively, a transmitting STA may perform aspects of the functions described below using special-purpose hardware.

At 2405, the transmitting STA may assign a set of resource units for communication with a receiving STA. The operations of 2405 may be performed according to the methods described herein. In some examples, aspects of the operations of 2405 may be performed by an assignment component as described with reference to FIGS. 15 through 18.

At 2410, the transmitting STA may transmit data to the receiving STA in at least a first resource unit of the set of resource units. The transmitting may involve transmitting the data on a data channel. The operations of 2410 may be performed according to the methods described herein. In some examples, aspects of the operations of 2410 may be performed by a transmission component as described with reference to FIGS. 15 through 18.

At 2415, the transmitting STA may communicate with the receiving STA in at least a second resource unit of the set of resource units, where the communicating includes transmitting or receiving information that is different from the transmitted data, and where at least a portion of data is transmitted simultaneously with transmitting or receiving a portion of the information communicated with the receiving STA. The communicating may involve transmitting service information on a control channel. The operations of 2415 may be performed according to the methods described herein. In some examples, aspects of the operations of 2415 may be performed by a communication component as described with reference to FIGS. 15 through 18.

At 2420, the transmitting STA may receive feedback information from the receiving STA on the control channel based on the service information, where the feedback information includes an ACK/NACK message, a BQR, a CQI report, or a combination thereof for the data channel. The operations of 2420 may be performed according to the methods described herein. In some examples, aspects of the operations of 2420 may be performed by a feedback component as described with reference to FIGS. 15 through 18.

Figure 25:
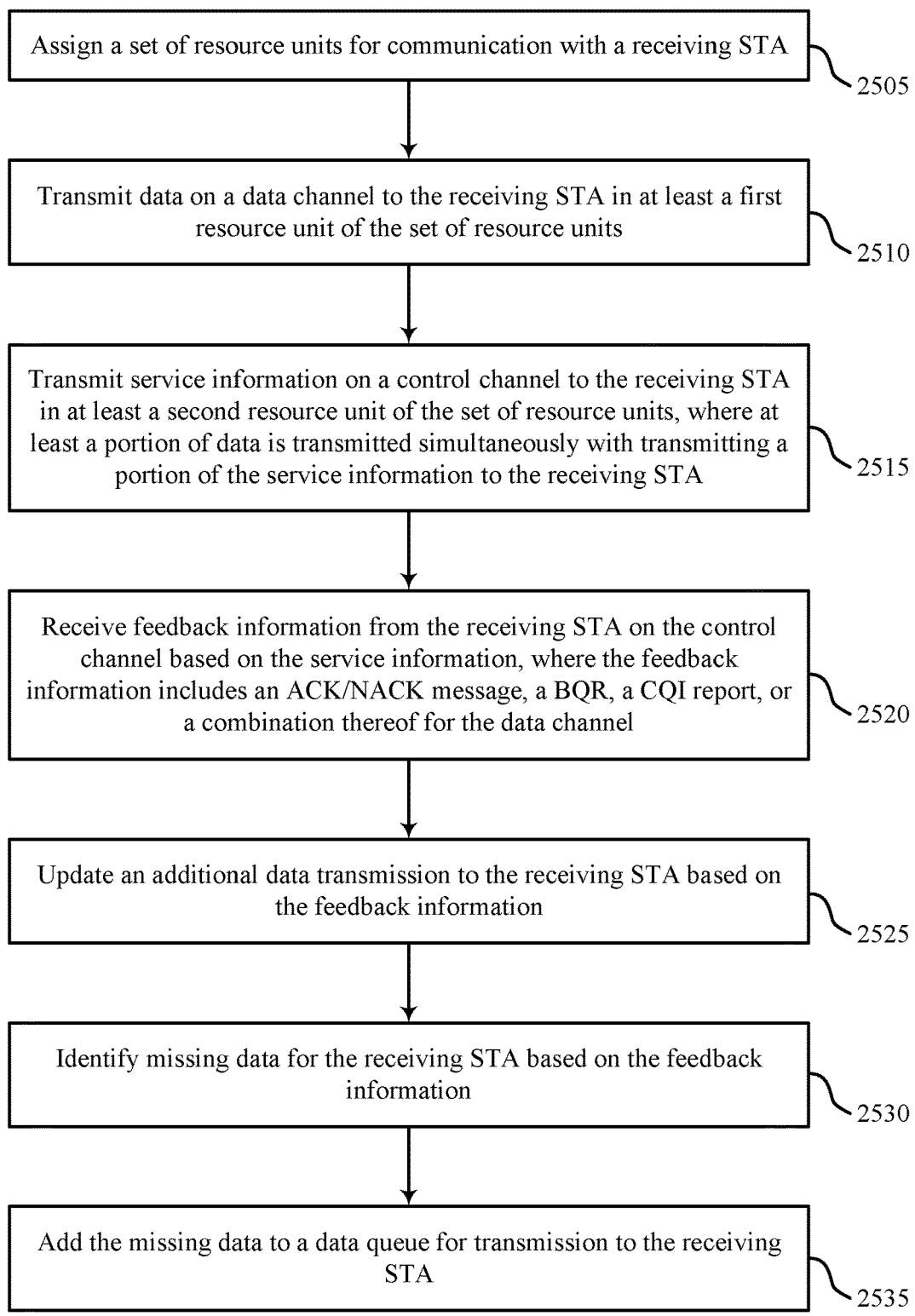

FIG. 25 shows a flowchart illustrating a method 2500 that supports data channel and control/management channel separation in accordance with aspects of the present disclosure. The operations of method 2500 may be implemented by a transmitting STA or its components as described herein. For example, the operations of method 2500 may be performed by a multi-resource unit assignment module as described with reference to FIGS. 15 through 18. In some examples, a transmitting STA may execute a set of instructions to control the functional elements of the transmitting STA to perform the functions described below. Additionally or alternatively, a transmitting STA may perform aspects of the functions described below using special-purpose hardware.

At 2505, the transmitting STA may assign a set of resource units for communication with a receiving STA. The operations of 2505 may be performed according to the methods described herein. In some examples, aspects of the operations of 2505 may be performed by an assignment component as described with reference to FIGS. 15 through 18.

At 2510, the transmitting STA may transmit data on a data channel to the receiving STA in at least a first resource unit of the set of resource units. The operations of 2510 may be performed according to the methods described herein. In some examples, aspects of the operations of 2510 may be performed by a transmission component as described with reference to FIGS. 15 through 18.

At 2515, the transmitting STA may transmit service information on a control channel to the receiving STA in at least a second resource unit of the set of resource units, where at least a portion of the data is transmitted simultaneously with at least a portion of the service information to the receiving STA. The operations of 2515 may be performed according to the methods described herein. In some examples, aspects of the operations of 2515 may be performed by a communication component as described with reference to FIGS. 15 through 18.

At 2520, the transmitting STA may receive feedback information from the receiving STA on the control channel based on the service information, where the feedback information includes an ACK/NACK message, a BQR, a CQI report, or a combination thereof for the data channel. The operations of 2520 may be performed according to the methods described herein. In some examples, aspects of the operations of 2520 may be performed by a feedback component as described with reference to FIGS. 15 through 18.

At 2525, the transmitting STA may update an additional data transmission to the receiving STA based on the feedback information. The operations of 2525 may be performed according to the methods described herein. In some examples, aspects of the operations of 2525 may be performed by a transmission update component as described with reference to FIGS. 15 through 18.

At 2530, the transmitting STA may identify missing data for the receiving STA based on the feedback information. The operations of 2530 may be performed according to the methods described herein. In some examples, aspects of the operations of 2530 may be performed by a transmission update component as described with reference to FIGS. 15 through 18.

At 2535, the transmitting STA may add the missing data to a data queue for transmission to the receiving STA. The operations of 2535 may be performed according to the methods described herein. In some examples, aspects of the operations of 2535 may be performed by a transmission update component as described with reference to FIGS. 15 through 18.

Figure 26:
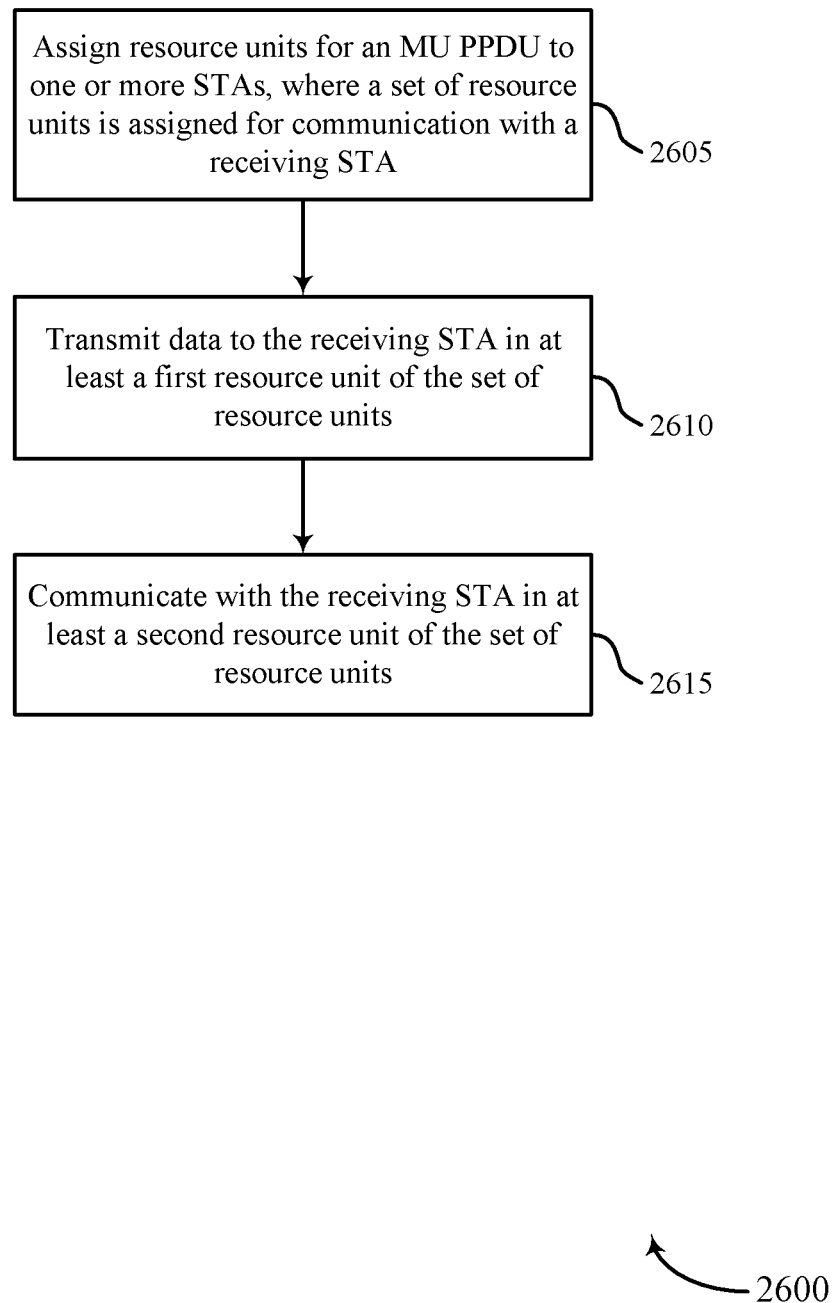

FIG. 26 shows a flowchart illustrating a method 2600 that supports data channel and control/management channel separation in accordance with aspects of the present disclosure. The operations of method 2600 may be implemented by a transmitting STA or its components as described herein. For example, the operations of method 2600 may be performed by a multi-resource unit assignment module as described with reference to FIGS. 15 through 18. In some examples, a transmitting STA may execute a set of instructions to control the functional elements of the transmitting STA to perform the functions described below. Additionally or alternatively, a transmitting STA may perform aspects of the functions described below using special-purpose hardware.

At 2605, the transmitting STA may assign a set of resource units for communication with a receiving STA. In some examples, assigning the set of resource units involves assigning resource units for an MU PPDU to one or more STAs, where the resource units includes the set of resource units. The operations of 2605 may be performed according to the methods described herein. In some examples, aspects of the operations of 2605 may be performed by an assignment component as described with reference to FIGS. 15 through 18.

At 2610, the transmitting STA may transmit data to the receiving STA in at least a first resource unit of the set of resource units. The operations of 2610 may be performed according to the methods described herein. In some examples, aspects of the operations of 2610 may be performed by a transmission component as described with reference to FIGS. 15 through 18.

At 2615, the transmitting STA may communicate with the receiving STA in at least a second resource unit of the set of resource units, where the communicating includes transmitting or receiving information that is different from the transmitted data, and where at least a portion of data is transmitted simultaneously with transmitting or receiving a portion of the information communicated with the receiving STA. The operations of 2615 may be performed according to the methods described herein. In some examples, aspects of the operations of 2615 may be performed by a communication component as described with reference to FIGS. 15 through 18.

Figure 27:
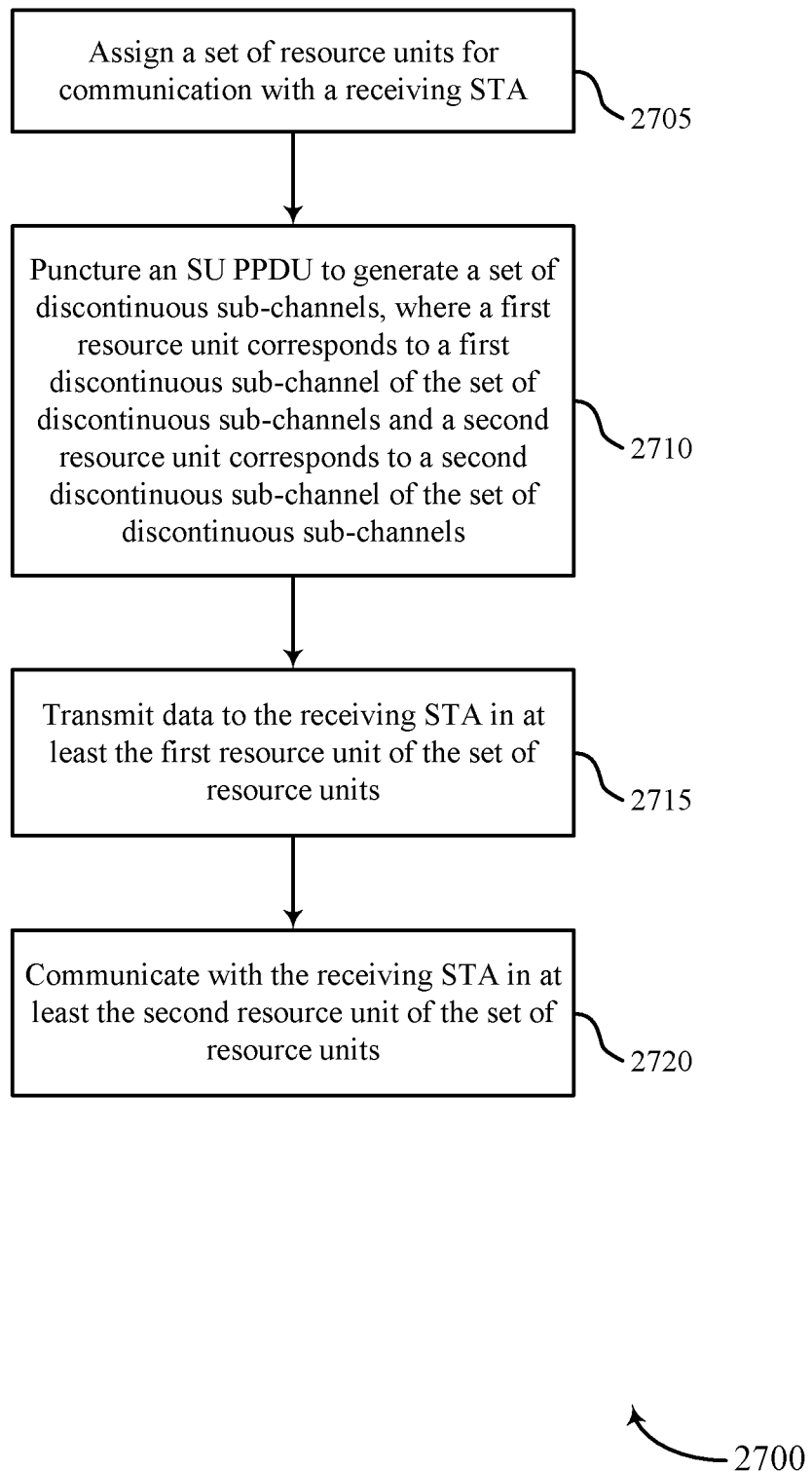

FIG. 27 shows a flowchart illustrating a method 2700 that supports data channel and control/management channel separation in accordance with aspects of the present disclosure. The operations of method 2700 may be implemented by a transmitting STA or its components as described herein. For example, the operations of method 2700 may be performed by a multi-resource unit assignment module as described with reference to FIGS. 15 through 18. In some examples, a transmitting STA may execute a set of instructions to control the functional elements of the transmitting STA to perform the functions described below. Additionally or alternatively, a transmitting STA may perform aspects of the functions described below using special-purpose hardware.

At 2705, the transmitting STA may assign a set of resource units for communication with a receiving STA. The operations of 2705 may be performed according to the methods described herein. In some examples, aspects of the operations of 2705 may be performed by an assignment component as described with reference to FIGS. 15 through 18.

At 2710, the transmitting STA may puncture an SU PPDU to generate a set of discontinuous sub-channels, where a first resource unit corresponds to a first discontinuous sub-channel of the set of discontinuous sub-channels and a second resource unit corresponds to a second discontinuous sub-channel of the set of discontinuous sub-channels. The operations of 2710 may be performed according to the methods described herein. In some examples, aspects of the operations of 2710 may be performed by a puncturing component as described with reference to FIGS. 15 through 18.

At 2715, the transmitting STA may transmit data to the receiving STA in at least the first resource unit of the set of resource units. The operations of 2715 may be performed according to the methods described herein. In some examples, aspects of the operations of 2715 may be performed by a transmission component as described with reference to FIGS. 15 through 18.

At 2720, the transmitting STA may communicate with the receiving STA in at least the second resource unit of the set of resource units, where the communicating includes transmitting or receiving information that is different from the transmitted data, and where at least a portion of data is transmitted simultaneously with transmitting or receiving a portion of the information communicated with the receiving STA. The operations of 2720 may be performed according to the methods described herein. In some examples, aspects of the operations of 2720 may be performed by a communication component as described with reference to FIGS. 15 through 18.

Figure 28:
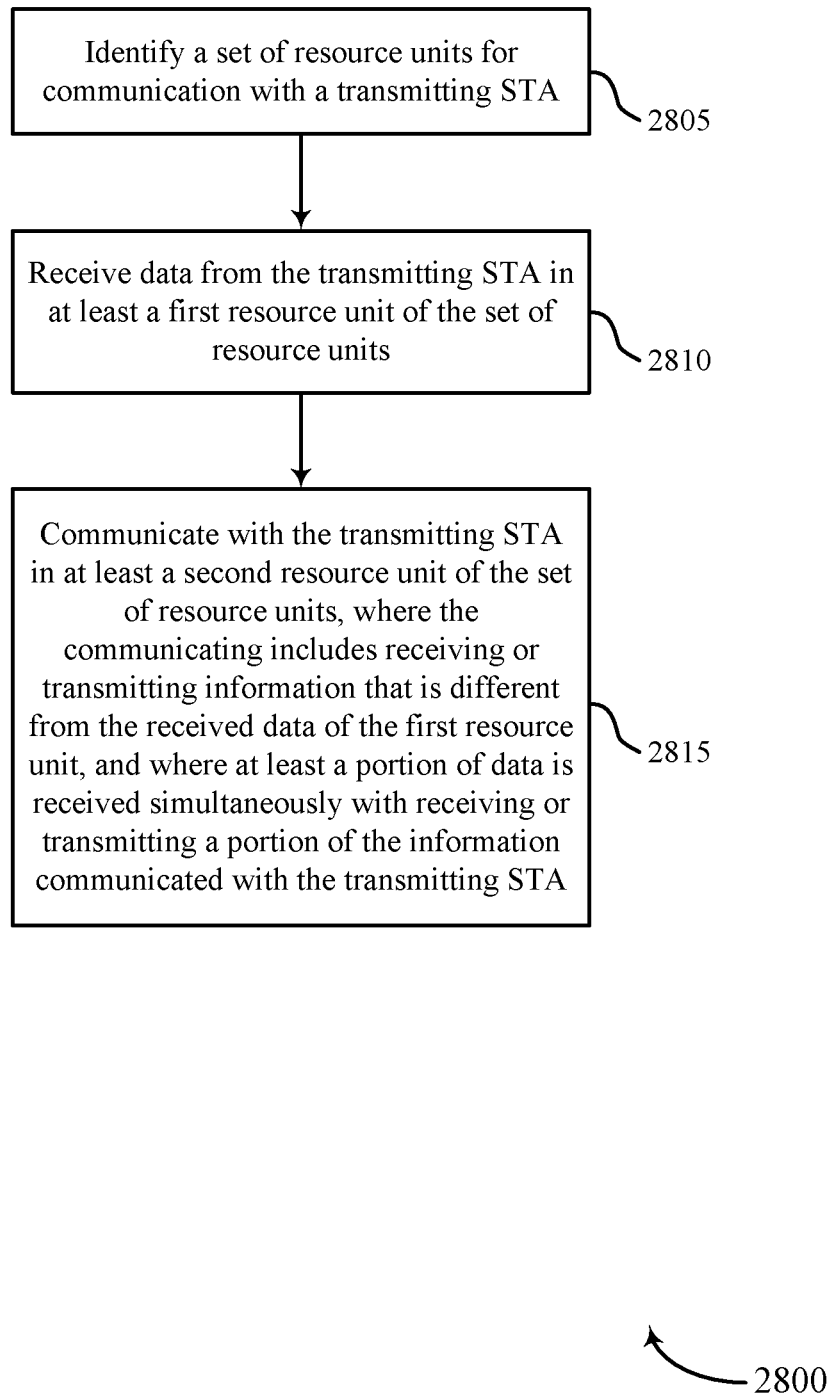

FIG. 28 shows a flowchart illustrating a method 2800 that supports data channel and control/management channel separation in accordance with aspects of the present disclosure. The operations of method 2800 may be implemented by a receiving STA or its components as described herein. For example, the operations of method 2800 may be performed by a multi-resource unit assignment module as described with reference to FIGS. 19 through 22. In some examples, a receiving STA may execute a set of instructions to control the functional elements of the receiving STA to perform the functions described below. Additionally or alternatively, a receiving STA may perform aspects of the functions described below using special-purpose hardware.

At 2805, the receiving STA may identify a set of resource units for communication with a transmitting STA. The operations of 2805 may be performed according to the methods described herein. In some examples, aspects of the operations of 2805 may be performed by a resource unit identifier as described with reference to FIGS. 19 through 22.

At 2810, the receiving STA may receive data from the transmitting STA in at least a first resource unit of the set of resource units. The operations of 2810 may be performed according to the methods described herein. In some examples, aspects of the operations of 2810 may be performed by a reception component as described with reference to FIGS. 19 through 22.

At 2815, the receiving STA may communicate with the transmitting STA in at least a second resource unit of the set of resource units, where the communicating includes receiving or transmitting information that is different from the received data of the first resource unit, and where at least a portion of data is received simultaneously with receiving or transmitting a portion of the information communicated with the transmitting STA. The operations of 2815 may be performed according to the methods described herein. In some examples, aspects of the operations of 2815 may be performed by a communication component as described with reference to FIGS. 19 through 22.

Figure 29:
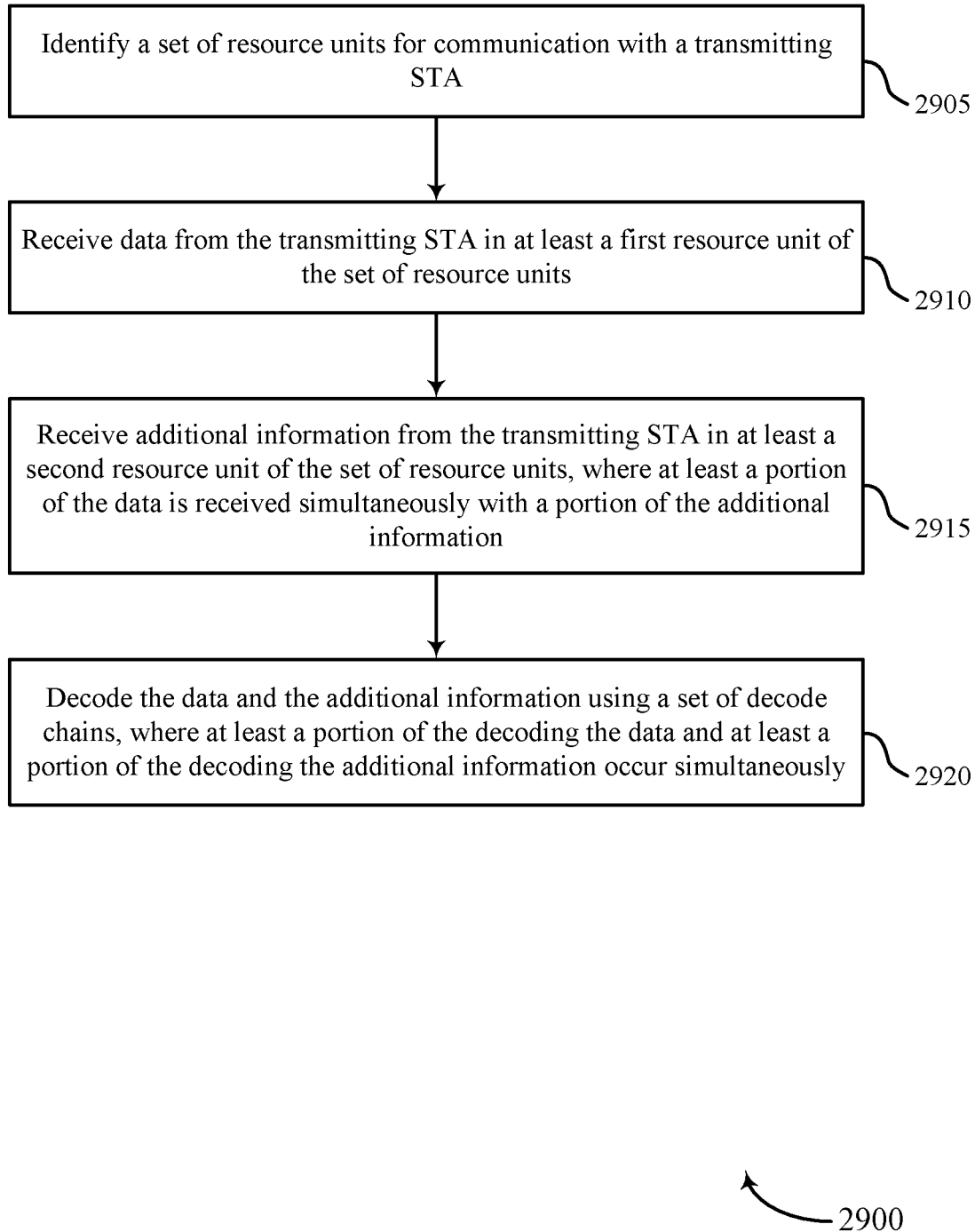

FIG. 29 shows a flowchart illustrating a method 2900 that supports data channel and control/management channel separation in accordance with aspects of the present disclosure. The operations of method 2900 may be implemented by a receiving STA or its components as described herein. For example, the operations of method 2900 may be performed by a multi-resource unit assignment module as described with reference to FIGS. 19 through 22. In some examples, a receiving STA may execute a set of instructions to control the functional elements of the receiving STA to perform the functions described below. Additionally or alternatively, a receiving STA may perform aspects of the functions described below using special-purpose hardware.

At 2905, the receiving STA may identify a set of resource units for communication with a transmitting STA. The operations of 2905 may be performed according to the methods described herein. In some examples, aspects of the operations of 2905 may be performed by a resource unit identifier as described with reference to FIGS. 19 through 22.

At 2910, the receiving STA may receive data from the transmitting STA in at least a first resource unit of the set of resource units. The operations of 2910 may be performed according to the methods described herein. In some examples, aspects of the operations of 2910 may be performed by a reception component as described with reference to FIGS. 19 through 22.

At 2915, the receiving STA may communicate with the transmitting STA in at least a second resource unit of the set of resource units, where the communicating includes receiving or transmitting information that is different from the received data, and where at least a portion of data is received simultaneously with receiving or transmitting a portion of the information communicated with the transmitting STA. In some examples, the communicating may involves receiving additional information from the transmitting STA in at least the second resource unit of the set of resource units. The operations of 2915 may be performed according to the methods described herein. In some examples, aspects of the operations of 2915 may be performed by a communication component as described with reference to FIGS. 19 through 22.

At 2920, the receiving STA may decode the data and the additional information using a set of decode chains, where at least a portion of the decoding the data and at least a portion of the decoding the additional information occur simultaneously. The operations of 2920 may be performed according to the methods described herein. In some examples, aspects of the operations of 2920 may be performed by a decoding component as described with reference to FIGS. 19 through 22.

Figure 30:
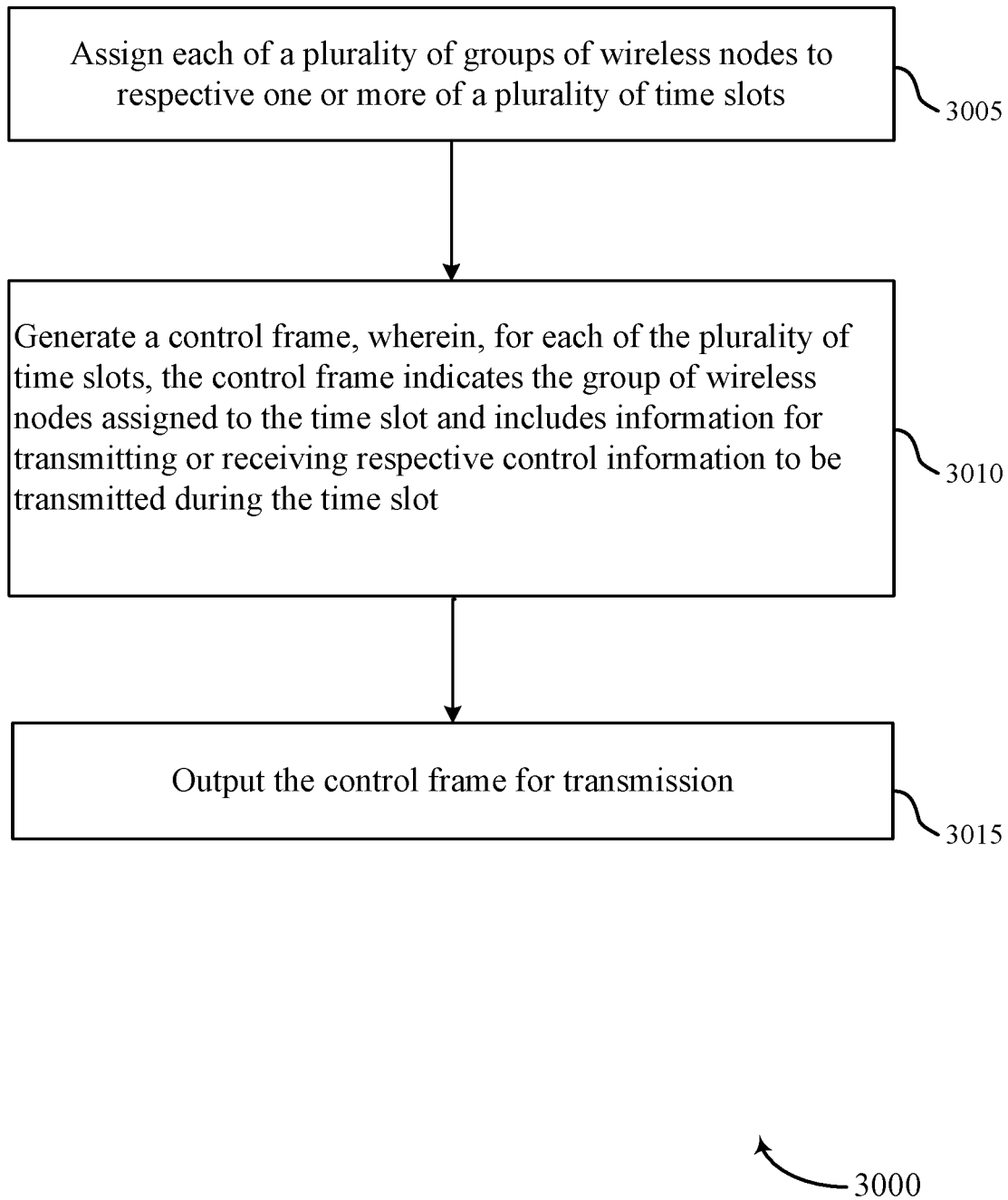

FIG. 30 shows a flowchart illustrating a method 3000 that supports wireless communications in accordance with aspects of the present disclosure. The operations of method 3000 may be implemented by a transmitting STA (e.g., an AP or mobile STA) or its components as described herein. For example, the operations of method 3000 may be performed by a multi-resource unit assignment module as described with reference to FIGS. 15 through 18. In some examples, an AP or STA may execute a set of instructions to control the functional elements of the AP or STA to perform the functions described below. Additionally or alternatively, an AP or STA may perform aspects of the functions described below using special-purpose hardware.

At block 3005, each of a plurality of groups of wireless nodes is assigned to a respective one or more of a plurality of time slots.

At block 3010, a control frame is generated, wherein, for each of the plurality of time slots, the control frame indicates the group of wireless nodes assigned to the time slot and includes information for transmitting or receiving respective control information during the time slot.

At block 3015, the control frame is output for transmission.

Figure 31:
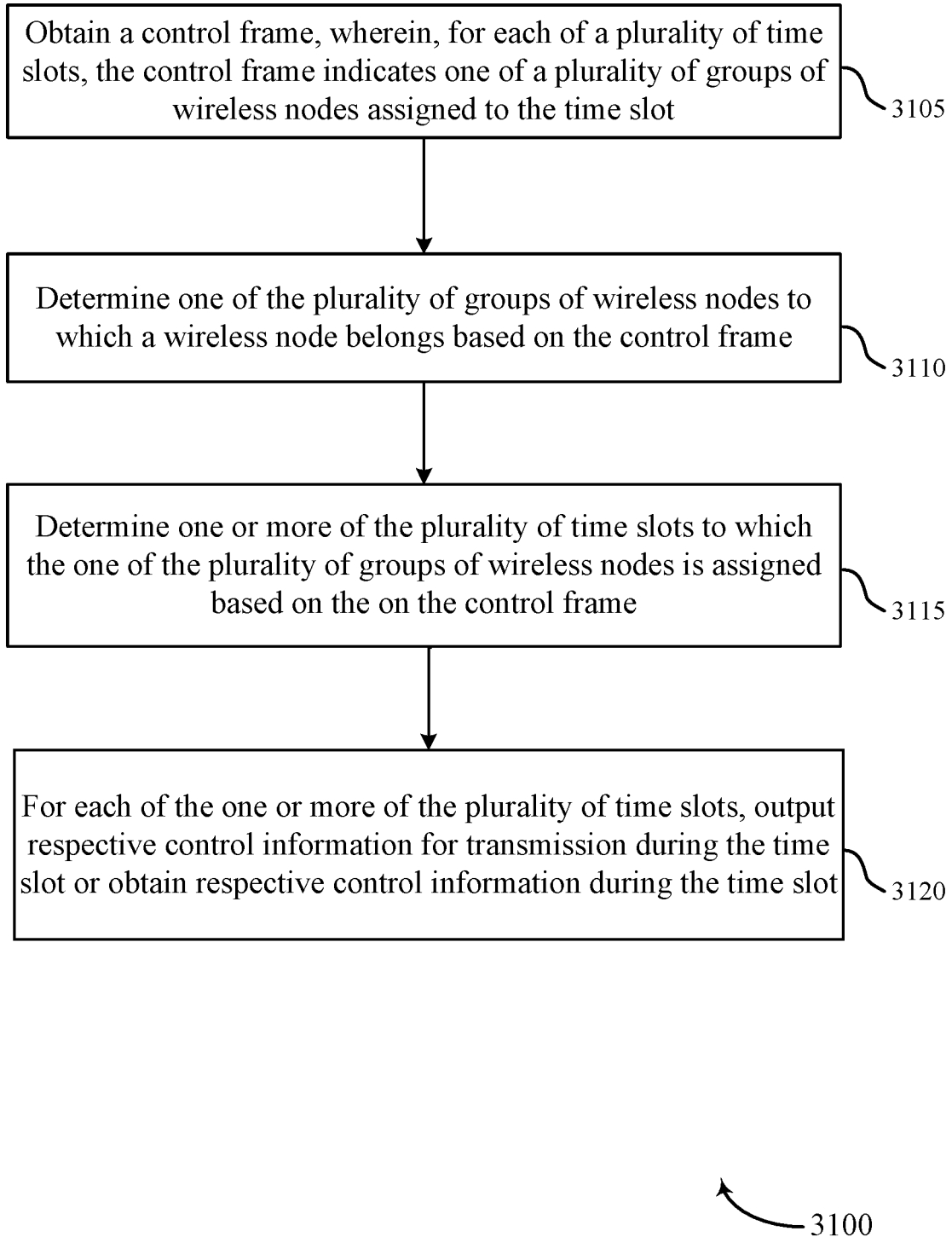

FIG. 31 shows a flowchart illustrating a method 3100 that supports data channel and control/management channel separation in accordance with aspects of the present disclosure. The operations of method 3100 may be implemented by a receiving STA (e.g., also referred to as an access terminal) or its components as described herein. For example, the operations of method 3100 may be performed by a multi-resource unit assignment module as described with reference to FIGS. 19 through 22. In some examples, a receiving STA may execute a set of instructions to control the functional elements of the receiving STA to perform the functions described below. Additionally or alternatively, a receiving STA may perform aspects of the functions described below using special-purpose hardware.

At block 3105, a control frame is obtained, wherein, for each of a plurality of time slots, the control frame indicates one of a plurality of groups of wireless nodes assigned to the time slot.

At block 3110, one of the plurality of groups of wireless nodes to which a wireless node belongs is determined based on the control frame.

At block 3115, one or more of the plurality of time slots to which the one of the plurality of groups of wireless nodes is assigned is determined based on the control frame.

At block 3120, for each of the one or more of the plurality of time slots, respective control information is output for transmission during the time slot or respective control information is obtained during the time slot.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications systems 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Furthermore, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
   identifying a plurality of resource units for communication with a transmitting station (STA);
   receiving data from the transmitting STA in at least a first resource unit of the plurality of resource units; and
   communicating with the transmitting STA in at least a second resource unit of the plurality of resource units, wherein the communicating comprises receiving or transmitting information that is different from the received data of the first resource unit, and wherein at least a portion of data is received simultaneously with receiving or transmitting a portion of the information communicated with the transmitting STA.

2. The method of claim 1, wherein the communicating comprises:
   receiving additional information from the transmitting STA in at least the second resource unit of the plurality of resource units; and
   decoding the data and the additional information using a plurality of decode chains, wherein at least a portion of the decoding the data and at least a portion of the decoding the additional information occur simultaneously.

3. The method of claim 2, wherein the additional information comprises control information, the method further comprising:

receiving management information from the transmitting STA in at least a third resource unit of the plurality of resource units, wherein at least a portion of receiving the data, the control information, and the management information occur simultaneously.

4. The method of claim 2, further comprising:
receiving, from the transmitting STA, an indication of the second resource unit, wherein the indication comprises a broadcast identifier (ID) or a special resource unit ID that indicates the second resource unit contains control information or management information.

5. The method of claim 2, wherein:
the data comprises unicast data; and
the additional information comprises broadcast data.

6. The method of claim 1, wherein the second resource unit comprises a primary bandwidth for the transmitting STA.

7. The method of claim 1, wherein:
the receiving comprises receiving the data on a data channel; and
the communicating comprises receiving service information on a control channel.

8. The method of claim 7, wherein:
the data comprises a long physical layer convergence procedure (PLCP) protocol data unit (PPDU) comprising a plurality of PLCP service data units (PSDUs), each PSDU separated by a midamble; and
the service information is received during one or more periodic service periods.

9. The method of claim 8, further comprising:
transitioning to a first power mode for receiving the service information during the one or more periodic service periods; and
transitioning to a second power mode based at least in part on the service information, wherein the second power mode is different from the first power mode.

10. The method of claim 7, wherein the service information indicates timing for data reception on the data channel, parameters for a next midamble, or a combination thereof.

11. The method of claim 7, further comprising:
transmitting feedback information to the transmitting STA on the control channel based at least in part on the service information, wherein the feedback information comprises a positive or negative acknowledgement (ACK/NACK) message, a bandwidth quality report (BQR), a channel quality indicator (CQI) report, or a combination thereof for the data channel.

12. The method of claim 7, further comprising:
transmitting feedback information to the transmitting STA on the control channel, wherein the feedback information comprises a positive or negative acknowledgement (ACK/NACK) message; and
performing an add block acknowledgement (ADDBA) setup procedure with the transmitting STA, wherein the ADDBA setup procedure indicates whether a corresponding block acknowledgement (BA) session applies to the data channel, the control channel, or both.

13. The method of claim 1, further comprising:
indicating, to the transmitting STA, support for at least the portion of the receiving and at least the portion of the communicating occurring simultaneously.

14. The method of claim 1, wherein communicating with the transmitting STA in at least the second resource unit comprises:
receiving a GroupCast with Retries multi-user block acknowledgement request (GCR-MU BAR) in the second resource unit; and
transmitting, to the transmitting STA, a positive or negative acknowledgement (ACK/NACK) message based at least in part on the GCR-MU BAR.

15. An apparatus for wireless communications, comprising: a first interface; a second interface; and a wireless modem configured to:
identify a plurality of resource units for communication with a transmitting station (STA);
obtain over the first interface data received from the transmitting STA in at least a first resource unit of the plurality of resource units; and
communicate with the transmitting STA in at least a second resource unit of the plurality of resource units, wherein the communicating comprises obtaining over the first interface or outputting over the second interface information that is different from the received data of the first resource unit, and wherein at least a portion of data is obtained simultaneously with obtaining or outputting a portion of the information communicated with the transmitting STA.

16. The apparatus of claim 15, wherein the communicating comprises:
obtaining over the first interface additional information from the transmitting STA in at least the second resource unit of the plurality of resource units; and
decoding the data and the additional information using a plurality of decode chains, wherein at least a portion of the decoding the data and at least a portion of the decoding the additional information occur simultaneously.

17. The apparatus of claim 16, wherein the additional information comprises control information, and the wireless modem is further configured to:
obtain over the first interface management information received from the transmitting STA in at least a third resource unit of the plurality of resource units, wherein at least a portion of receiving the data, the control information, and the management information occur simultaneously.

18. The apparatus of claim 16, wherein the wireless modem is further configured to:
obtain over the first interface an indication of the second resource unit received from the transmitting STA, wherein the indication comprises a broadcast identifier (ID) or a special resource unit ID that indicates the second resource unit contains control information or management information.

19. The apparatus of claim 16, wherein:
the data comprises unicast data; and
the additional information comprises broadcast data.

20. The apparatus of claim 15, wherein the second resource unit comprises a primary bandwidth for the transmitting STA.

21. The apparatus of claim 15, wherein:
the data received from the transmitting STA comprises data received on a data channel; and
the communicating comprises obtaining over the first interface service information received on a control channel.

22. The apparatus of claim 21, wherein:
the data comprises a long physical layer convergence procedure (PLCP) protocol data unit (PPDU) comprising a plurality of PLCP service data units (PSDUs), each PSDU separated by a midamble; and
the service information is received during one or more periodic service periods.

23. The apparatus of claim 22, wherein the wireless modem is further configured to:
   transition to a first power mode for obtaining the service information over the first interface during the one or more periodic service periods; and
   transition to a second power mode based at least in part on the service information, wherein the second power mode is different from the first power mode.

24. The apparatus of claim 21, wherein the service information indicates timing for data reception on the data channel, parameters for a next midamble, or a combination thereof.

25. The apparatus of claim 21, wherein the wireless modem is further configured to:
   output feedback information over the second interface for transmission to the transmitting STA on the control channel based at least in part on the service information, wherein the feedback information comprises a positive or negative acknowledgement (ACK/NACK) message, a bandwidth quality report (BQR), a channel quality indicator (CQI) report, or a combination thereof for the data channel.

26. The apparatus of claim 21, wherein the wireless modem is further configured to:
   output feedback information over the second interface for transmission to the transmitting STA on the control channel, wherein the feedback information comprises a positive or negative acknowledgement (ACK/NACK) message; and
   perform an add block acknowledgement (ADDBA) setup procedure with the transmitting STA, wherein the ADDBA setup procedure indicates whether a corresponding block acknowledgement (BA) session applies to the data channel, the control channel, or both.

27. The apparatus of claim 15, wherein the wireless modem is further configured to:
   output over the second interface for transmission to the transmitting STA, an indication of support for at least the portion of the receiving and at least the portion of the communicating occurring simultaneously.

28. The apparatus of claim 15, wherein communicating with the transmitting STA in at least the second resource unit of the plurality of resource units comprises:
   obtaining over the first interface a GroupCast with Retries multi-user block acknowledgement request (GCR-MU BAR) in the second resource unit; and
   outputting over the second interface for transmission to the transmitting STA, a positive or negative acknowledgement (ACK/NACK) message based at least in part on the GCR-MU BAR.

29. An apparatus for wireless communications, comprising:
   means for identifying a plurality of resource units for communication with a transmitting station (STA);
   means for receiving data from the transmitting STA in at least a first resource unit of the plurality of resource units; and
   means for communicating with the transmitting STA in at least a second resource unit of the plurality of resource units, wherein the communicating comprises receiving or transmitting information that is different from the received data, and wherein at least a portion of data is received simultaneously with receiving or transmitting a portion of the information communicated with the transmitting STA.

30. A non-transitory computer-readable medium storing code for wireless communications, the code comprising instructions executable by a processor to:
   identify a plurality of resource units for communication with a transmitting station (STA);
   receive data from the transmitting STA in at least a first resource unit of the plurality of resource units; and
   communicate with the transmitting STA in at least a second resource unit of the plurality of resource units, wherein the communicating comprises receiving or transmitting information that is different from the received data, and wherein at least a portion of data is received simultaneously with receiving or transmitting a portion of the information communicated with the transmitting STA.

* * * * *